(12) United States Patent
Heath

(10) Patent No.: US 8,909,771 B2
(45) Date of Patent: Dec. 9, 2014

(54) SYSTEM AND METHOD FOR USING GLOBAL LOCATION INFORMATION, 2D AND 3D MAPPING, SOCIAL MEDIA, AND USER BEHAVIOR AND INFORMATION FOR A CONSUMER FEEDBACK SOCIAL MEDIA ANALYTICS PLATFORM FOR PROVIDING ANALYTIC MEASUREMENTS DATA OF ONLINE CONSUMER FEEDBACK FOR GLOBAL BRAND PRODUCTS OR SERVICES OF PAST, PRESENT OR FUTURE CUSTOMERS, USERS, AND/OR TARGET MARKETS

(76) Inventor: Stephan Heath, Highlands Ranch, CO (US)

( * ) Notice: Subject to any disclaimer, the term of this patent is extended or adjusted under 35 U.S.C. 154(b) by 90 days.

(21) Appl. No.: 13/594,842

(22) Filed: Aug. 26, 2012

(65) Prior Publication Data

US 2013/0073336 A1    Mar. 21, 2013

Related U.S. Application Data

(63) Continuation-in-part of application No. 13/233,352, filed on Sep. 15, 2011, and a continuation-in-part of application No. 13/337,271, filed on Dec. 26, 2011, and a continuation-in-part of application No. 13/337,275, filed on Dec. 26, 2011, and a continuation-in-part of application No. 13/359,498, (Continued)

(51) Int. Cl.
  *G06F 15/173* (2006.01)
(52) U.S. Cl.
  USPC ............... 709/224; 709/220; 705/14; 705/26; 705/39

(58) Field of Classification Search
  USPC .......................... 709/224, 220; 705/14, 26, 39
  See application file for complete search history.

(56) References Cited

U.S. PATENT DOCUMENTS 6,073,124 A    6/2000  Krishnan et al.
7,630,936 B2 *  12/2009  Kumar et al. .................. 705/39

(Continued)

OTHER PUBLICATIONS

International Search Report and Written Opinion of the International Searching Authority. International Application No. PCT/US2012/036896, issued by the United States Patent Office, mail date Jul. 20, 2012, Alexandria Virginia.

*Primary Examiner* — Tammy Nguyen
(74) *Attorney, Agent, or Firm* — Peter B. Scull; Hamilton DeSanctis & Cha, LLP

(57) ABSTRACT

A method, apparatus, non-transitory computer readable storage medium, computer system, network, or system, is provided for using location information, 2D and 3D mapping, social media, and user behavior and information to provide alternative a consumer feedback social media analytics platforms for providing analytic measurements data of online consumer feedback for global brand products or services of past, present or future customers, users, and/or target markets, for companies, organizations, government agencies, and the like, by electronically collecting and analyzing, on a networked computer system using a processor, qualitative or quantitative online social media online communications, activity, and online communications and activity relevant to consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof.

20 Claims, 29 Drawing Sheets

Related U.S. Application Data filed on Jan. 27, 2012, and a continuation-in-part of application No. 13/369,244, filed on Feb. 8, 2012, and a continuation-in-part of application No. 13/430,600, filed on Mar. 26, 2012, and a continuation-in-part of application No. 13/439,761, filed on Apr. 4, 2012, and a continuation-in-part of application No. 13/543,871, filed on Jul. 8, 2012, and a continuation-in-part of application No. 13/551,556, filed on Jul. 17, 2012, and a continuation-in-part of application No. 13/439,735, filed on Apr. 4, 2012, and a continuation-in-part of application No. PCT/US2012/036896, filed on May 8, 2012.

(56) References Cited

U.S. PATENT DOCUMENTS

| Patent/Pub No. | Date | Inventor | Class |
|---|---|---|---|
| 7,756,756 B1 * | 7/2010 | Lifson | 705/26.1 |
| 7,860,852 B2 | 12/2010 | Brunner et al. | |
| 7,908,263 B1 | 3/2011 | Palz et al. | |
| 7,933,897 B2 | 4/2011 | Jones et al. | |
| 7,970,665 B1 | 6/2011 | Lifson | |
| 7,980,466 B2 | 7/2011 | Lee et al. | |
| 8,209,220 B2 * | 6/2012 | Mohammed et al. | 705/14.1 |
| 2002/0055924 A1 | 5/2002 | Liming et al. | |
| 2002/0094868 A1 | 7/2002 | Tuck et al. | |
| 2003/0158796 A1 | 8/2003 | Balent | |
| 2005/0288959 A1 | 12/2005 | Eraker et al. | |
| 2006/0170670 A1 | 8/2006 | Burke | |
| 2006/0265197 A1 | 11/2006 | Peterson et al. | |
| 2007/0143345 A1 | 6/2007 | Jones et al. | |
| 2007/0265006 A1 | 11/2007 | Washok et al. | |
| 2008/0172288 A1 | 7/2008 | Pilkalns et al. | |
| 2008/0201156 A1 | 8/2008 | Abhyanker et al. | |
| 2008/0300979 A1 * | 12/2008 | Abhyanker | 705/14 |
| 2008/0307003 A1 | 12/2008 | O'Donnell et al. | |
| 2009/0070129 A1 | 3/2009 | Inbar et al. | |
| 2009/0070204 A1 | 3/2009 | Clancy et al. | |
| 2009/0144144 A1 | 6/2009 | Grouf et al. | |
| 2009/0163187 A1 | 6/2009 | Terrell et al. | |
| 2009/0187486 A1 | 7/2009 | Lefenfeld et al. | |
| 2010/0094752 A1 | 4/2010 | Heath | |
| 2010/0119053 A1 | 5/2010 | Goeldi | |
| 2010/0145800 A1 * | 6/2010 | Eraker et al. | 705/14.49 |
| 2010/0198684 A1 * | 8/2010 | Eraker et al. | 705/14.49 |
| 2010/0226535 A1 | 9/2010 | Kimchi et al. | |
| 2010/0325563 A1 | 12/2010 | Goldthwaite et al. | |
| 2011/0004515 A1 | 1/2011 | Mesaros | |
| 2011/0029360 A1 | 2/2011 | Gollapalli | |
| 2011/0035284 A1 | 2/2011 | Moshfeghi | |
| 2011/0041168 A1 | 2/2011 | Murray | |
| 2011/0066615 A1 | 3/2011 | Pradhan et al. | |
| 2011/0082736 A1 | 4/2011 | Goldman et al. | |
| 2011/0173066 A1 | 7/2011 | Simmons et al. | |
| 2011/0191417 A1 | 8/2011 | Rathod | |
| 2011/0191432 A1 | 8/2011 | Layson et al. | |
| 2011/0196776 A1 | 8/2011 | Rash et al. | |
| 2011/0208724 A1 | 8/2011 | Jones et al. | |
| 2011/0231363 A1 | 9/2011 | Rathod | |
| 2011/0246305 A1 | 10/2011 | Brazeau et al. | |
| 2011/0258073 A1 | 10/2011 | Lifson et al. | |
| 2011/0276396 A1 | 11/2011 | Rathod | |
| 2011/0276628 A1 | 11/2011 | Pell | |
| 2011/0313781 A1 | 12/2011 | Ho | |
| 2012/0036015 A1 * | 2/2012 | Sheikh | 705/14.54 |
| 2012/0054014 A1 | 3/2012 | Cho et al. | |
| 2012/0066037 A1 | 3/2012 | Glen | |
| 2013/0073366 A1 | 3/2013 | Heath | |
| 2013/0073374 A1 | 3/2013 | Heath | |
| 2013/0073376 A1 | 3/2013 | Heath | |
| 2013/0073377 A1 | 3/2013 | Heath | |
| 2013/0073387 A1 | 3/2013 | Heath | |
| 2013/0073388 A1 | 3/2013 | Heath | |
| 2013/0073389 A1 | 3/2013 | Heath | |
| 2013/0073400 A1 | 3/2013 | Heath | |
| 2013/0073473 A1 | 3/2013 | Heath | |
| 2013/0268357 A1 | 10/2013 | Heath | |
| 2014/0006129 A1 | 1/2014 | Heath | |

* cited by examiner

SYSTEM AND METHOD FOR USING GLOBAL LOCATION INFORMATION, 2D AND 3D MAPPING, SOCIAL MEDIA, AND USER BEHAVIOR AND INFORMATION FOR A CONSUMER FEEDBACK SOCIAL MEDIA ANALYTICS PLATFORM FOR PROVIDING ANALYTIC MEASUREMENTS DATA OF ONLINE CONSUMER FEEDBACK FOR GLOBAL BRAND PRODUCTS OR SERVICES OF PAST, PRESENT OR FUTURE CUSTOMERS, USERS, AND/OR TARGET MARKETS

PRIORITY

This application is a continuation in part of, and claims priority to each of: U.S. application Ser. No. 13/233,352, filed 15 Sep. 2011; Ser. No. 13/337,271, filed 26 Dec. 2011; Ser. No. 13/337,275, filed 26 Dec. 2011; Ser. No. 13/359,498, filed 27 Jan. 2012; Ser. No. 13/369,244, filed Feb. 8, 2012; Ser. No. 13/430,600, filed Mar. 26, 2012; Ser. No. 13/439,735 filed Apr. 4, 2012; Ser. No. 13/439,761, filed Apr. 4, 2012; Ser. No. 13/543,871, filed Jul. 8, 2012; Ser. No. 13/551,556, filed Jul. 17, 2012 and PCT application PCT/US2012/36896, filed 8 May, 2012, each of which applications are entirely incorporated herein by reference.

FIELD OF THE INVENTION

The invention relates to a method, apparatus, non-transitory computer readable storage medium, computer system, network, or system provided is provided for using location information, 2D and 3D mapping, social media, and user behavior and information for a consumer feedback social media analytics (CF-SMA) platform for providing analytic measurements data of online consumer feedback for global brand products or services of past, present or future customers, users, and/or target markets, for companies, organizations, government agencies, and the like, by electronically collecting and analyzing, on a networked computer system using a processor, qualitative or quantitative online social media online communications, activity, and other online communications and activity, relevant to consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof.

BACKGROUND

Traditional methods of collecting, managing and providing real-time or near real-time relevant information have been enhanced through the use of the Internet and online research and information collection tools. One such set of tools is known as web analytics. Web analytics focus on a company's own website for collection of online information, particularly traffic data. Web analytics are limited because they only consider a subset of the relevant online universe, specifically the behavior of users of a given website. They do not discover other information about the users such as interests and opinions expressed in interactive systems. Behavioral analytics are another set of information collection and management tools that attempts to analyze the "click stream" of users and show advertisements based on this information. However, this method has many technical limitations since it tends to provide only a very limited picture of a user's overall interests. Also there is a lack of consolidation between a user's work and home PCs.

Online social media is a new source of valuable information on the Internet that may be collected to generate information and other data about products or services, branding, competition, and industries. Online social media encompasses online media such as blogs and sub-blogs, online discussion forums, social networks, wiki sites, online reviews on e-commerce sites, video sites, micro-blogging services, and so on. There are several million forums with active contributions by more than 33% of Internet users.

As of 2009, there are more than 483 million users of social networks worldwide growing at a rate of more than 47% annually. As a result, social media is becoming a crucial and rapidly growing source of consumer opinion. This information may allow users to quantify opinion on social media sites to gain useful insights into current consumer or brand sentiment and trends relating to their products or services, brands, and/or technologies, and those of their competitors. Collecting and presenting this information can help users in a variety of ways such as, for example, target advertising revenues and expenditures, marketing, sales, customer service, brand management, product development, investor relations, and so on. Social networking sites are currently trying to leverage their own user profiles to target advertising based on their users' behavior and declared interests. However, most users today participate in several different online social media sites. Online content analytics are another set of information collection tools that attempts to analyze content in social media sites such as online forums, blogs, and so on. However, these techniques require a high degree of manual human intervention by analysts. Additionally, the reports generated by these analysts can be very expensive and can't be updated very frequently due to the necessity of human intervention in the data gathering and analysis process.

The Geospatial Revolution examines the world of social mapping, digital mapping, and how it is changing the way we think, behave and interact. Geospatial information influences nearly everything. Seamless layers of satellites, surveillance, and location-based technologies create a worldwide geographic knowledge base vital to the interconnected global community. The Geospatial Revolution explores compelling human stories that explain the history, applications, related privacy issues, and impact of location-based technologies including GPS and GIS. The video episodes are useful for teaching history, social studies, geography, environment, and ecology, science and technology and for learning about career development.

SUMMARY OF THE INVENTION

At least certain embodiments of the invention provide a consumer feedback social media analytics platform for providing analytic measurements data of online consumer feedback for products or services of past, present or future customers, users, and/or target markets, for companies, organizations, government agencies, and the like by electronically collecting and analyzing, on a networked computer system using a processor, qualitative or quantitative online social media online communications, activity, and other online communications and activity, relevant to consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof, wherein the consumer feedback, consumer data, or impression data can include browser tracking and/or cookies.

For example, if a global brand has 17,000 locations worldwide wherein they are collecting, managing and providing real-time or near real-time relevant information processing on a computer system processor of the online consumer feedback data for products or services via online activity, communications, location information data, and social media content to electronically determine on a computer system processor frequency data of occurrence of one or more topics in conjunction with the consumer products or services, or promotions thereof, of interest and relatedness of the one or more topics to the consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof, wherein the consumer feedback, consumer data, or impression data can include browser tracking and/or cookies.

The consumer feedback can optionally be provided in a category from one or more online user online activity and/or social media sources, e.g., by electronically quantifying, on a networked computer system using a processor, the analyzed online consumer feedback for products or services via online activity, communications, location information data, and social media content, and electronically providing actionable information data to companies, organizations, and governmental agencies based on the quantified analyzed online consumer feedback for products or services via online activity, communications, location information data, and social media content, wherein the consumer feedback, consumer data, or impression data can include browser tracking and/or cookies.

The actionable data and/or information can include consumer sentiment expressed data of online internet activity and social media participants concerning consumer products or services, or promotions thereof, of interest in, optionally in a category of interest, in order to provide targeted, location based, 2D or 3D mapped, or impressions to generate online location information data or promotions to provide improved or desired customer perception or sentiment regarding a company's products, services or promotions thereof.

The invention can provide in certain non-limiting aspects, a consumer feedback social media analytics platform method, system or apparatus or non-transitory computer readable storage medium, comprising:

(a) electronically collecting and analyzing on a networked computer system using a processor qualitative or quantitative online consumer feedback data for products or services via online activity, communications, location information data, and social media content relevant to consumer products or services, or promotions thereof, of interest in a category from one or more online user online activity and social media sources;

the consumer feedback data comprising:
(i) impressions data comprising tracking and analysis of website access of said user's, target markets' users, demographic groups or geographic data;
(ii) location information data relating to selected;
    (a) users, target markets, demographic groups or geographic data;
    (b) (1) products or services; or (2) product or service providers; and
    (c) points of interest near or associated with (1) said consumers, target markets, demographic groups or geographic data; (2) said products or services; or (3) said product or service providers;
(iii) 2D and 3D mapping data related to selected:
    (a) user, target market or demographic group locations or associated locations; or
    (b) product or service or service provider locations or associated locations;
(iv) user internet activity data relating to user searching, browsing, purchases, location, interactions, and interests; and
(v) social networking data of interactions between said user and other users, target markets, and demographics groups and geographic data; and
(vi) generated marketing and mapping data of relationships between members of a social network or website (b) electronically quantifying on a networked computer system using a processor the collected online consumer feedback data for products or services via online activity, communications, location information data, and social media content; to electronically obtain, using a computer system processor, structured analytic measurements data of the online consumer feedback for products or services via online activity, communications, location information data, and social media content, including electronic analytic measurements data of consumer or brand sentiment expressed data among online internet activity and social media participants concerning the consumer products or services, or promotions thereof, of interest in the category; and (c) electronically providing, on a networked computer system using a processor, actionable information data to companies, organizations, and governmental agencies based on the analytic measurements data of the online activity, communications, location information data, and social media content, in order to provide targeted, location based, 2D or 3D mapped, or impressions to generate online location information data or promotions to provide improved or desired customer perception or sentiment regarding a company's products, services or promotions thereof, wherein the consumer feedback, consumer data, or impression data can include browser tracking and/or cookies.

The invention can further provide wherein the actionable information data is retrieved based on real-time measurements or data collection and/or management of:
(i) the consumer or brand sentiment expressed data by the online internet activity and social media participants concerning the consumer products or services, or promotions thereof, of interest; electronically compared and analyzed on a computer system with:
(ii) historical data representing quantitative measurements of the consumer or brand sentiment data concerning the consumer products or services, or promotions thereof, of interest in the past or concurrently with similar or competing products and services.

The invention can further provide wherein the qualitative or quantitative online consumer feedback data for products or services via online activity, communications, location information data, and social media content, includes one or more selected from the group consisting of messages posted to online social media websites, Internet messages; social media postings; promotions or offers; online dialog; blogging; interactions between customers and companies; call center logs; emails; online mail and fax communications; call center records; online purchasing information; online warranty claims; and other online traffic.

The invention can further provide wherein the one or more online user online activity and social media sources include one or more selected from the group consisting of blogs and sub-blogs; online discussion forums; social networks; wiki sites; online reviews on e-commerce sites; video websites; micro-blogging services; call centers; websites including websites of companies; and other sources of online activity, communications, location information data, and social media content.

The invention can further provide further comprising displaying the actionable information data to users in companies, organizations, global or local businesses, government agencies on a graphical user interface (GUI), in order to provide targeted, location based, 2D or 3D mapped, or impressions to generate online location information data or promotions to provide improved or desired customer perception or sentiment regarding a company's products, services or promotions thereof.

The invention can further provide further comprising: electronically performing on a networked computer system consumer or brand sentiment rating processing of data on structured analytical measurements of the online consumer feedback data for products or services via online activity, communications, location information data, and social media content that refers to the consumer products or services, or promotions thereof, of interest; to electronically determine using, a networked computer system processor, at least one consumer or brand sentiment rating data set for the online activity, communications, location information data, and social media content; and electronically assigning on a computer system the consumer or brand sentiment rating for one or more of the online activity, communications, location information data, and social media content data sets.

The invention can further provide wherein said electronically determining the consumer or brand sentiment rating data sets includes:

(i) electronically identifying, using a computer system processor, data sets comprising terms or phrases of interest associated with the consumer products or services, or promotions thereof, of interest in one or more of the online activity, communications, location information data, and social media content data sets;

(ii) electronically searching on a computer system processor in a set of closest N words from the terms or phrases of interest for keywords expressing consumer or brand sentiment about the terms or phrases of interest;

(iii) electronically assigning using a computer system processor, a probability value data set for one or more of the keywords, the probability value indicating the probability that the keyword suggests something positive or negative about the terms or phrases of interest;

(iv) electronically assigning using a computer system processor one or more occurrences of the terms or phrases of interest with a consumer or brand sentiment score data value based on the keywords in the set of closest N words from the terms or phrases of interest; and (v) electronically summing using a computer system processor one or more consumer or brand sentiment score assigned to each of the terms or phrases of interest in each social media conversation to electronically obtain using computer system processor consumer or brand sentiment rating data sets concerning the consumer products or services, or promotions thereof, of interest.

The invention can further provide wherein the consumer or brand sentiment score is based on one or more of: how many times each occurrence of the terms or phrases of interest appears in the social media conversation; number of keywords expressing consumer or brand sentiment about the terms or phrases of interest in the set of closest words; whether each keyword reflects a positive, negative or neutral consumer or brand sentiment about the consumer products or services, or promotions thereof, of interest; and relevance of the keywords expressing consumer or brand sentiment about the terms or phrases of interest, in order to provide targeted, location based, 2D or 3D mapped, or impressions to generate online location information data or promotions to provide improved or desired customer perception or sentiment regarding a company's products, services or promotions thereof.

The invention can further provide wherein the relevance of the keywords is electronically determined by using a computer system one or more of: linguistic modifiers of the keywords expressing consumer or brand sentiment about the terms or phrases of interest including one or more of negations, comparatives, and enumerations; and proximity of the keywords to the terms or phrases of interest in the online social media conversation.

The invention can further provide further comprising electronically analyzing and using online social media author and website influence parameter data on a computer system in classifying the consumer or brand sentiment of consumer online activity, behavior, or social media conversations or content data.

The invention can further provide further comprising one or more of: calculating how the consumer or brand sentiment concerning the consumer products or services, or promotions thereof, of interest trends over time; calculating how the consumer or brand sentiment concerning the consumer products or services, or promotions thereof, of interest varies by online source or group of sources; and calculating how the consumer or brand sentiment concerning the consumer products or services, or promotions thereof, of interest concurrently trends over time and varies by online source or group of sources.

The invention can further provide further comprising determining an overall volume of the online consumer feedback for products or services via online activity, communications, location information data, and social media content referring to the consumer products or services, or promotions thereof, of interest by adding up a number of occurrences of the consumer products or services, or promotions thereof, of interest in online consumer feedback for products or services via online activity, communications, location information data, and social media content per unit of time.

The invention can further provide further comprising determining how the overall volume of online social conversations referring to the consumer products or services, or promotions thereof, of interest trends over time. The invention can further provide further comprising determining a share of online voice acquired by the consumer products or services, or promotions thereof, of interest with respect to other online social media subject matter.

The invention can further provide wherein the other online social media subject matter includes subject matter associated with competitors in the category, in order to provide targeted, location based, 2D or 3D mapped, or impressions to generate online location information data or promotions to provide improved or desired customer perception or sentiment regarding a company's products, services or promotions thereof, or to show differentiation or superiority with those of competitors.

The invention can further provide further comprising electronically calculating on a computer system processor one or more of: how the share of online voice acquired by the consumer products or services, or promotions thereof, of interest trends over time; and how the share of online voice acquired by the consumer products or services, or promotions thereof, of interest trends over time with respect to the subject matter of the competitors in the category, in order to provide targeted, location based, 2D or 3D mapped, or impressions to generate online location information data or promotions to provide improved or desired customer perception or sentiment regarding a company's products, services or promotions thereof.

The invention can further provide further comprising electronically performing text edge processing on a computer system processor of the online consumer feedback data for products or services via online activity, communications, location information data, and social media content to electronically determine on a computer system processor frequency data of occurrence of one or more topics in conjunction with the consumer products or services, or promotions thereof, of interest and relatedness of the one or more topics to the consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof.

The invention can further provide wherein the text edge processing comprises (i) electronically on a computer system processor providing data sets showing the splitting up of phrases, from online consumer feedback data for products or services via online activity, communications, location information data, and social media content; into data sets of individual words and tuples of adjacent words; (ii) electronically identifying data sets of words or tuples of interest associated with the consumer products or services, or promotions thereof, of interest; (iii) providing data sets identifying relationships between the words or tuples of interest and each other word and tuple in the sentence as an instance of an edge; and adding up each of the instances.

The invention can further provide further comprising electronically determining using a computer system processor data sets of the frequency of occurrence of the one or more topics in conjunction with the consumer products or services, or promotions thereof, of interest, the data sets comprising trends over time, in order to provide targeted, location based, 2D or 3D mapped, or impressions to generate online location information data or promotions to provide improved or desired customer perception or sentiment regarding a company's products, services or promotions thereof.

The invention can further provide further comprising (i) electronically determining on a computer system processor an overall advocacy of the consumer products or services, or promotions thereof, of interest in the online consumer feedback for products or services via online activity, communications, location information data, and social media content for the category based on data sets selected from the group consisting of: (a) data analysis of consumer or brand sentiment ratings of the consumer products or services, or promotions thereof, of interest; (b) number data of advocates of the consumer products or services, or promotions thereof, of interest; (c) data analysis of advocates of the consumer products or services, or promotions thereof, of interest; (d) data analysis of online social media authors having positive consumer or brand sentiment for the consumer products or services, or promotions thereof, of interest in the category; and (e) data analysis of share data sets of online interest or activity acquired by the consumer products or services, or promotions thereof, of interest with respect to the subject matter associated with one or more competitors in the category.

The invention can further provide further comprising electronically utilizing on a computer system processor the actionable information data in conjunction with online research and electronically presented analytics measurements electronically provided on a networked computer system selected from the group consisting of: quantitative and qualitative market research; paid media tracking; and website analytics; sales information; public relations information; advertising information; investor relations; brand management; and product development information.

The invention can further provide further comprising electronically identifying and contacting authors of online social media based on the actionable information.

The invention can further provide further comprising electronically identifying and contacting one or more representatives of online social media websites.

The invention can further provide wherein the actionable information data provided to companies, organizations, and governmental agencies includes real-time alerts providing information about customer service or quality issues relating to the company's products or services, or a competitor's competing product or service.

The present invention relates in certain aspects to a one or more of method, apparatus, non-transitory computer readable storage medium, computer system, network, or system is provided for a consumer feedback social media analytics platform for providing analytic measurements data of online consumer feedback for products or services of past, present or future customers, users, and/or target markets, for companies, organizations, government agencies, and the like by electronically collecting and analyzing, on a networked computer system using a processor, qualitative or quantitative online social media online communications, activity, and other online communications and activity, relevant to consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof.

The present invention also provides in certain aspects one or more of a method, apparatus, non-transitory computer readable storage medium, computer system, wireless or wired network, or system to provide a delivery system for consumer feedback relating to products or services, or promotions thereof, for companies, organizations, and/or government agencies, that provides actionable information or data relating to products or services, advertisers, brands and/or other third parties to in order to conduct information dissemination or advertising to improve or comment on the perception or ratings of their or other's products or services, or promotions thereof, using mobile or internet social media, promotions or offers, or other information dissemination, which can optionally include impressions tracking and analysis, location information, 2D and 3D mapping, social media, and user behavior and information for generating mobile and internet posted information, social media content, promotions or offers for, and/or sales of, products and/or services.

The invention can further provide in certain aspects a method or system for generating mobile, wireless, and internet posted, location based, customized information, social media content, promotions or offers for products or services, or promotions thereof, to improve or change consumer feedback, perceptions, ratings, or interest, or monitoring, of products, services, or promotions thereof, using a consumer feedback social media analytics platform for providing analytic measurements data of online consumer feedback for products or services of past, present or future customers, users, and/or target markets, for companies, organizations, government agencies, and the like by electronically collecting and analyzing, on a networked computer system using a processor, qualitative or quantitative online social media online communications, activity, and other online communications and activity, relevant to consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof.

The method, apparatus, computer readable media, or system can optionally include the use of one or more of (i) impressions data, (ii) location information data, (iii) 2D and 3D mapping data, (iv) user internet activity data; and (v) social networking interaction data, the method, apparatus, computer readable media or system comprising one or more of:
- (a) electronically assigning, on an electronic computing system via a processor, a unique identifier to a user of a client mobile device or client computer receiving a request from said user, through a client application operating on the client mobile device or computer, to access a location based, customized, promotion or offer comprising website or window, the request including the identifier assigned to the user or the client;
- (b) electronically providing to said user, via a mobile or wireless device or computer, mobile and internet posting of said location based, customized consumer feedback social media analytics platform for providing analytic measurements data of online consumer feedback for products or services of past, present or future customers, users, and/or target markets, for companies, organizations, government agencies, and the like by electronically collecting and analyzing, on a networked computer system using a processor, qualitative or quantitative online social media online communications, activity, and other online communications and activity, relevant to consumer products or services, or promotions thereof, of interest, wherein said qualitative or quantitative online social media online communications, activity, and other online communications and activity are selected based on data comprising one or more selected from the group consisting of:
  - (i) impressions data comprising tracking and analysis of website access of said user's, target markets' users, demographic groups or geographic data;
  - (ii) location information data relating to selected;
    - (a) users, target markets, demographic groups or geographic data;
    - (b) (1) products or services; or (2) product or service providers; and
    - (c) points of interest near or associated with (1) said users, target markets, demographic groups or geographic data; (2) said products or services; or (3) said product or service providers;
  - (iii) 2D and 3D mapping data related to selected:
    - (a) user, target market or demographic group locations or associated locations; or
    - (b) product or service or service provider locations or associated locations;
  - (iv) user Internet activity data relating to user searching, browsing, purchases, location, interactions, and interests;
  - (v) social networking data of interactions between said user and other users, target markets, and demographics groups and geographic data; and
  - (vi) generated marketing and mapping data of relationships between members of a social network or website, wherein the consumer feedback, consumer data, or impression data can include browser tracking and/or cookies.

The invention can optionally further include wherein said selection comprises electronically collecting and analyzing behavior information of said user, said behavior information comprising one or more selected from: (a) said impressions tracking and analysis; (b) said location information; (c) said 2D and 3D mapping; (d) said user internet activity; and (e) said social networking interactions.

The invention can optionally further include wherein said location based, customized information, social media content, promotions or offers are selected from the group consisting of a coupon, an advertisement, a location-based promotion, a location-based offer, a location-based discount, a daily deal ad, location-based advertising, a location-based ad, a location-based deal or offer, a mobile ads, a mobile ad network, mobile advertising, mobile location-based advertising, a customer loyalty card, a discounts, a promotion, an offer, a location-based promotion, an online or mobile coupon or promotion, mobile location-based advertising, a promotions or offers associated with a location or a map in a social network or website online or mobile device, a location-based mobile coupon, a mobile grocery coupon, a mobile ad products, a targeted mobile ad, a mobile advertising network, and a mobile coupon.

The invention can optionally further include wherein said mobile device or wireless device is selected from the group consisting of a smart phone, a tablet device, a cell phone, a mobile internet device, a netbook, a notebook, a personal digital assistant, an internet phone, a holographic device, a holographic phone, a cable internet device, a satellite internet device, an internet television, a DSL internet device, and a portable internet access device or computer.

The invention can optionally further include wherein said information, social media content, promotions or offers comprise or are displayed as one selected from the group consisting of social media advertising impressions, text impressions, or tweet ad impressions, online marketplace ad impressions, online marketplace video impressions, online auction ad impressions, share ad impressions, online print media ad impressions, telecommunication ad impressions, online coupons, position-based services, ad links, location-based services, location-based promotions, location-based offers, location-based coupons, location information data, social media content, promotions or offers in connection with an online or mobile news feed, location-based discounts or daily deal ads, location-based advertising, location-based ads, location-based marketing, location-based commerce, location-based deals and offers, mobile ads, mobile ad network, mobile advertising, mobile commerce, mobile location-based advertising and promotions or offers, mobile banking and mobile wallet services, customer loyalty cards, discounts and promotions or offers and online or mobile payment system for coupons, location-based promotions, location-based offers, location-based coupons, location information data, social media content, promotions or offers in connection with an online or mobile news feed or offers and online or mobile coupons and information, social media content, promotions or offers for products and/or services, discount ad impressions, impressions, social media web impressions or similar types of position-based services, ad links, location-based promotions, location-based offers, location-based coupons, location information data, social media content, promotions or offers in connection with an online or mobile news feed, location-based offers, location-based coupons, location information data, social media content, promotions or offers in connection with an online or mobile news feed, discount ad impressions, merchant ad impressions, email coupon impressions, merchant ads, video clip ads, video upload or presentations site ads or links, B2B ad impressions, B2C ad impressions, B2B social medial communication impressions, gambling ad impressions, gambling site impressions, sports or sports related ad impressions, sports gambling ads, multiplayer online game ads, virtual ads, digital ads or virtual billboard ads or virtual ad impressions through the use of digital technology to insert virtual advertising images on a virtual landscape or into a social network, social networking websites or third party websites or applications, live or pre-recorded television show or video or sporting event and online or mobile coupons and information, social media content, promotions or offers for products or services, operating through credit cards or other payment services, automatically giving users discounts on their purchases at participating merchants, virtual or digital advertisements, banner ads, graphic color ads; information, social media content, promotions or offers inserted or overlays on images in a social network or website online or mobile device, social video sharing impressions, video ad impressions, audio-video & photography impressions, near field communication (NFC), NFC impressions, NFC boarding pass impressions, mobile boarding pass impressions, payment and tracking passenger impressions, aggregator impressions, viral impressions, any language or translated into any language impressions, sports ad impressions, brand impressions, global brand impressions, product impressions, goods impressions, gambling impressions, auction impressions, real estate impressions, shopping impressions, sports impressions, travel & hospitality impressions, social gaming impressions, autos & vehicles impressions, pets & animals impressions, online communication impressions, education impressions, services impressions, social tracking impressions, social shopping impressions, sharing on a social networking system digital content impressions, mobile social video sharing impressions, virtual world ad impressions, video game impressions, in-game advertising impressions, location-based ads, mobile browser ad impressions, mobile web ad impressions, widgets or widget ad impressions, bookmark ad impressions, tab impressions, web feed impressions, tabbed browsing ad impressions, page zooming ad impressions, ad-sponsored link impressions, auction impressions, multiple platform website ads, interactive content marketing impressions via a mobile device or other similar device or android device or tablet device or mobile internet devices or holographic devices or mercatot cell phones, (e.g. holographic phone) or other non-phone connected device or computer ads, context syncing, across one or multiple platforms, stream search ad impressions, communications, monetization, monetize mobile usage online media business impressions, video or voice chat ad impressions, social hang out impressions, demographic impressions, name impressions, age impressions, gender impressions, relationship status impressions, country and city impressions, location impressions, education related and/or services impressions, social tracking impressions, work impressions, interests & topics impressions, email ad impressions, photo blogging impressions, floating ad impressions, expanding ad impressions, polite ad impressions, wallpaper ad impressions, trick banner impressions, pop-up impressions, pop-under impressions, social video sharing impressions, video ad impressions, audio-video & photography impressions, sports ad impressions, brand impressions, global brand impressions, product impressions, goods impressions, gambling impressions, auction impressions, real estate impressions, shopping impressions, sports impressions, travel & hospitality impressions, social gaming impressions, autos & vehicles impressions, pets & animals impressions, online communication impressions, education impressions, services impressions, social tracking impressions, social shopping impressions, sharing on a social networking system digital content impressions, mobile social video sharing impressions, map ad impressions, mobile ads, mobile ad network, mobile advertising for mobile publishers and advertisers and mobile commerce, mobile location-based advertising and information, social media content, promotions or offers associated with location or maps in a social network or website online or mobile device, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, superstitials impressions, interstitial ad impressions, e-mail advertising impressions, display advertising impressions, social media behavior marketing impressions, social media shopping impressions, social media ad impressions, social brand recognition impressions, social media shopping, e-mail marketing impressions referral marketing impressions, referral marketing impressions, affiliate marketing impressions, inbound marketing, video marketing, one-to-one marketing impressions, niche marketing impressions, behavior impressions, affiliate marketing impressions, semantic advertising impressions with two or three dimensional images on geospatial platform using cloud-type configuration and using cloud services in combination with geo-mapping, web mapping, 2D and 3D mapping, GPS, location mapping, social mapping, digital mapping, 3D holographic mapping or mobile mapping technologies, in conjunction with social networking, a social networking environment, social networking interactions between members, to generate marketing and mapping relationships between members of a social network or website, social networking websites, or third party websites or applications.

The invention can optionally further include wherein said third party is selected from a government agency, a credit reporting agency, a social network, a website, a service provider, an auction site, a company, an educational or financial institution, bank, a lender or mortgage company, an auto company, or a regulatory agency according to applicable laws and regulations.

The invention can optionally further include wherein said company is selected from the group consisting of a financial services company, a product company, a services company, a social network, a website, a service provider, an auction site, a company, a brand merchant or retailer, a real estate company or related services, an educational or financial institution or bank, an entertainment company, an online penny or online auction, or other type of service company.

The invention can optionally further include wherein said first promotional data set further comprises statistics of gifts selected from the group consisting of donations, humanitarian aid, and sustainable gifts, made by one selected from the group consisting of said end users, said members, advertisers, brands, organizations, and companies.

The invention can optionally further include wherein said method further comprises providing said first promotional data sets to one selected from the group consisting of said end users, said members, other end users or members, advertisers, third parties; and wherein said impressions include social impressions.

The invention can optionally further include wherein said method further comprises: (I) said user designating a portion of a purchase of said product or service as a donation to; or (II) providing said user with website links to: donation related advertisers, brands, organizations or companies that provide donations comprising charitable contributions, humanitarian aid, sustainable gifts or loans.

The invention can optionally further include wherein said product or service is a brand merchant or retailer for user/consumer, products, e-commerce, retail, media & entertainment, business, government, sports, travel & hospitality, real estate, educational services, sport services, entertainment shopping services, online gambling services, online penny and online auction services, service provider services, business center services, social network, website or affiliate services.

The invention can optionally further include selecting a third company/brand/social/global link category for a second position of the company/brand/social/global link promotional data set, where the third company/brand/social/global link category is different from the one or more identified second company/brand/social/global link categories.

The invention can optionally further include wherein: the company/brand/social/global link promotional data set is associated with a web page; and the company/brand/social/global link categories are ordered by capturing, processing, analyzing and filtering relevance, social content marketing, social contextual ads and connections among said users, members, or their friends, family, acquaintances, classmates, or business associates; user-contributed information, mood recording impressions & updating, friend communications and blog impressions and focused marketing and those interactions are used to select targeted location-based promotions, location-based offers, location-based coupons, location information data, social media content, promotions or offers in connection with an online or mobile news feed for the user or member of a social network or website, and connecting them with the brand or advertiser to the web page.

The invention can optionally further include wherein identifying one or more second company/brand/social/global link categories using one or more correlation criteria further comprises: identifying one or more company/brand/social/global link categories having a correlation measure that is less than a correlation threshold.

The invention can optionally further include wherein at least one second company/brand/social/global link category has a separate correlation measure for at least one pair-wise combination of a category identifier associated with the at least one second company/brand/social/global link category and a category identifier associated with the first company/brand/social/global link category.

The invention can optionally further include wherein said access in step (a) is subject to identity verification.

The invention can optionally further include wherein social networking is provided as one selected from social shopping, social networking interactions, access to social networking websites or third party websites or applications, social plugins, social or business applications, SSLs, cookie and mobile cookie, browser cookie, advertising cookie, cookie-based targeting, flash cookie, location-based cookie and other third party cookie, and embedded advertisements.

DETAILED DESCRIPTION

Figure 1:
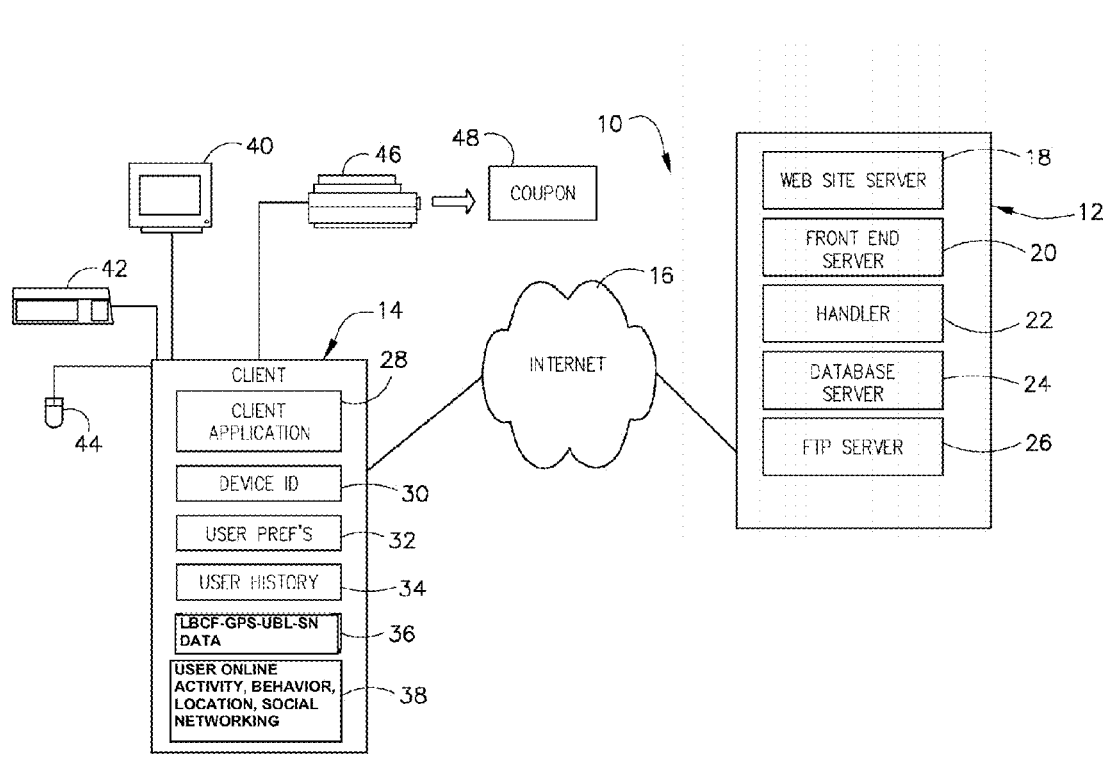
FIG. 1 is a diagrammatic and block diagram view of a method or system for mapping display of Location Based Customer Feedback for Global Products or Services based on User Behavior and Location and Social Networking, ("LBCF-GPS-UBL-SN") system, according to an exemplary embodiment.

The present invention relates to a one or more of method, apparatus, non-transitory computer readable storage medium, computer system, network, or system for providing and/or using a consumer feedback social media analytics platform including methods, apparatuses, and computer-readable media for providing analytic measurements data of online consumer feedback for global brand products or services by electronically collecting and analyzing on a networked computer system using a processor qualitative or quantitative online consumer feedback for products or services via online activity, communications, location information data, and social media content relevant to consumer products or services, or promotions thereof, of interest, optionally in a category, optionally from one or more online user online activity and social media sources, in order to provide targeted, location based, 2D or 3D mapped, or impressions to generate online location information data or promotions to provide improved or desired customer perception or sentiment regarding a company's products, services or promotions thereof, wherein the consumer feedback, consumer data, or impression data can optionally include browser tracking and/or cookies.

For example, if a global brand has 17,000 locations worldwide wherein they are collecting, managing and providing real-time or near real-time relevant information processing on a computer system processor of the online consumer feedback data for products or services via online activity, communications, location information data, and social media content to electronically determine on a computer system processor frequency data of occurrence of one or more topics in conjunction with the consumer products or services, or promotions thereof, of interest and relatedness of the one or more topics to the consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof, wherein the consumer feedback, consumer data, or impression data can optionally include browser tracking and/or cookies.

The invention can further provide one or more of (i) electronically quantifying, on a networked computer system using a processor, analyzed online consumer feedback for products or services, provided via online activity, communications, location information data, and/or social media content, optionally including (ii) performing statistical analysis on the online communications and activity to obtain the analytical measurements of the online social media content, and/or (iii) electronically providing actionable information data to companies, organizations, and governmental agencies, based on quantified and/or analyzed online consumer feedback for products or services via online activity, communications, location information data, and social media content, in order to provide targeted, location based, 2D or 3D mapped, or impressions to generate online location information data or promotions to provide improved or desired customer perception or sentiment regarding a company's products, services or promotions thereof.

The actionable information data can optionally include consumer or brand sentiment expressed data among online internet activity and social media participants concerning consumer products or services, or promotions thereof, of interest in one or more categories, in order to provide targeted, location based, 2D or 3D mapped, or impressions to generate online location information data or promotions to provide improved or desired customer perception or sentiment regarding a company's products, services or promotions thereof. The actionable information data may be retrieved based on real-time measurements of the online social media sentiment expressed data among the online social media participants. The actionable information data may also be retrieved based on historical data representing quantitative measurements of the consumer or brand sentiment expressed data among online internet activity and social media participants in the past.

Embodiments also assign a consumer or brand sentiment rating to each of the online consumer feedback for products or services via online activity, communications, location information data, and social media content referring to the consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof.

Embodiments optionally can present one or more aspects of analytic measurements data of online consumer feedback for products or services, or promotions thereof, optionally provided via online activity, communications, location information data, and social media content, optionally displayed or communicated electronically and/or in a graphical user interface (GUI), optionally in an intuitive and/or user-friendly manner at different levels of detail, levels, layers, and/or granularity that optionally provides, enables, displays or communicates one or more aspects of the quantified online consumer feedback for products or services, optionally grouped, organized, and/or filtered in a one or more of default and/or customizable presentations or displays.

In one embodiment, the user interface or GUI is a mobile, web- or cloud-based service or product. In alternative embodiments, the user interface or GUI can optionally be provided as a mobile or cloud based browser-based interface hosted by a behind-the-firewall hardware or software.

DEFINITIONS 2D and 3D Mapping, refers to any type of mapping of any user, product provider, service provider, target market, or demographic group location, e.g., but not limited to GPS, GIS, mapping, holographic mapping, 2D mapping, 3D mapping, triangulation, digital mapping, social mapping, position based mapping, web mapping, location mapping, mapping technologies, mobile mapping, and the like, as defined herein and/or as known in the art.

Ad Impressions can include a measurement of responses from an ad delivery system to an ad request from the user's browser. Impression Share includes the percentage of searches on all keyword impressions, revenue or revenue sharing impressions in the keyword group that the advertiser was found on the first page of sponsored listings. Ad Impressions include the count of ads, which are served to a user. Ads can be requested by the user's browser, (referred to as pulled ads) or they can be pushed, such as e-mail ads. Ad impressions are a measurement of responses from an ad delivery system to an ad request from the user's browser, which is filtered for robotic activity and is recorded at a point at late as possible in the process of delivery.

Advertising Network is a company that connects advertisers to web sites that want to host advertisements online or via a mobile device.

Ad Server, can include ad servers for publishers that are designed to maximize ad revenue for the publisher. There are ad servers for advertisers, marketers and agencies that help advertisers in campaign management. There are ad servers for ad networks, which are similar to ad servers for publishers with the additional feature on which publishers are making money and which ones are not.

Advertisements or Advertising, advertisements can include any type of Promotion of Offer in any form of any online or mobile coupons and information, social media content, promotions or offers for products and/or services.

Advertising Application Programming Interfaces (APIs) in a Cloud-Type Configuration and Using Cloud Services, non-limiting examples include, but are not limited to, include is a specification intended to be used as an interface by software components to communicate with each other.

Affiliate Marketing Impressions include is a type of performance-based marketing in which a business rewards one or more affiliates for each visitor customer brought about by the affiliate's own marketing efforts.

Aggregator, people consume content through socially powered aggregators and curators.

Banner Ads, non-limiting examples include, but are not limited to, is a form of advertising on the world wide web delivered by an Ad server. This form of online advertising entails embedding into a web page.

Behavior Information means any information relating to, the activity of (including online activity), interests of, preferences of, browsing or purchasing information of, relationships of, Impressions, locations or preferred locations, social networking information of, and the like, of one or more of a user, a group of users, member or group of members, target markets, demographic groups or geographic data, social networking group, and the like.

Behavioral Targeting, In addition to contextual targeting, online advertising can be targeted based on a user's online behavior. This practice is known as behavioral targeting.

Brand Ads, it is advertising with a strong emphasis on the company brand (logo and/or company name) also known as integrated marketing communications (IMC). Brands use social channels to deliver customer service driven activities.

Browser Tracking, Web analytics is the measurement, collection, analysis and reporting of Internet data for purposes of understanding and optimizing web usage. It is often done without the permission or knowledge of the user, in which case—particularly with third party cookies which can be shared between different web sites—it can be a breach of privacy. Web analytics applications can help companies measure the results of traditional print advertising campaigns. It helps one to estimate how traffic to a website changes after the launch of a new advertising campaign. Web analytics provides information about the number of visitors to a website and the number of page views.

Channels, a distributed social network channel is an Internet social network service that is decentralized and distributed across different providers. The emphasis of the distribution is on portability a, interoperability and federation capability. It contrasts with social network aggregation services, which are used to manage accounts and activities across multiple discrete social networks.

Communications, social media communications online includes web-based and mobile-based technologies, which are used to turn communications into interactive dialogue among organizations, communities, and individuals that allow the creation and exchange of user-generated content.

Computer Surveillance, Computer surveillance is the act of performing surveillance of computer or mobile activity and of data stored on a hard drive or being transferred over the Internet.

Cookies, A cookie, also known as an HTTP cookie, web cookie, or browser cookie, is usually a small piece of data sent from a website and stored in a user's web browser while a user is browsing a website. When the user browses the same website in the future, the data stored in the cookie can be retrieved by the website to notify the website of the user's previous activity. Cookies were designed to be a reliable mechanism for websites to remember the state of the website or activity the user had taken in the past. This can include clicking particular buttons, logging in, or a record of which pages were visited by the user even months or years ago.

Coupon, in marketing, a coupon is a ticket or document that can be exchanged for a financial discount or rebate when purchasing a product.

Demographic Group means any group for promotions or offers, networking, or any communication that is based on selected criteria, e.g., but not limited to, one or more of age, gender, location, associated attributes, interests, profile, buying or browsing activity or behavior, and the like.

Device Type Ads, are target ads based on the user's device type.

Digital Mapping, is the process by which a collection of data is compiled and formatted into a virtual image. The primary function of this technology is to produce maps that give accurate representations of a particular area, detailing major road arteries and other points of interest (which can be used according to the present invention further including the use of 2D, 3D, GPS, mobile mapping, and location mapping).

Digital Promotions or Offers, is a form of promoting that uses the Internet and world wide web to deliver marketing messages via the web or mobile to attract customers.

Display Advertising, Display advertising appears on web pages in many forms, including web banners.

Education related product and/or services refers to anything that can be included in one or more educational related activities, e.g., education related and/or services products, goods or services that can include any known or potential educational related activity, institution, company, agency, entity, and the like, at any level, e.g., pre-school, elementary school, middle school, a high school, prep school, boarding school, a college, a business, a non-profit company or any other group of people who may desire to association with each other, a university, recreational, professional, local, city, county, state, region, Province, country, union, league, associated, or group of countries, continental, hemisphere, or any other grouping of any of the above, e.g., company, collegiate or professional. Educational related refers to any type or educational related endeavor.

Filtering, is the number of keyword impressions, revenue or revenue sharing impressions in the keyword group that the advertiser was found on the first page of sponsored listings across the World Wide Web on a computer, mobile device or other devices.

Geo-Coding, geo-coding refers to a process of taking non-coordinated based geographical identifiers, such as a street address and finding associated geographic coordinates across the world wide web on a computer, mobile device or other devices. Geo-Location, (IP) Ads, are targeted ads based on the user's location as defined by their device IP address.

Geographic Data, data created in a social network in connection with a location or map.

Geo-Location, (Key Value) Ads, are target ads based on the user's location as defined by registration data passed from the app in the ad call.

Geolocation, Geolocation is the identification of the real-world geographic location of an object such as a radar, mobile phone or an Internet connected computer terminal, online coupons, promotions or offers, in real time.

Geolocation may refer to the practice of assessing the location or the actual assessed location.

Geospatial Analysis is an approach to applying statistical analysis and other informational techniques to geographically based data. Such analysis employs spatial software and analytical methods with terrestrial or geographic datasets, including geographic information systems and geomatics.

Giving Back, Social Shoppers can optionally be able to help those who have been impacted by a natural disaster, live in impoverished conditions or are less fortunate in the world, such as to provide microloans or microcredit, humanitarian aid and sustainable gifts to those in need and support other worldly causes in developing countries and charities in their communities and local and global causes around our planet and other relief efforts for natural and man-made disasters.

Geo-Targeted Ads, is a method of determining the geo-location of a website visitor and delivery different content marketing impressions or ads to that visitor based on his or her location impressions, such as country, region/state, city, metro code/zip code, organization, IP address, ISP or other criteria across the world wide web on a computer, mobile device or other devices.

GIS Technologies, is a system designed to capture, store, manipulate, analyze, manage and present all types of geographical data.

Global Brand Ads, A brand is a "Name, term, design, symbol, or any other feature that identifies one seller's good or service as distinct from those of other sellers." Branding began as a way to tell one person's cattle from another by means of a hot iron stamp. A modern example of a global brand is Coca Cola™, which belongs to the Coca-Cola Company™.

GPS Technologies, is a space-based satellite navigation system that provides location and time information in all weather, anywhere on or near the Earth, where there is an unobstructed line of sight to four or more GPS satellites.

Groupware, groupware software allows subjects to share data such as files, photos, text, etc.

Impression(s), also called a view or an ad view, is a term that refers to the point in which an ad is viewed once by a visitor, or displayed once on a web page. The number of impressions of a particular advertisement is determined by the number of times the particular page is located and loaded. It is a measurement of how many times an advertising placement would be served up on a web site on a computer, mobile device or other device. Impression refers to any type of Impression as described or defined herein, or as known in the art.

Instant Messaging, an instant messaging application or client allows one to communicate with another person over a network in real time, in relative privacy. One can add friends to a contact or buddy list by entering the person's email address or messenger ID.

Interactive Advertising, uses online or offline interactive media to communicate with user/consumers and to promote products, brands, services and public service announcements, corporate or political group.

Internet Forums, Internet forums allow users or members to post a "topic" for others to review. Other users or members can view the topic and post their own comments in a linear fashion, one after the other.

Internet Marketing, also known as web marketing, online marketing, advertising or e-marketing is referred to as the marketing, (general promotion) of products or services over the Internet.

Keyword Impressions, is the percentage of keyword impressions in the keyword group that the advertiser was found on the first page of sponsored listings at least once.

Like or Dislike Impressions, in online communities (social networking or media sharing experiences across a broader range of devices, create and maintain user engagement portals, e.g., Facebook™ or YouTube™), dedicated visual GUI elements (icons, buttons, etc.) provide for users or members the options to "like" certain persons, groups, pages, status, posts, comments, published links, videos, photos, etc., thus displaying their personal attraction, acknowledgement or sympathy with the "liked" object and this "liked" status will be constantly displayed. Sometimes communities apply a "dislike" option (as opposed to "like"), some even make possible to withdraw one's "like."

Location-Based Advertising, non-limiting examples of location-based advertising include a new form of advertising that integrates mobile advertising with location-based services (which can be used according to the present invention further including the use of 2D, 3D, GPS, mobile mapping, and location mapping) and online or mobile payment system for coupons, location-based promotions, location-based offers, location-based coupons, location information data, social media content, promotions or offers in connection with an online or mobile news feed and online or mobile coupons and information, social media content, promotions or offers for products and/or services. The technology is used to pin-point user/consumer's location and provide location specific geotargeted or geotagged advertisements on their mobile device.

Location-Based Commerce, (L-Commerce) refers to the localization of products and services through mobile commerce and context aware computing technologies. L-commerce revolves around 5 key service areas: a) Location: determining the basic position of a person or a thing; b) Navigation: plotting a route from one location to another; c) Tracking: monitoring the movement of a person or a thing; d) Mapping: creating maps of specific geographical locations; e) Timing: determining the precise time at a specific location; f) Providing location-based services involves several technologies; g) Position Determining Equipment (PDE) —identifies location of mobile device. h) Mobile Positioning Center (MPC) —a server that manages the location info from PDE; i) Geographic Information System (GIS) —geographic contents consists of streets, road maps, addresses, and points of interest; and j) Location-specific content—used in conjunction with geographic content to provide the location of particular services.

Location-Based Deals and Offers, non-limiting examples of location-based deals and offers are based upon where you are and online or mobile payment system for coupons, location-based promotions, location-based offers, location-based coupons, location information data, social media content, promotions or offers in connection with an online or mobile news feed and online or mobile coupons and information, social media content, promotions or offers for products and/or services. The technology is used to pinpoint user/consumer's location and provide location specific geo-targeted or geo-tagged advertisements and/or location-based promotions, location-based offers, location-based coupons, location information data, social media content, promotions or offers in connection with an online or mobile news feed across the web and on mobile device (which can be used according to the present invention further including the use of 2D, 3D, GPS, mobile mapping, and location mapping).

Location-Based Services, can include but are not limited to, a general class of computer program level services used to include specific controls for location and time data as control features in computer programs and online or mobile information, social media content, promotions or offers and/or payment systems for location-based promotions, location-based offers, location-based coupons, location information data, social media content, promotions or offers in connection with an online or mobile news feed and online or mobile coupons and information, social media content, promotions or offers for products and/or services (which can be used according to the present invention further including the use of 2D, 3D, GPS, mobile mapping, and location mapping).

Location Mapping is the place or point that something is at and closely related to location-based services and includes a check-in feature that ties in social networking integration and location-based services (which can be used according to the present invention further including the use of 2D, 3D, GPS, mobile mapping, and location mapping).

Mapped Ads, includes a form of advertising in which information or products or services are added to online mapping services.

Mapping, Mapping usually refers to map-making and often used instead of cartography. Mapping term is also sometimes used for geospatial data collection (e.g. LIDAR mapping) but in fact it is not mapping because a map is created through some cartographic works (i.e. determining the scale/level of detail and content of geographic or cartographic database, entry criteria and symbol specification for geospatial objects, generalization, layout design etc.). In other words, the acquisition of data with (geographic) coordinates directly from terrain or imagery does not mean mapping but surveying.

Microloans or Microcredit Market, is an extension of very small loans to those in poverty designed to spur entrepreneurship.

Mobile Ads with Location or Maps in a Social Network or Website Online or Mobile Device, a form of advertising via mobile or wireless device or electronic device or mobile devices or computer relating to mobile advertising through a mobile ad network, mobile advertising for mobile publishers and advertisers and mobile commerce, mobile location-based advertising and information, social media content, promotions or offers associated with location or maps in a social network or website online or mobile device.

Mobile Banking or Mobile Wallet Services, mobile payment services operated under financial regulation and performed from or via a mobile device. Mobile payment or mobile wallet services is an alternative payment method.

Mobile Browser, also called a micro-browser, mini-browser or wireless Internet browser is a web browser designed for use on mobile devices or computer such as a mobile phone or PDA.

Mobile Device Communication Standards: Global System for Mobile Communications (GSM) and IS-95. In 3G, can be UMTS with CDMA-2000. All radio access technologies divide the finite RF spectrum among multiple users or members as efficiently as possible. GSM uses TDMA and FDMA for user and cell separation. UMTS, IS-95 and CDMA-2000 use CDMA. WIMAX and LTE use OFDM.

Mobile Location-Based Advertising & Services, location-based services are a general class of computer program-level services used to include specific controls for location and time data as control features in computer programs. As such (LBS) is an information and has a number of uses in Social Networking today as an entertainment service, which is accessible with mobile devices through the mobile network and which uses information on the geographical position of the mobile device. This has become more and more important with the expansion of the smartphone and pad markets as well.

Mobile Mapping, includes the process of collecting geospatial data from a mobile device typically fitted with a range of photographic, radar, laser, LiDAR or any number of remote sensing systems (which can be used according to the present invention further including the use of 2D, 3D, GPS, mobile mapping, and location mapping).

Mobile Messaging: Messaging, especially SMS, has been used in combination with various LBS applications, such as location-based mobile information, social media content, promotions or offers for products or services/mobile coupons/discounts to mobile subscribers, and the like, such as those who are near to advertising restaurants, cafes, movie theatres, and the like.

Mobile Search, is an evolving branch of information retrieval services that is centered on the convergence of mobile platforms and mobile phones and other mobile devices or computer. Web search engine and SEO ability in a mobile form allows users or members to find mobile content marketing impressions in a social network or on websites, which are available to mobile devices or computer on mobile networks. Mobile Search Impressions, is a measure of the number of times an ad is displayed on a via a mobile device or wireless device or electronic device, whether it is clicked on or not.

Mobile Social Networks, Mobile Social Networking is social networking where individuals with similar interests converse and connect with one another through their mobile phone and/or tablet. Much like web-based social networking, mobile social networking occurs in virtual communities.

Network Surveillance, the vast majority of computer surveillance involves the monitoring of data and traffic on the Internet.

Offer, a special offer, a kind of sales promotion or offer.

Online Advertising means any form of promotion or offer that uses the Internet and World Wide Web to deliver marketing messages to attract customers.

Online or Mobile Coupons and Information, social media content, promotions or offers for Products and/or Services means any Products, Goods, Gambling or Service described herein, or as known in the art.

Penny Auctions or Online Auctions Impressions, includes the number of penny or online auction impressions in an auction where bidders pay-per-bid for an item and the time increase with each bid.

Position-Based Services, non-limiting examples of position-based services include a typical position based service that provides information based on the current position of the user (which can be used according to the present invention further including the use of 2D, 3D, GPS, mobile mapping, and location mapping).

Prediction Markets, many predictions market tools have become available that make it easy to predict and bet on future events. This is a more formal version of social interaction, although it qualifies as a robust type of social software.

Predicting Future Behavior, or behavior is the study of when, why, how, and where people do or do not buy a product. It blends elements from psychology, sociology, social anthropology and economics. It attempts to understand the buyer decision making process, both individually and in groups. It studies characteristics of individual consumers such as demographics and behavioral variables in an attempt to understand people's wants. It also tries to assess influences on the consumer from groups such as family, friends, reference groups, and society in general.

Product means any Product described herein, or as known in the art: Non-limiting examples of Products provided through Information, social media content, promotions or offers by the present invention, can include, but are not limited to: merchandise, retail products, wholesale products, virtual products, electronics, clothing, food, water, beverages, household, commercial products, household or housing products, cleaning products, footwear, appliances, autos, trucks, motorcycles, boats, airplanes, commercial and residential construction products, music, audio, and video products, books, computers, hardware, systems, operating systems, software, products relating to mobile banking and mobile wallet services, products relating to entertainment, shopping, products relating to penny auctions or online auctions, products relating to affiliate services, products relating to e-commerce, products relating to sports, products relating to media and entertainment, musical instruments, educational products, personal & financial network products, travel & hospitality products, real estate products, educational products, sports and sporting events, products by service providers, online dating, online gambling, gaming, retail stores, virtual communities, real estate products, information on market trends and predictions, mortgage quotes, loans, auto loans, insurance, home equity loans; mortgage rates, lender quotes, real estate properties products, advertising, auto quotes, messaging, news feeds, weather, news, financial products, real estate products (e.g. leasing, buying or selling of vacant land, residential, commercial, recreational, retail, shopping malls, hotels, motels, golf courses, casinos, resorts, marinas, industrial, vacation, time shares, condominiums, multifamily, and other types of real estate, etc.), educational products, brokers, agents, relocation products, internet marketing, concierge, transportation, entertainment, travel and hospitality products, lenders, appraisers, developers, contractors, inspectors, home improvements/remodeling (home warranties, insurance, indoor and outdoor furniture, fixtures, windows, siding, roofing, heating/cooling, solar, plumbing, electrical, mechanical, and similar types) or other products, merchandizing, cleaning, transportation, financial, banking, travel, residential, commercial, governmental, auctions, estate planning, food, grocery, livestock, husbandry, veterinary, medical, cosmetic, spa, hair, resort, moving, relocation, floor coverings, furniture, copying, office, management, filing, accountant, beverage, and the like.

Product Provider means any provider (in any form, e.g., but not limited to a discover, inventor, developer, manufacturer, co-developer, marketer, distributor, wholesaler, retailer, importer, exporter, seller, reseller, auctioneer, bidder, agent, representative, and the like of any Product.

Profile Targeting Impressions, User or member profile targeting involves a target ads based on a user's profile information, which is stored during the registration process. Advertisers can choose the delivery limitation by targeting to the specific peoples. For instance, on collecting the gender, you can serve unique ads to males and females.

Product Review Impressions, non-limiting examples include, but are not limited to, a view or impression of a product review. Product Reviews are ranked in the major search engines and continue to make sales for years! Survey statistics show that approximately 83% of user/consumers say that product reviews influence their online purchasing decisions; Approximately 70% of online shoppers actively seek out product reviews before they buy; More than half of US online shoppers surveyed, read user reviews as part of their product research; Nearly 9 of 10 U.S. online buyers read reviews at least "some of the time" before making a purchase. Price Comparison Impressions, a view or impression of a price comparison "allows people to see different lists of prices for specific products." Basically it is a way to see similar products from different companies so that you can compare the price and save money.

Promotions/Promoting, as used herein the term "promotion," or "promotions," or "promoting," or "offer," "offers," or "offering," means providing any type of information in any language or translated into any language or scripting social media content in any language or translated into any language relating to any product or service for the purpose of promoting that product or service, and includes, but is not limited to, any type of Advertisement, Advertising, Ad, marketing, coupon, discount, offer, daily deal, auction, or Impression used for promotion or offer, and the like.

Online Promotion(s) means any type of Promotion or Offer in any form provided over the Internet, such as a social network or website, blog, pop up and the like, including mobile or wireless devices, as well as any Internet accessing device, including any type of computing device or computer.

Semantic Advertising, Semantic advertising applies semantic analysis techniques to web pages. The process is meant to accurately interpret and classify the meaning and/or main subject of the page and then populate it with targeted advertising spots. By closely linking content to advertising, it is assumed that the viewer will be more likely to show an interest (i.e., through engagement) in the advertised product or service.

Served Impressions, ad networks like "served impressions" as it lets them record more impressions and charge more money to advertisers.

Service means any service described herein, or as known in the art: Non-limiting examples of Services provided through Information, social media content, promotions or offers by the present invention, can include, but are not limited to: search engines or search requests; social, local, mobile search, mobile services, mobile banking and mobile wallet services, entertainment shopping, penny auctions or online auctions, affiliate services, e-commerce, sports, media and entertainment, educational, personal & financial network, travel & hospitality services, real estate, educational services, sports and sporting events, services by service providers, online dating, online gambling, gaming, retail stores, virtual communities, real estate services, information on market trends and predictions, mortgage quotes, loans, auto loans, insurance, home equity loans; mortgage rates, lender quotes, real estate properties service advertising, auto quotes, messaging, news feeds, weather, news, financial services, real estate services (e.g. leasing, buying or selling of vacant land, residential, commercial, recreational, retail, shopping malls, hotels, motels, golf courses, casinos, resorts, marinas, industrial, vacation, time shares, condominiums, multifamily, and other types of real estate, etc.), educational services, brokers, agents, relocation services, internet marketing, concierge, transportation, entertainment, travel and hospitality services, lenders, appraisers, developers, contractors, inspectors, home improvements/remodeling (home warranties, insurance, indoor and outdoor furniture, fixtures, windows, siding, roofing, heating/cooling, solar, plumbing, electrical, mechanical, and similar types) or other services, merchandizing, cleaning, transportation, financial, banking, travel, residential, commercial, governmental, auctions, estate planning, food, grocery, livestock, husbandry, veterinary, medical, cosmetic, spa, hair, resort, moving, relocation, floor coverings, furniture, copying, office, management, filing, accountant, beverage, and the like.

Service Provider means any provider (in any form, e.g., but not limited to a discover, inventor, developer, manufacturer, co-developer, marketer, distributor, wholesaler, retailer, importer, exporter, seller, reseller, auctioneer, bidder, agent, representative, and the like of any Service.

Shared Search Results, the now-conventional strategy of harnessing links and keywords to climb higher in search results has been fading for a while. Social media emerged as an alternative referral source. Google™ tweaked its quality signals to reduce the impact of strategies that manipulate search results.

Social Advertising Impressions, an impression (in the context of online advertising) is a measure of the number of times an ad is displayed, whether it is clicked on or not. Each time an ad displays is counted as one impression. Counting impressions is the method by which most Web advertising is accounted and paid for, and the cost is quoted in CPM (cost per thousand impressions). (Contrast CPC, which is click- and not impression-based.) Because of the possibility of click fraud, robotic activity is usually filtered and excluded, and a more technical definition is given for accounting purposes by the IAB, a standards and watchdog industry group: Impression—a measurement of responses from a Web server to a page request from the user browser, which is filtered from robotic activity and error codes, and is recorded at a point as close as possible to opportunity to see the page by the user.

Social Bookmarking, some web sites allow users or members to post their list of bookmarks or favorite website for others to search and view them.

Social Cataloging, social cataloging is software aimed towards academics. It allows the user to post a citation for an article found on the Internet or a website, online.

Social Content Marketing, includes recommendations of friends have a powerful influence on user/consumer interest and purchase decision impressions, shopping ad impressions, promoted trend impressions. Advertisers will include "social contextual ad impressions" with their marketing messages.

Social Distribution Channels, over time people are consuming and creating more kinds of information at a faster pace across a broader range of mobile and wireless devices.

Social Engine, Social engine refers to a web based framework and platform for developing custom social apps as well as hosting them. A social engine acts as a web operating system for developing all kinds of social networking services and projects.

Social Experiences, is where users or members engage with friends and share experiences across the world wide web on a computer, mobile device or other devices.

Social Functionality, (e.g. the Like button) is spreading from host platforms to the wider web.

Social Graph Impressions, represents the connections between people, their friends and family and interests with user/consumer data (which can include browser tracking and cookies), location and map data connecting the user/consumer and their friends with the brand or advertiser for a more interactive shopping experience.

Social Guides, a social guide recommending places to visit or contains information about places in the real world such as coffee shops, restaurants and wi-fi hotspots, etc.

Social Layers, Includes Internet or mobile access to seamless layers of location-based promotions, location-based offers, location-based coupons, location information data, social media content, promotions or offers in connection with an online or mobile news feed and online or mobile coupons and information, social media content, promotions or offers for products and/or services (which can be used according to the present invention further including the use of 2D, 3D, GPS, mobile mapping, and location mapping)

Social Mapping, Social mapping can include, but is not limited to, is the digital profile that social mapping (which can be used according to the present invention further including the use of 2D, 3D, GPS, mobile mapping, and location mapping) creates on people based on their Internet usage and social networks. Digital profiles can be created in many different ways and may contain a variety of data, including it blends both historic and current data to show what has been done and what will likely be done in the future in similar situations.

Social Network, is a social structure made up of individuals (organizations) called "nodes," which are tied (connected) by one or more specific types of interdependency and filtering of user's or member's profile and/or lifestyle preferences and preferred locations, interests, preferences or networking interests or connections or channels, social, local, mobile search, mobile services, mobile location-based advertising and promotions, mobile banking and mobile wallet services, customer loyalty cards, discounts and information, social media content, promotions or offers and online or mobile payment system, which can include but is not limited to use for location-based promotions, location-based offers, location-based coupons, location information data, social media content, promotions or offers in connection with an online or mobile news feed and online or mobile coupons and information, social media content, promotions or offers for products and/or services.

Social Networking Integration, includes social networking links, tracking, collection and/or analysis, including integrated social plugins, to interact and share the latest product or services deals with their friends, family, business associates, acquaintances and others.

Social Plug-Ins, a button placed on a website and post blogs that members can click to share their interests in a site with their friends.

Social Shopping, is a method of e-commerce where shoppers' friends become involved in the shopping experience. Social shopping attempts to use technology to mimic the social interactions found in physical malls and stores.

Social Software Applications, Social software applications include communication tools and interactive tools. Communication tools typically handle the capturing, storing and presentation of communications, usually written but increasingly including audio and video as well, which can also include tracking and predicting of online communications via a mobile device or tablet device or computer with respect to third party applications and outside social networks.

Social Tracking, a method of tracking social interactions.

Sponsored Video Ads, video offers a rich and engaging way to connect with an audience, tell a story and grow a business. When someone runs a sponsored video ad with Google™, they'll reach potential customers on YouTube™ and the Google Display Network™, and receive measurable results on their ads' performance.

Tags, non-limiting examples include, but are not limited to, an assigned to a piece of information such as an Internet bookmark, digital image or computer file.

Target Group or Target Marketing Group means any group for which information, social media content, promotions or offers are analyzed, generated or provided for.

Text Chat, Internet Relay Chat (IRC) and other online chat technologies allow users or members to join and communicate with many people at once, publically, or in groups.

Third Party Click-Throughs, third party click-throughs counts are also used by the Internet advertising industry at large to determine the effectiveness of a banner ad (its location, design, etc.). Often the click-throughs rate (i.e., the percentage of users or members who clicked on the banner after seeing it) is used as a metric to determine the cost of placing the banner ad on a particular Web page.

Tracking Impression Share, Impression share (IS) is the percentage of impressions you received divided by the estimated number of impressions you were eligible to receive. Eligibility is based on your current ads' targeting settings, approval statuses, bids, and Quality Scores. Data is available at the campaign and ad group levels.

Unique Behavioral Profile of Users or Members, profile user's web browsing behavior for the purpose of user identification.

User Comment Impressions, User comment impressions gives a user control over their comments on a social networking site. With this module users or members can administer, approve, and delete comments on nodes they create. Permissions are on a per node type basis, so it's a great way to, e.g., allow users or members to manage comments on their own blogs.

User Demographics, includes such as age, geographic location, employment, gender, educational history, interests, etc.

User Generated Content, (UGC) covers a range of media content available in a range of modern communications technologies. It entered mainstream usage during 2005, having arisen in web publishing and new media content production circles. Its use for a wide range of applications, including problem processing, news, gossip and research, reflects the expansion of media production through new technologies that are accessible and affordable to the general public. All digital media technologies are included, such as question-answer databases, video, blogging, podcasting, forums, review-sites, social networking, mobile phone photography and wikis. In addition to these technologies, user-generated content may also employ a combination of open source, free software, and flexible licensing or related agreements to further reduce the barriers to collaboration, skill-building and discovery.

User Interactions, user or member interactions with media content in a social network.

User or Member Profile, user or member profile originated with the first social portal, Shared Network subscribers. The network provided an infrastructure featuring shared servers, shared source software, shared storage and shared networks for online making connections, search analytics, data analytics, web analytics, marketing and selling products and services.

User Registration Data Ads, target ads based on any data that is entered by the user and passed from the app in the ad call.

Vertical Impressions, a view of an ad relating to vertical content including shopping, the autos industry, legal information, medical information and travel.

Vertical Search, includes the focuses on a specific segment of online content. The vertical content area may be based on topicality, media type or genre of content. Common verticals including shopping, the autos industry, legal information, medical information and travel.

Viral Impressions, are impressions on stories that get created when someone engages with a social networking page somehow. There are four types of viral impressions: fans, user post, page post and mention.

Virtual Ads, Digital Ads or Virtual Billboard Ads or Virtual Ad Impressions, includes the use of digital technology to insert virtual advertising images on a virtual landscape (which can be used according to the present invention further including the use of 2D, 3D, GPS, mobile mapping, and location mapping) or integrated into the background of a social network, social networking websites or third party websites or applications, live or pre-recorded television show or video or sporting event and online or mobile payment system for coupons, coupons and information, social media content, promotions or offers for products and/or services, operating through credit cards or other payment services, automatically give users discounts on their purchases at participating merchants.

Virtual Worlds: Virtual worlds are services where it is possible to meet and interact with other people in a virtual environment reminiscent of the real world. Thus, the term virtual reality. Typically, the user manipulates an avatar through the world, interacting with others using chat or voice chat.

Web Bot, web bot is a software program that is claimed to be able to predict future events by tracking keyword impressions, revenue or revenue sharing impressions entered on the Internet. Internet bots monitor articles, post blogs, forums and other forms of Internet chatter. Words in the lexicon are assigned numeric values for emotional quantifiers such as duration, impact, immediacy, intensity and others.

Web Feeds, or news feed is a data format used for providing users or members with frequently updated content marketing impressions.

Widgets, is a software widget for the web. A stand along application that can be embedded into third party sites by any user on a page where they have rights of authorship, (e/g. webpage blog or profile on a site).

Wikis, a wiki is a web page whose content marketing impressions can be edited by its visitors Other information or behavior data that can be used in the invention can include, but is not limited to, one or more of user, member, target market, demographic group or publisher (e.g., product or service provider) data, authentic user identity, user demographics, (e.g., but not limited to, name, age, geographic location, employment, gender, relationship status, country and city, educational history, interests & topics, and the like), profiles, or lifestyle preferences, user's social media communications online or mobile with social media content available in a social networking environment, user's or publisher's location and objects, their friends and other criteria for the purposes of user tracking technologies and generate marketing and mapping relationships between members of a social network or website, their friends, businesses and other points of interest impressions, friends' impressions, buying patterns impressions or behavior impressions, user/consumer interest and purchase decision impressions, shopping ad impressions, promoted trend impressions, social media impressions, capturing, processing, analyzing and filtering relevance, social content marketing, social contextual ads and connections among users or members, their friends, family and others, (e.g. acquaintances, close friends, family, peer groups, classmates, business associates and others, etc.), user-contributed information, mood recording impressions & updating, friend communications and micro blog impressions and focused marketing. Such behavior information and interactions can be used to select targeted location-based and customized information, social media content, promotions or offers for the user, member, target market, or demographic group.

DESCRIPTION OF EXEMPLARY EMBODIMENTS

The present invention relates to a one or more of method, apparatus, non-transitory computer readable storage medium, computer system, network, or system for providing and/or using a consumer feedback social media analytics platform including methods, apparatuses, and computer-readable media for providing analytic measurements data of online consumer feedback for global brand products or services by electronically collecting and analyzing on a networked computer system using a processor qualitative or quantitative online consumer feedback for products or services via online activity, communications, location information data, and social media content relevant to consumer products or services, or promotions thereof, of interest, optionally in a category, optionally from one or more online user online activity and social media sources.

Embodiments provide analytic measurement of online consumer feedback for products or services via online activity, communications, location information data, and social media content for users such as global enterprises, advertising agencies, sales and marketing departments, media companies, government agencies, and virtually any entity requiring real-time or near real-time access to such information. This online consumer feedback for products or services via online activity, communications, location information data, and social media content is quantified and provided in a relevant and user-friendly manner to these entities using an interface such as a graphical user interface (GUI). These embodiments provide both historical and current measurements to enable analysis of past and present information. Online consumer feedback for products or services via online activity, communications, location information data, and social media content is collected, sorted, and provided to relevant groups or entities. Certain embodiments describe a consumer feedback social media analytics platform for collecting and converting raw online consumer feedback for products or services via online activity, communications, location information data, and social media content into actionable information data to companies, organizations, and governmental agencies that can be used to increase the top-line growth and margins of its recipients. Additionally, this analyzation of social media information can be analyzed to determine trends in one or more of the above discussed categories.

Monitoring and analyzing this new information source may be used on its own or in conjunction with traditional research and measurements such as, for example, quantitative and qualitative market research, paid media tracking, and traditional web site analytics. This process is automated so that qualitative measurements can be analyzed, quantified, and presented with minimal human intervention. At least certain embodiments contemplate a collecting process referred to herein as "scraping" where social media sources are discovered or located and exploited for relevant information. The content is then analyzed and quantified in a manner relevant to the industry or other category. The analyzed and quantified online consumer feedback for products or services via online activity, communications, location information data, and social media content is then provided to the user of the social media analytics (SMA) platform in an efficient, timely and user-friendly manner using the interface. In one embodiment, the interface is user-specific.

Examples of the quantitative online consumer feedback for products or services via online activity, communications, location information data, and social media content data that can be provided by embodiments include: brand and product/service consumer or brand sentiment for users and their competition; the share of voice of the brand (e.g., volume of discussion about the brand, product or service) over the social media versus the competition; topics and keywords used by online discussion participants for the brand and the competition; information on the opinion leaders for the category (e.g., online social content authors with the most influential voices); top websites resulting from the brand search; automated alerts for changes in consumer or brand sentiment; keywords, terms or phrases in posts to the online social media websites; and much more. This information is analyzed, quantified, and provided to users in real-time or near-real-time for the purpose of, for example, marketing, public relations, advertising, sales, customer service, brand management, product development, investor relations, and so on. The result of this process is to provide highly relevant and timely actionable information data to companies, organizations, and governmental agencies to users of the SMA platform.

This information may be advantageous for several reasons including brand and product/service perception or consumer or brand sentiment analysis, trend recognition and opportunity identification, early warnings about customer service or quality issues, opinion leader identification and engagement, competitor monitoring, and optimized online advertising to name a few. This information allows users to quantify opinion on social media sites to gain insights into current consumer or brand sentiment about the users' products or services, brands, and technologies and those of their competitors. This information also enables users of the SMA platform to recognize trends in consumer buzz about new technologies, product or service types, and attributes. In addition, users may receive early-warning signs to identify dissatisfied customers. Users also may identify and target opinion leaders for a given product/service or category using this information. Embodiments of the SMA platform can also supplies users with a list of highly relevant websites where high-affinity users are exchanging opinions and making purchasing decisions. This information can also be made widely available inside users' organizations using an interface to push analytics to potentially everyone inside the organization instead of just the top-level marketing staff enabling entire organizations to establish an overall better sense of the voice of their customers and to make informed decisions at the customer level because embodiments focus on the social behavior of potential customers using online user online activity and social media sources and provide far better insight into commercially relevant interests.

The present invention provides in one aspect a system and method for providing actionable consumer feedback including consumer sentiments on products or services, or promotions thereof, to companies, organizations, and/or governmental agencies, to provide location based, targeted, actionable information using combined technologies for interactions using tracking, predicting, and implementing online user/consumer behavior information or internet activity across the web or in conjunction with social networking, for global brands and branding, and promoting or selling products or services, optionally on a 2D or 3D mapping display, to provide Location Based Customer Feedback for Global Products or Services based on User Behavior and Location and Social Networking ("LBCF-GPS-UBL-SN").

The use of geospatial, web mapping, 2D and 3D mapping, GPS, location mapping, social mapping, digital mapping, 3D holographic mapping and/or mobile mapping technologies with for associating information to specific places can included, but it not limited to, one or more of: Live links to places and events; Data on the landscape; Zoom to birds-eye and human scale ad view impressions; 3D custom audio/visual content marketing impressions; Interactive 360 panoramas; Fly-through tours with content marketing impressions, narration, music; Stunning imagery and videos; 3D buildings and landscaping, e-commerce and mobile banking tools and hooks; Advertising on the landscape; Advanced search for private and public information; Social shopping and social networking, social networking interactions between members and generate marketing and mapping relationships between members of a social network or website, social networking websites or third party websites or applications; Self-posting for uploading user generated content marketing impressions; Custom tools, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions and widgets; and the like. Connecting buyers and sellers with User/consumer, E-commerce, Retail, Media & Entertainment, Business, Government, Sports, or Education related and/or Services for Products, Goods, Gambling, Auctions, Shopping, Sports, Autos & Vehicle, Pets & Animals, Online Communication, Education related and/or Services with users or members or social shoppers known as "Social Shoppers" in real-time on a geographical area across one or multiple social layers that are displayed as graphic animated color overlays on a three dimensional images on geospatial platform using geospatial mapping technology." The invention can also provide mobile payment method and/or system for effectuating an online payment through a computer or via a mobile device, wireless device or other similar device or android device or tablet device or mobile internet devices or holographic devices or holographic phone or non-phone connected device, (e.g. tablets, e-readers and MP3 players) to complete an e-commerce, online purchase, mobile payment, mobile banking and mobile wallet transactions on a three-dimensional geospatial platform using geospatial, web mapping, 2D and 3D mapping, GPS, location mapping, social mapping, digital mapping, 3D holographic mapping and/or mapping technologies.

The present invention thus provides any known alternative geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the location-based promotions, location-based offers, location-based information, social media content, promotions or offers in connection with an online or mobile news feed, location-based advertising, mobile location-based advertising and promotions or offers and marketing impressions and online or mobile coupons and promotions or offers for online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping and mobile mapping technologies with social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services, social shopping and social networking, as functions or content marketing impressions, access, systems, and the like, as known in the art, or as described herein, which can include, but are not limited to, access to trusted user-generated content using social networks, accessing information from multiple networks, and content sites, accumulating social relation information for social network services, adaptive packaging of network resources, adaptive social network management, advertising products to groups within social networks, aggregation of social network data, aggregation, standardization and extension of social networking contacts to enhance a television user/consumer experience, application of social shopping and social networking, social data, assigning access privileges across the world wide web on a computer, mobile device or other devices, associative memory operators, methods and computer program products for using a social network for predictive marketing analysis, automatically locating web or mobile based social network members, and the like, e.g., those disclosed in one or more of e.g., but not limited to, such social networking functions and/or features as presented in the following US patents and patent applications: US20100082693, US20100017431, US20110276631, US20100268655, US20100293247, US20080040428, US20090106822, US20110282944, US20110137722, US20090327432, US20100057859, U.S. Pat. No. 7,958,193, US20100268830, US20090271247, US20110022602, US20090292814, US20080033776, US20090049525, US20090271244, US20110047229, US20100114788, US20090144075, US20100153175, US20090215469, US20110131095, US20080281710, US20090292549, US20110314017, US20110225518, US20080306822, US20100132049, US20100082695, US20100203963, US20110167071, US20100088364, US20110196922, US20090319288, US20110258429, US20090150380, US20120023085, US20100036936, US20090210480, US20100042511, US20100241468, US20100121849, US20110320250, US20110258556, U.S. Pat. No. 7,987,110, US20090030927, 7801971, US20110023101, US20110153553, US20110179161, US20110265011, US20110022657, US20090187624, US20100229223, US20110173051, US20110055333, and US20110093460, which are each entirely incorporated herein by reference.

The present invention also provides alternative affiliated promotion or offer or advertising functions, components, and systems, including, but not limited to: one or more of, (1) advertising content management system and method; (2) advertising method and product; (3) affiliate distribution of geo-target geo-targeted or geo-tagged advertisements and/or location-based promotions, location-based offers, location-based information, social media content, promotions or offers in connection with an online or mobile news feed and with compensation for affiliate; (4) affiliate system and affiliate device; (5) affiliate system on social networking or social networking websites or third party websites or applications; (6) affiliated advertising widget; (7) apparatus and method for internet advertising compensation; (8) apparatus, method and article to evaluate affiliate performance; (9) arranging delivery of geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the location-based promotions, location-based offers, location-based information, social media content, promotions or offers in connection with an online or mobile news feed, position-based services, location-based advertising, mobile location-based advertising and promotions or offers and marketing impressions and online or mobile coupons and promotions or offers for online or mobile coupons and promotions or offers for Products, and/or Services, which are accessible across one or multiple websites or third party applications with two or three dimensional images on geospatial platform using cloud-type configuration and using cloud services in combination with geo-mapping and mobile mapping technologies with social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services.

Referring now to the drawings wherein like reference numerals are used to identify identical components in the various ad view impressions, FIG. 1 shows an example of a diagram for a method or system for Location Based Customer Feedback for Global Products or Services based on User Behavior and Location and Social Networking ("LBCF-GPS-UBL-SN") system 10 in accordance with an exemplary embodiment combined online Product or Service in combination with Geospatial Mapping/Web Mapping/2D Mapping/3D Mapping/GPS/Location Mapping/Social Mapping/Digital Mapping/3D Holographic Mapping/Mobile Mapping technologies with/Company-Local Information/and/or Social Networking/Impressions/Location-Based/Communities distribution system 10 includes a main server system 12 and a client system 14 that is remote from main server system 12, connected together by a distributed computer network, such as the Internet 16, (network, or mobile device access system). A user desiring to obtain one and/or more of online Products, Goods or Services in combination with Geospatial Mapping/Web Mapping/2D Mapping/3D Mapping/GPS/Location Mapping/Social Mapping/Digital Mapping/3D Holographic Mapping/Mobile Mapping technologies with/Company-Local Information/and/or Social Networking/Impressions/Location-Based/Communities uses client system 14 to interact with main server system 12 to obtain online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services. An electronic coupon can be but is not limited to any advertisement that is electronic, (e.g., electronic advertisement on website, electronic advertisement sent to client's via a mobile device or tablet device or mobile internet devices or holographic devices or holographic phone or wireless data transfer device or other similar device or android device or tablet device or mobile internet devices or holographic devices or holographic phone or non-phone connected device, (e.g. tablets, e-readers and MP3 players) or computer, a hyper link based on a search result from a search engine and/or any other push/pull techniques).

Main server system 12 is configured to be connected to, and/or otherwise receive, location-based advertisements, location-based deals and offers location-based services, in real time, geo-targeted or geo-tagged advertisements and/or location-based promotions, location-based offers, location-based information, social media content, promotions or offers in connection with an online or mobile news feed and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, location-based services, GPS and GIS technologies, and the like, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, social activity, location impressions, Products, Goods, Gambling, Auctions, Shopping, Sports, Autos & Vehicle, Pets & Animals, Online Communication, Education related and/or Services information from the issuer of such coupons, (i.e., the coupons sponsor) and/or as provided by the website or mobile device and/or other electronically provided information, e.g., by PDA, cell phone, portable electronic tablet, etc., including social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services, or e-commerce or m-commerce system based user's or member's profile preferences and preferred locations, interests, preferences or networking interests or connections or channels. Although not shown, this function can be performed by a direct electronic connection with a sponsor system, and/or can involve loading data from a physically transportable data storage medium, (e.g., diskette, tape, CD-ROM, USB drive, cloud storage, etc.). The coupon sponsor may, and in most cases will, issue in connection with the coupon an associated set of instructions that define how the coupon is to be distributed. For example, such instructions can include restrictions as to the number of coupons that any one user can print out for redemption, the state and/or zip code associated with a user for such user to have access to the coupon, the expiration date, the item and discount amount, etc. Main server system 12 is further configured to be connected to, and/or otherwise receive, advertising information from an advertising sponsor, or purchasing system, e.g., Amazon, or company purchase website or mobile application, or through mobile banking system. Although not shown, this function can be performed by direct electronic connection with the ad sponsors system, and/or can involve loading data from a physically transportable data storage medium, (i.e., diskette, tape, CD-ROM, cloud storage, etc.). The advertising impressions are displayed on client system 14, as described in greater detail below.

Main server system 12 can include a website server 18, a front-end server 20, a handler 22, a database server 24, and an FTP server 26. Website server 18 is configured to provide "web pages," mobile app, e-commerce or electronic or mobile device, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services to user/consumers, (including possible users or members of electronic coupon distribution system 10) with Internet access. Internet 16, more particularly, the world wide web portion thereof, "WWW," is an interconnected computer network that is generally distributed throughout the world on discrete interconnected computer nodes having software interface generally referred to as "web pages," which further includes geospatial, web mapping, 2D and 3D mapping, GPS, location mapping, social mapping, digital mapping, 3D holographic mapping and/or mobile mapping technologies with based user's or member's profile preferences and preferred locations, interests, preferences or networking interests or connections or channels, location-based advertisements, location-based deals and offers, location-based services, in real time, geo-targeted or geo-tagged advertisements and/or location-based promotions, location-based offers, location-based information, social media content, promotions or offers in connection with an online or mobile news feed and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, location-based services, GPS and GIS technologies, and the like, in the and online or mobile coupons and promotions or offers for Products, Goods, Gambling, Auctions, Shopping, Sports, Autos & Vehicle, Pets & Animals, Online Communications, Education related and/or Services, which are accessible across one or multiple websites or third party applications with two or three dimensional images on geospatial platform using cloud-type configuration and using cloud services in combination with geo-mapping, web mapping, 2D and 3D mapping, GPS, location mapping, social mapping, digital mapping, 3D holographic mapping and/or mobile mapping technologies across the web or in conjunction with social networking, a social networking environment, social networking interactions between members and generate marketing and mapping relationships between members of a social network or website, social networking websites or third party websites or applications, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, company and local information for selected worldwide locations, and/or any other useful data. Access to Internet 16 can be made by various methods; typically, however, a non-institutional user obtains access from one of a plurality of Internet Service Providers, (ISPs), which in turn obtain authorized access to Internet 16. Navigation the WWW portion of Internet 16 involves knowledge of a directory structure of various nodes of the Internet, (i.e., an "address" to each given resource on Internet 16). Such an address is generally referred to as a Uniform Resource Locator, (URL), which typically starts with a protocol name followed by a domain name, for example: http://www.value-pass.com. Website server 18 is configured to provide, among other things, an interface for affecting a download of client software that a user/consumer can download and execute to establish a client system 14 on his and/or her computer system. In this way the user/consumer can become an authorized user, ("user") of electronic coupon distribution system 10. In particular, website server 18 can refer an Internet user/consumer to FTP server 26 for the client installation file.

Front-end server 20 provides multiple interface and allocation/direction features for electronic coupon distribution system 10. Front-end server 20 is the entity that is initially contacted by client system 14 at the start of each new session of a method or system for Location Based Customer Feedback for Global Products or Services based on User Behavior and Location and Social Networking, ("LBCF-GPS-UBL-SN") distribution system 10, and/or when automatic coupon updates occur. Handler 22 is configured to interface with database server 24. After a user establishes a new session, all subsequent requests by client system 14 can be directed to and are "handled" by handler 22. As a result, handler 22 can thereafter issue a request and/or a command to database server 24, and/or directly respond to client system, (if configured to do so). Database server 24 can comprise a plurality of physical, individual general-purpose digital computers configured as database servers, which can be further configured in a cluster arrangement. Database server 24, in one embodiment, can be configured to operate using SQL server software, such as, but not limited to, Microsoft SQL Server Version 7, commercially available from, for example, Microsoft Corporation, Redmond, Wash., U.S.A.

FTP server 26 can be configured to operate in cooperation with geospatial, website server 18 to provide, for example, installation and/or setup programs. The installation program(s) are downloaded to a general-purpose computer, (e.g., PC and/or a MAC) for installation of the client software in accordance with the present disclosure. Client system 14 includes client application software 28, DeviceID data 30, (ID) data 30, user preference data 32, user history data 34, LBCF-GPS-UBL-SN information data 36, and advertising data 38. In addition, client system 14 can comprise a general purpose computing apparatus configured to operate in accordance with an operating system having a graphical user interface such as, for example, Windows 95/98/NT 4.0/2000/Vista/7, and Apple Computer, Inc. MAC OS Operating System for Macintosh platforms. Client system 14 can further include standard peripherals such as a display device 40, a keyboard 42, a pointing device, such as a mouse 44, and an output device, such as a printer 46, for producing a "hard copy" of LBCF-GPS-UBL-SN 48. DeviceID data 30 can be stored on main server system 12, according to an exemplary embodiment. In exemplary embodiments, one, a few, a plurality and/or all DeviceID data 30 can be stored on main server system 12.

Client application software 28 comprises software compatible with and executing on client system 14 configured to implement the present disclosure as described herein. Client application software 28 performs various functions including, but not limited to, collecting user information, including preferences, communicating with main server system 12 via Internet 16, and providing an interface for the user or member of a social network for browsing through, and selecting, LBCF-GPS-UBL-SN information for printout. DeviceID data 30 can comprise a multi-digit number that is assigned by main server system 12, more particularly, database server 24, when a user registers with LBCF-GPS-UBL-SN information distribution system 10. DeviceID data 30 can have a format, such as XXXXXXXX, where X is a digit between 0-9. DeviceID data 30, however, does not specifically identify the user personally, but rather, more accurately associates a physical machine defining client system 14 with user or member profile information obtained during registration. DeviceID data 30 is stored on client system 14, main server system 12, and/or both as a part of a User Info object. If the DeviceID data 30 is stored on client system 14, then DeviceID data 30 is provided to main server system 12 when making requests, for example, for new LBCF-GPS-UBL-SN information data. If a client system 14 operates multiple independent operating systems, (e.g., a Mac operating system, (a product of Apple Computer, Inc.) and a Windows operating system, (a product of Microsoft Corp.), then there can be a separate DeviceID data 30 for each operating system assigned to that client system 14. Main server system 12 can correlate the provided DeviceID data 30 with user information stored in a profile database. The user information can then be used in identifying LBCF-GPS-UBL-SN information suitable for the user or member of a social network. In this embodiment, however, the user is not personally identified nor is it even possible, (e.g., through the "hacking" of main server system 12) to identify the user personally, as such information is not even collected from the user. Accordingly, the approach described herein maintains privacy of the user of LBCF-GPS-UBL-SN information distribution system 10.

The User Info object further includes user information collected from the user of client system 14 indicative of one and/or more demographic characteristics of the user. In this embodiment, the user information is insufficient to specifically identify the user. In a constructed embodiment, such information comprises a postal zip code associated with the user, and a state in which the user resides. Client application software 28 allows the user to update this information after initial registration. In addition, the User Info object includes the mode in which the Internet is accessed, for example, through use of a modem, (e.g., dial-up), through use of a Local Area Network, (LAN), and/or use of a proxy server. The User Info object can further include the version number of the client application software 28. User preference data 32 comprises two main groups. The first group of information contained in user preference data 32 includes information defining how often the main server system 12 is checked for new LBCF-GPS-UBL-SN information. In a constructed embodiment, the options include one hour, two hours, four hours, (the default), twice a day, and once a day. The first group of information contained in user preference data 32 can also include a miscellaneous item of information indicating whether the user prefers that certain LBCF-GPS-UBL-SN information be automatically printed, (this can be selected and/or deselected by the user). The second main group of information included in user preference data 32 includes a comprehensive listing of main categories of LBCF-GPS-UBL-SN information selected by the user that the user wishes to receive. While the particular main LBCF-GPS-UBL-SN information category descriptions can be changed on main server system 12 and downloaded to client system 14 at any time, exemplary categories include "Apparel," "Athletics," "Automotive," and "Internet Electronics," among others. A user can deselect a category, in which case LBCF-GPS-UBL-SN information pertaining to that category cannot be sent from main server system 12 to client system 14.

User history data 34 comprises data corresponding to events occurring at the remote client system 14, as well as other items pertaining to the operation of client system 14. All these items are stored in a user history file. For example, when a user is browsing through available LBCF-GPS-UBL-SN information each LBCF-GPS-UBL-SN information that is selected for viewing is noted in the user history file. Likewise, when LBCF-GPS-UBL-SN information is selected for printing, that action is also recorded in the user history file. Other examples include when LBCF-GPS-UBL-SN information is actually printed, and when an advertising impression, (described in further detail below) is displayed on display device 40. The information contained in the user history data 34 is encrypted by client application software 28 in accordance with a client system encryption strategy to protect the integrity of the data contained therein.

LBCF-GPS-UBL-SN information data 36 includes information corresponding to the LBCF-GPS-UBL-SN information available, (e.g., for browsing) on client system 14. Each LBCF-GPS-UBL-SN information, such as LBCF-GPS-UBL-SN information 48, includes a plurality of items of information associated therewith.

In addition, when LBCF-GPS-UBL-SN information 48 is actually printed out, additional information can be printed out on the "hard copy" of the LBCF-GPS-UBL-SN information. These additional items can include the DeviceID data 30, portions of the demographic data such as the postal zip code, one and/or more items of the user information contained in user preference data 32, the date and time, and optionally various Internet URLs. Coupon sponsors have found some of the information appearing on printed LBCF-GPS-UBL-SN information 48 desirable. That is, when the user redeems LBCF-GPS-UBL-SN information 48, for example, at a retail store, information appearing on LBCF-GPS-UBL-SN information 48, (which is eventually returned by the retailer to the LBCF-GPS-UBL-SN information issuer and/or sponsor) is available to the LBCF-GPS-UBL-SN information sponsor. This information can thereafter be used in analyzing and assessing the efficacy of various advertising/promotional strategies. LBCF-GPS-UBL-SN information data 36 can be stored on a hard drive and/or the like associated with client system 14, and is preferably stored in an encrypted form. In particular, and in accordance with the present disclosure, LBCF-GPS-UBL-SN information data 36 corresponding to LBCF-GPS-UBL-SN information is encrypted by main server system 12 in accordance with a server system encryption strategy.

The encrypted LBCF-GPS-UBL-SN information data is then transmitted to client system 14. Client system 14 further encrypts the once-encrypted LBCF-GPS-UBL-SN information data in accordance with a client system encryption strategy to thereby generate doubly encrypted LBCF-GPS-UBL-SN information data. The doubly encrypted LBCF-GPS-UBL-SN information data 36 can then be stored on the client system 14. The foregoing encryption steps substantially minimize the occurrence of fraud in the distribution of LBCF-GPS-UBL-SN information compared to known systems. A user, for example, can therefore not easily defeat the LBCF-GPS-UBL-SN information counting scheme that limits the number of printouts by, for example, exploring the client systems hard drive, identifying LBCF-GPS-UBL-SN information data, and thereafter producing printed copies of the LBCF-GPS-UBL-SN information. Use of the environment established by client application software 28 is therefore practically the only means for the user or member of a social network to obtain usable LBCF-GPS-UBL-SN information 48. Advertising data 38 comprises a plurality of advertising impressions wherein each impression can include a predetermined combination of text and images. Advertising data 38 is also stored on client system 14 in an encrypted form. Display device 40, keyboard 42, mouse 44, and printer 46 can comprise an apparatus known to those of ordinary skill in the art.

Figure 2:
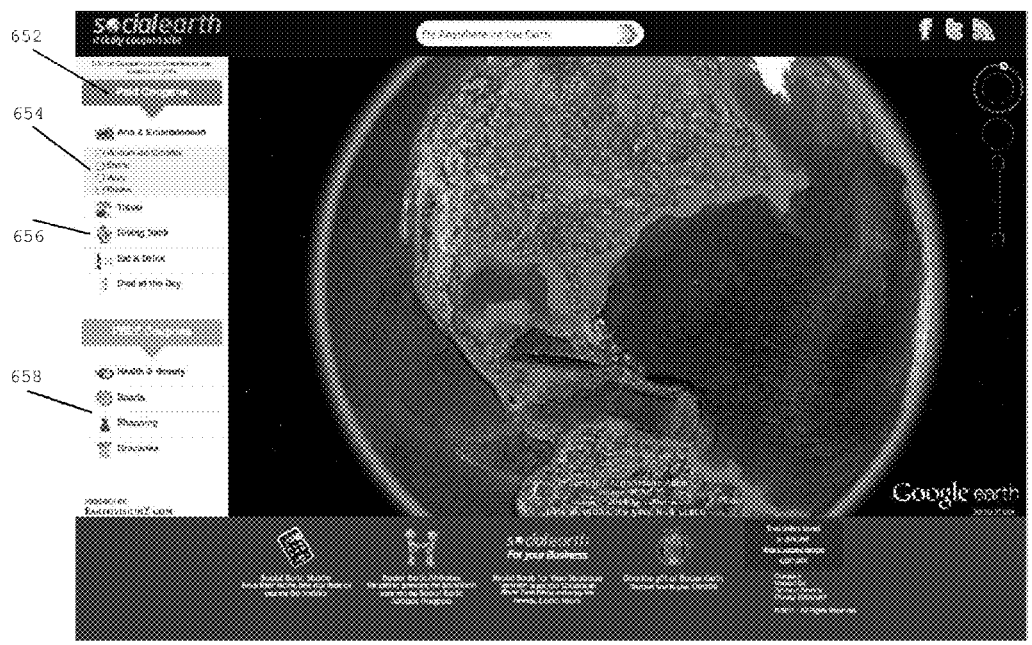
FIG. 2 illustrates a screen display defining an interface associated with a global brand location based promotions and coupon geospatial website, according to an exemplary embodiment.

Referring to FIG. 2, illustrations of a screen display defining an interface associated with a client system portion are shown, according to exemplary embodiments, e.g., as Social Earth. FIG. 2 provides the added feature of being able to utilize a pull down menus 652, 654, 656, and 658 to retrieve LBCF-GPS-UBL-SN information data. It is to be understood that the above description is merely exemplary rather than limiting in nature, the disclosure being limited only by the appended claims. Various modifications and changes can be made thereto by one of ordinary skill in the art, which embody the principles of the disclosure and fall within the spirit and scope thereof. For example, one and/or more steps described herein as being performed by client system 14 and/or main server system 12 can be performed by the other of client system 14 and/or main server system 12, and/or by both.

For example, a thin client can be operable on client system 14 to interface with main server system 12. A thin client is a client computer and/or client software in client-server architecture networks, which depends primarily on the central server for processing activities, and mainly focuses on conveying input and output between the user and the remote server. In contrast, a thick and/or fat client does as much processing as possible and passes only data for communications and storage to the server. Many thin client devices run only web browsers and/or remote desktop software, meaning that all significant processing occurs on the server.

A Geographic Information System, (GIS), (Also Called Geographic Mapping and "GM") is a computer technology that provides an analytical framework for managing and integrating data, solving problems, and/or understanding past, present, and/or future situations. A GIS can link information and/or attributes to location data, (hereinafter referred to as a "feature"), for example, people to addresses, buildings to parcels, and/or streets within a network. GIS and/or GM can further layer such information to present a better and/or clearer understanding of how many different variables interrelate and/or work together. Layers can be in the form of colored and/or textured overlays, graphics, icons, graphs, and/or other visual indicators of data in context with a geographic location associated with the data. GIS and geospatial technologies are used in the present invention in all fields such as, but not limited to, business and marketing, emergency management, environmental planning, geo-intelligence and security, risk assessment, urban planning and utilities management, as well as industries such as telecommunications, utilities, transportation, education related and/or services and scientific research constitute some of the largest user/consumers of this technology, and through its application in numerous daily tasks, as well as logistics companies using it to plan optimal delivery routes, insurance industry to assess risk and vulnerability with geospatial data, the retail sector to understand its customer base to provide more efficient services, while in the communications realm, location-specific applications such as Foursquare™, Microsoft™ GeoLife™ and Google Buzz™ on cell phones or social media websites help diffuse this technology to the general public. The invention also includes future growth in the geospatial technologies industry including building capacity and developing broad citizen access to the technology, constructing innovative value-added applications to help businesses make informed decisions, capturing and sharing reliable geospatial data, and training a capable work force, as well as the Internet and advances in information and communications technologies also can be included in its expansion. The invention also can include the purchase and use of place-based GIS-generated products without necessarily being familiar with the technology itself, such the use of GPS or Internet-based maps to locate a particular business outlet, while user access and awareness can stimulate a greater demand for new applications of this technology, which can fuel innovation, and a domino effect can help the industry expand into new markets. User access to geospatial technologies and data are slowly revolutionizing how we view the world. GIS has restored the importance of understanding people-place, interactions in an array of activities and decision-making processes. With such value and possibility, leaders and users or members of this technology should promote its application as broadly as possible.

A GIS and/or GM is most often associated with maps formed within a framework of a common coordinate system, such as the World Geodetic System 1984, (WGS84). Reference locations within the framework can be specified by and/or translated to and/or from locations defined within a common coordinate system, so as to allow integration of disparate data and functionality with a geospatial browser. A map, however, is only one way a user can work with geographic data in a GIS and/or GM and is only one type of output generated by a GIS and/or GM. Furthermore, a GIS and/or GM can provide many more problem-solving capabilities than using a simple mapping program and/or adding data to an online mapping tool, (e.g., in a "mash-up").

Generally, a GIS and/or GM can be viewed in at least three ways, (1) as a database; (2) as a map; and/or, (3) as a model. As a database, a GIS provides a unique kind of database relating to the Earth and/or other mapped region, such as a geographic database and/or geo-database. Fundamentally, a GM is based on a structured database that describes the mapped region in geographic terms. GM maps can be either two and/or three-dimensional images in presentation. GM maps are generally constructed of "tiles" that are unit areas of a geographic region. Tiles can be identified in the database by coordinate boundaries and/or individual reference identifications allocated to each tile. The number of tiles covering a particular geographic region can vary depending upon the resolution of the map requested; a high-resolution map, (e.g., 1 m) of a geographic area can have substantially more tiles than a lower resolution map of the same area. Maps combining the underlying geographic information with overlays of associated data can be constructed and used as "windows into the database" to support queries, analysis, and editing of the information in a process called "geo-visualization." As a model, a GM is a set of information transformation and/or "geo-processing" tools that derive new geographic data from existing data. This geo-processing functionality can take information from existing data, apply analytic functions, and write results into new derived data that show features and feature relationships with the mapped region and present the results to a user.

A GM allows mapping of locations and things and identification of places with requested features. GIS mapping can provide information about individual feature and/or present a distribution of features on a map to identify patterns. GM and/or GIS mapping can be based upon and/or filtered by quantities, for example, locations of most and least of a feature. GM and/or GIS mapping can also find and establish relationships between places, features, conditions, and/or events and determine where certain criteria are met and/or not met. GM and/or GIS mapping can also present densities to view concentrations. A density map allows measurement of a number of features using a uniform area unit, such as acres and/or square miles, to clearly present the distribution. This functionality provides an additional level of information beyond simply mapping the locations of features.

GM and/or GIS can be used to map changes to anticipate future needs. GM and/or GIS mapping can also be used to map conditions before and after an action and/or event to see the impact. For example, a retail analyst might map the change in store sales before and after a regional ad campaign to see where the ads were most effective.

Figure 3:
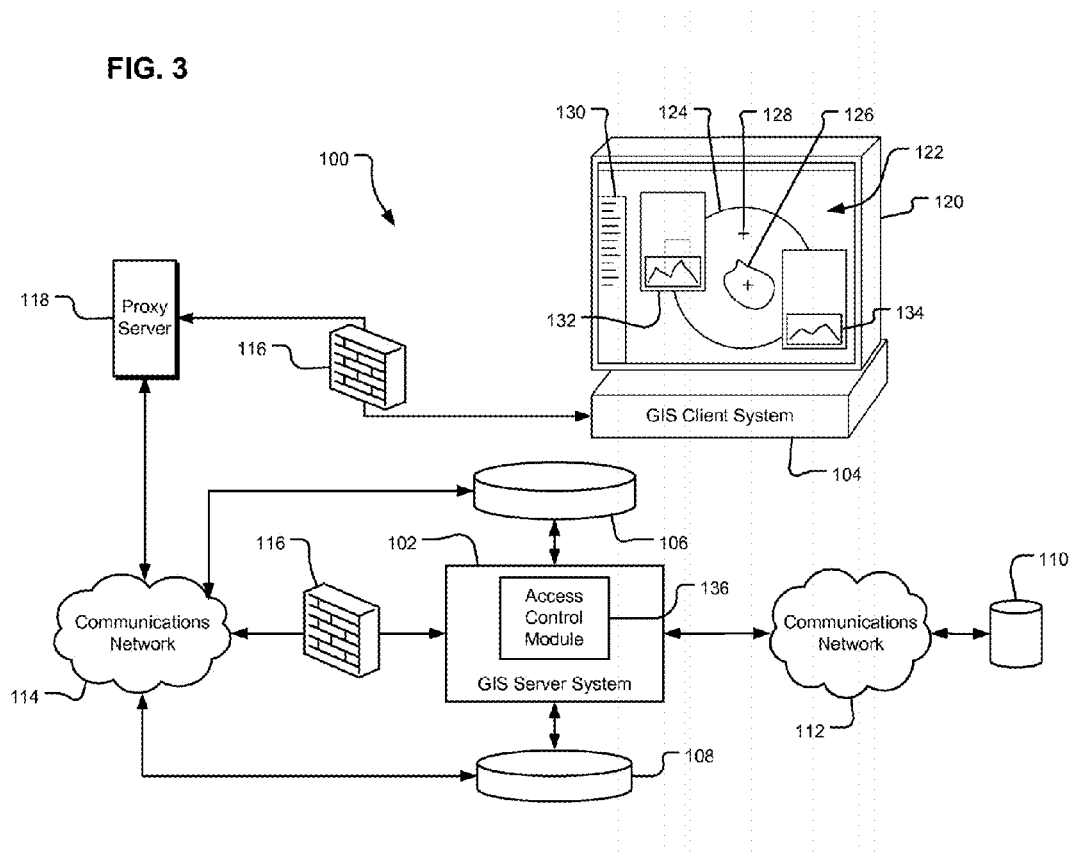
FIG. 3 is a schematic diagram of an exemplary implementation of a geospatial display management system for implementing a geographic information system over a network, mobile device, computer or website.

A GM and/or GIS can be implemented in a geospatial display management system, (GDMS) 100, shown in FIG. 3 to provide the geo-processing power and infrastructure to process the data and render geo-visualizations of the data in a user interface. The GDMS 100 of FIG. 3 can be implemented in a combination of a server computer system 102, one and/or more client computer systems 104, and various data sources 106, 108, and 110. GDMS data can be saved in the GDMS server system 102 and/or in a datastore 106, 108, and 110 at a local and/or remote location. The data sources 106 and 108 are depicted as local to the server system 102, whereas the data source 110 is depicted as coupled remotely to the server system 102 via a communications network 112. GDMS data can also be cached in a proxy server.

The client system 104 can be coupled remotely to the server system 102 via a communication network 114, (or alternatively, the same communications network 112), although a local connection between the client system 104 and the server system 102 can be employed. It should be understood that multiple client systems can be coupled with the server system 102 concurrently. It should also be understood that the client system 104 and server system 102 can be implemented in an integrated system. The network connection 114, such as an Internet connection, can be used by GDMS client systems 104 to access the data, (e.g., data defining layers and/or providing financial information, chemical concentrations, test results, project state reports, etc.) at the remote data sources 106, 108, 110, directly and/or through an intermediate computing system, (e.g., a proxy server and/or GDMS server).

The client computer 104 can be coupled to an intermediate server, such as a proxy server 118. The proxy server 118 can be positioned between the client computer 104 and the server system 102. The proxy server 118 intercepts all requests to the server system 102 to see if it can fulfill the requests itself with cached data from prior requests. If not, the proxy server 118 forwards the request to the server system 102 to be fulfilled.

The proxy server 204 can also be coupled to the communications network 114 and accessed by the client computer 104 and the server system 102 via the network 114. Firewalls 116 can also be implemented between the server system 102 and the client computer 104 and the network 114 for an added layer of security.

The connection can be established as a secure connection between the client system 104 and the server 102 and/or the remote data sources 106, 108 and 110. The secure connection can be accomplished by a variety of different methods including, but not limited to, authentication codes and passwords, secure user management tools, firewalls, user authentication, secure user management tools, user pathway mapping and encryption, etc. In another example, the server system 102 can include an administrative website that can allow authorized users or members to manipulate and assign user rights, (e.g., an administrative tier). The server system 102 can also include a security feature, for example, an access control module 136 to establish, control, and monitor access by client computers 104 to certain data stored within and/or accessible within the GDMS 100. Access control can be governed by an administrator and/or it can be an automated function of the access control module 136 based upon attributes of the data requested and permissions held by the user as further described below.

The server system 102 can represent one and/or more hardware and software servers providing multiple server functions. In addition, one and/or more of the server system 102, the client system 104, and the databases 106, 108 and 110 can form an N-tier system. The server system 102 can also include a web server application subsystem, whereby world wide web-enabled applications can provide various aspects of functionality of the GDMS 100. For example, the server system 102 can provide a website where content creators and/or generators can upload geospatially-related data that can be transformed into features referenced to locations within a map of the GDMS 100 for access through the client system 104 connected to the GDMS 100 for geo-visualization of the information. In an alternative implementation, the client system 104 can be implemented as a "thick" client and execute client-installed software for some and/or all of the functionality of the GDMS 100.

A monitor 120, coupled to the client system 104, presents a GDMS interface 122 constructed from data and functionality received through the server system 102. When a user is working within a GDMS 100, s/he is said to be in a GDMS session. The GDMS interface 122 can be generated by a GDMS application executing on the client system 104 and/or alternatively through a server-executed GDMS application that provides the interface components over the network to a dumb terminal and/or a browser application running on the client system 104. The GDMS interface 122 can be a geospatial browser window including a map 124, (e.g., a globe in this illustration), a geo-visualization of data as a layer 126 and individual features 128 on the map 124, a layer manager 130 for selecting data and other features from the databases 106, 108, 110. The GDMS view can also include tool palettes 132 and 134, which can be distinct features of the browser interface browser plug-ins, and/or separate utilities and/or applications.

In one implementation, the GDMS interface 122 can be in the form of a geospatial browser window and one and/or more geospatially-referenced tools. Access to the data and/or functionality is provided by geospatially-referenced tools, (e.g., tool palettes 132 and 134) that are associated with and triggered in relation to a specific location in a common coordinate system, (e.g., WGS84 and/or some other shared coordinate system) shared by the tools and the geospatial browser. For example, a tool can provide chemical analysis results pertaining to soil samples taken from the location over time. In another example, a tool can retrieve and analyze financial data pertaining to a construction project on a specified region of the map, (e.g., a location). The data available to such tools is provided from a variety of data sources and associated with each location within the common coordinate system of the GDMS system 100, such as through specified coordinates, (e.g., longitude and latitude), other geographic constraints, and/or organizational constraints, (e.g., a project identifier of a project having a specific geographic location and/or constraint, a feature identifier of a feature having a specific geographic location and/or constraint, etc.). In this manner, the user can view a location through the geospatial browser and access data and/or functionality associated with a location or a map that is accessible through the tools in the browser. These locations can be the same location and/or distinct locations.

Figure 4:
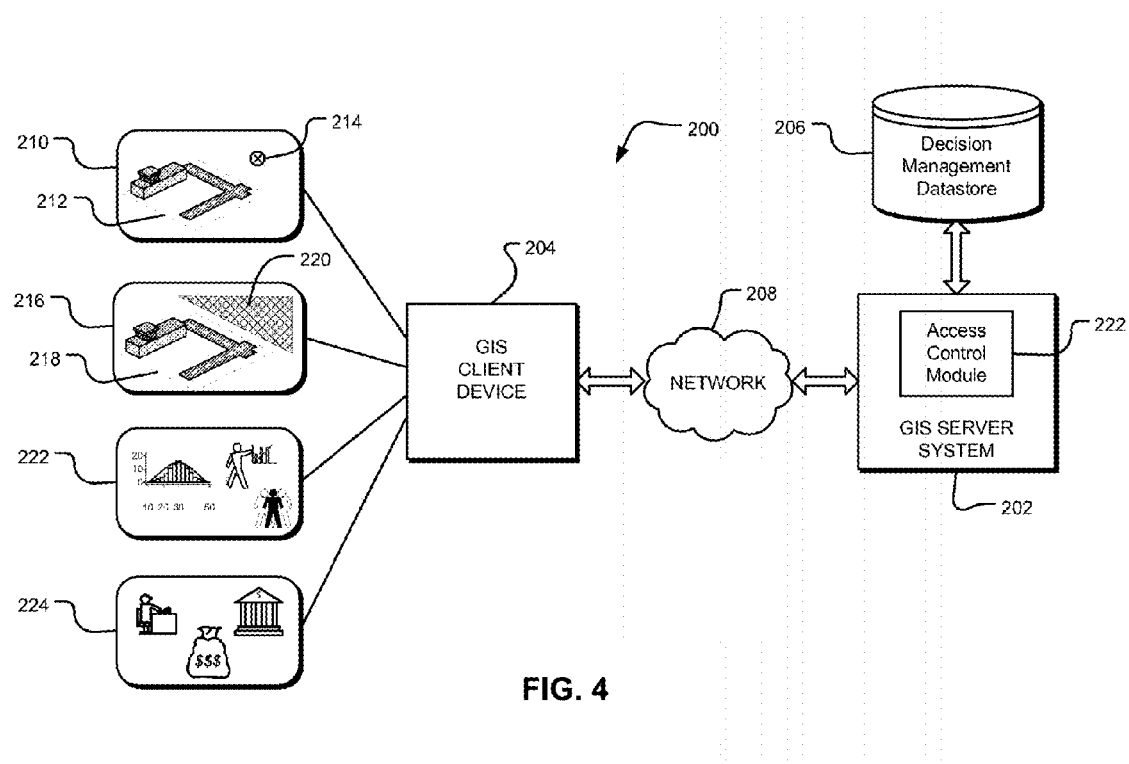
FIG. 4 is a schematic diagram of a geospatial display management system depicting exemplary implementations of technical and management interface tools available to a client user.

FIG. 4 further illustrates an example of a GDMS 200 for accessing specific data and/or information within a database based on the association of the information with geospatial coordinates. Again, the GDMS 200 can be implemented by a GM and/or GIS server system 202 in communication with a GM and/or GIS client computer 204 over a communication network 208, e.g., the Internet. The GM and/or GIS client computer 204 can be used access information and real-time data a decision management datastore, (DMD) 206 connected with the GM and/or GIS server system 202. The communication network 208 ideally provides the GM and/or GIS client computer 204 with high-speed access to indexed data on the DMD 206.

The GM and/or GIS server system 202 can also include a security feature, for example, an access control module 222 to establish, control, and monitor access by GM and/or GIS client computers 204 to certain data stored within and/or accessible via the DMD 206. Access control can be governed by an administrator and/or it can be an automated function based upon attributes of the data requested and permissions held by the user as further described below The data retrieved from the DMD 206 can be presented in a user interface 210, 216, 222, and 224, (of which four exemplary configurations are presented in FIG. 4 at the GM and/or GIS client computer 204. A feature presented in the user interface 210, (e.g., a geospatial coordinate and/or geographic location) on the client computer 204 can be used access information and real-time datadexed by features using the DMD 206.

The GM and/or GIS client computer 204 can access the indexed data in the DMD 206 by using applications and/or plug-ins, such as technical interface 210, 216 and management interface 222, 224. The technical interface 210, 216 can be used to access technical data associated with particular features. In exemplary implementations such technical data might be biochemical, geochemical, hydro-geological, and/or other physical data on analytes. The management interface 118, 120 can be used to access business management data. In exemplary implementations such management data might be business and organizational documents and data associated with particular features. Several examples of the use of such tools to interface with the DMD 206 and extract the data are presented below.

As shown in the first technical interface 210 in FIG. 4, if the GM and/or GIS client computer 204 requests information about a particular feature, such as a ground water well located near an airport 212, the GM and/or GIS client computer 204 can select the feature 214, i.e., the ground water well, to receive information related to that feature 214. The first technical interface 210 can include a concentric area data tool that can provide technical data related to the ground water well feature 214, for example, latitude and longitude, physical inspection data, water level information, and water contamination information, in a the form of information windows and visual geographic information overlays on a base location map. In an alternate implementation shown in the second technical interface 216, technical data concerning an area of land 220 around, adjacent, and/or near the airport 218 at the location of the feature 214, for example, landscaping, slope, soil composition, and/or grading information can be presented.

In a further implementation shown in a first management interface 222, a contract management concentric data tool can provide management data based upon the selected feature 214, for example, information construction and/or work in progress, zoning and/or easement information, and/or information any contracts applicable to the feature 214. In a further implementation shown in a second management interface 224, a finance management concentric data tool 120 can also provide management data relating to financial information applying to the feature 214 selected, for example, costs of past repairs and/or current maintenance fees. In some implementations the management interface 222, 224 can further comprise a real-time link to a video camera providing a view of the selected feature 214 and any construction and/or activity occurring at the selected feature 214.

Figure 5:
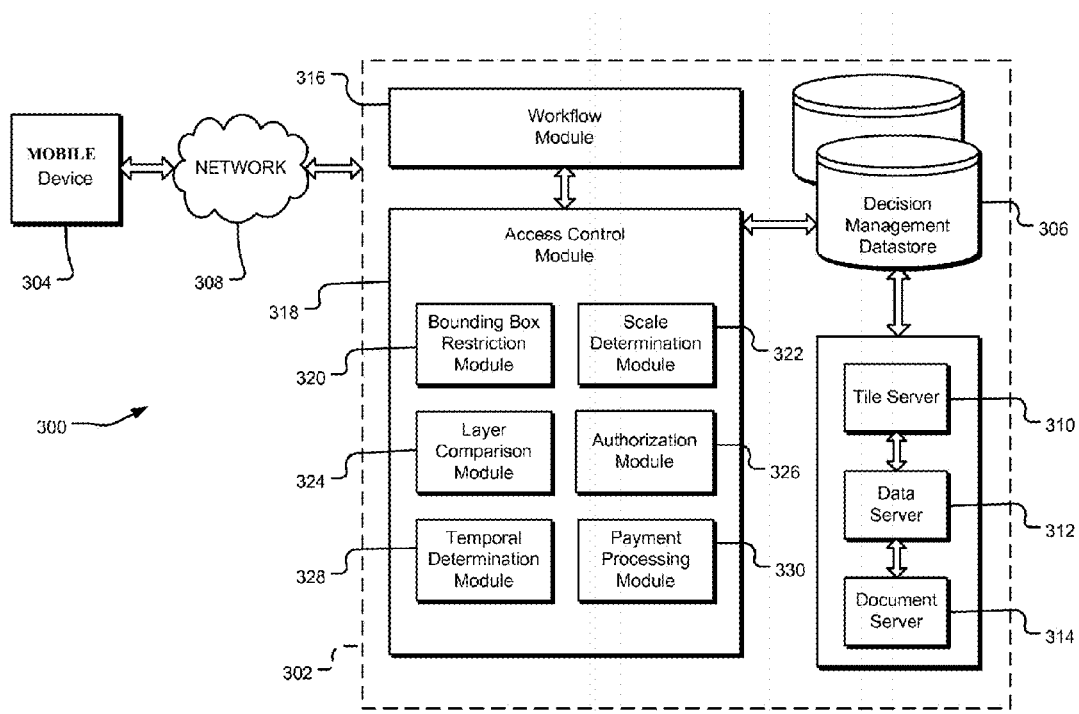
FIG. 5 is a schematic diagram of additional components of a geospatial display management system for implementing access control to presentation of geospatial attributes on a mobile device, computer, and/or within a network.
Figure 6:
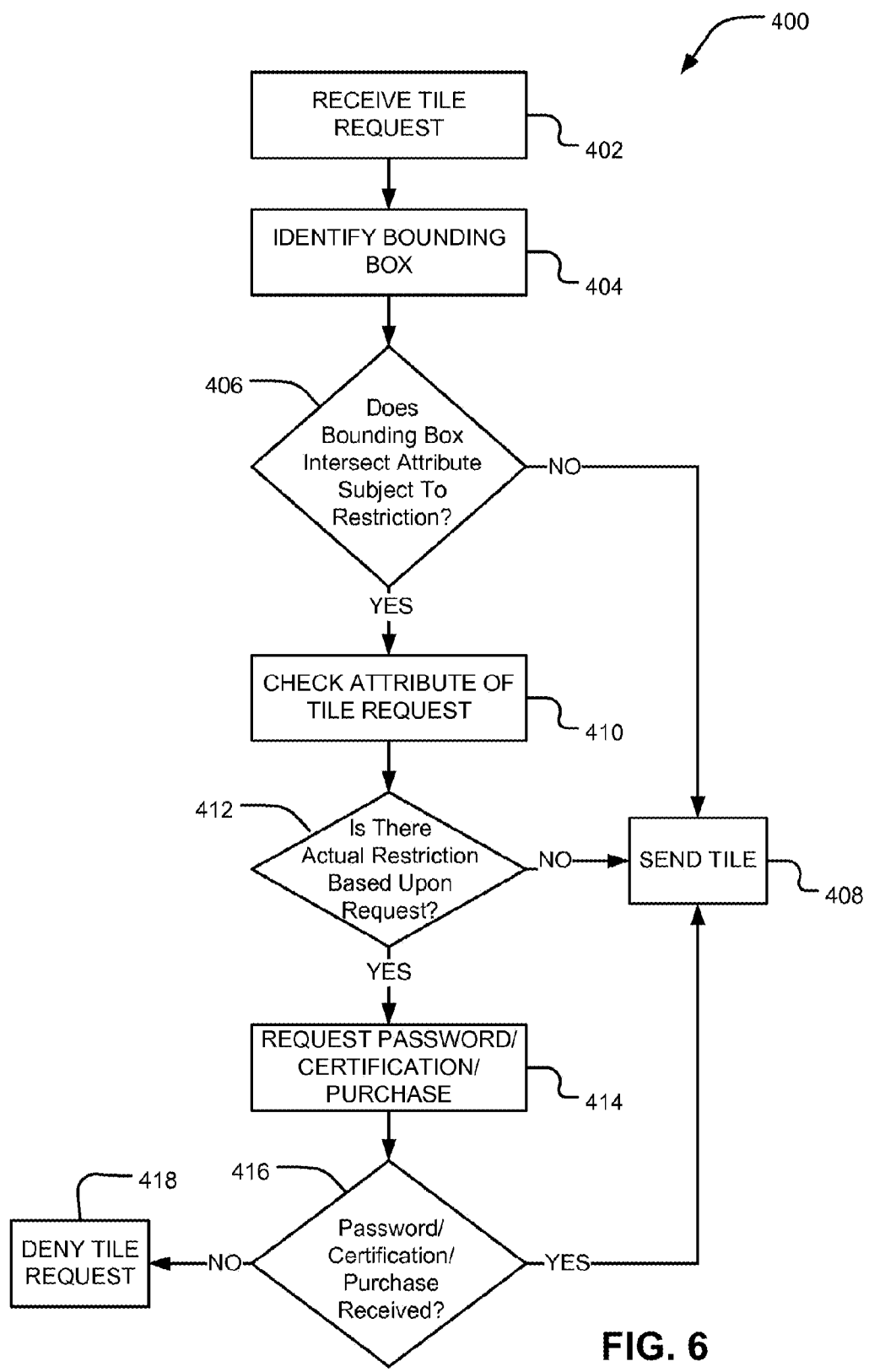
FIG. 6 is a flow diagram of exemplary operations for implementing access control to presentation of geospatial attributes within a geospatial display management system.

The GDMS shown in FIGS. 5 and 6 is an innovative, GM and/or GIS-based management decision support tool that optimizes the geo-processing and geo-visualization of available GM and/or GIS data, for example, natural resources, building resources, time-management resources, personnel resources, financial resources, and information resources, and others. The GDMS can enable a GM and/or GIS client to easily visualize and interpret large, multifaceted, and complex information sets in order to make comparative analyses of alternatives, identify potential liabilities and opportunities, and optimize program strategies.

The GDMS provides full convergence, and/or integration, of multiple, (essentially limitless) disparate data within a single virtual three-dimensional, (geospatial) model. The disparate data, and even sub-data within them, can be organized by association with relevant features on the model. For example, groundwater analytical data can be associated with a given groundwater well; building data can be associated with a given building; installation information can be associated with the installation; and command information can be associated with the command. The GDMS full data convergence allows data to be accessed relative to position, scale, resolution, time, and other geospatial attributes and serves as an extremely intuitive and efficient way to organize and access essentially limitless quantities of information.

The GDMS allows queries, filters, and comparisons of data to be completed at the GM and/or GIS server system and then visually represented in three dimensions in near real time at the GM and/or GIS client device. The three-dimensional representation of data helps users or members gain a better understanding of the meaning contained within the data more rapidly than using traditional tabular and/or two-dimensional representations of data. The GDMS thus allows the meaning represented in the three-dimensional data to be rapidly communicated to users or members.

The GDMS improves on traditional closed and/organization-specific GM and/or GIS by affording live connections or channels to multiple databases. As the databases are updated, the representations afforded by GDMS can thus be current. This allows a fourth dimension, time, to be factored into resource management decisions. Time is an important additional data factor because previous "ad view" of the data can be compared to current "ad view" of the data, in order to gain an understanding of the rates of change, (or dynamics) of the real system. In other words, the GDMS allows for differences between time states to be understood and factored into a decision process.

In FIG. 3 a GDMS 100 can be used to provide access to specific sections within documents, which are associated with a particular geographic coordinate, e.g., User/consumer, E-commerce, Retail, Media & Entertainment, Business, Government, Sports, or Education related and/or Services Online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L-SN) information. More specifically, a GDMS 100 user, (or GM and/or GIS client) can select a specific location and/or 'feature' on a map and be directed to advertising search impressions for location-based promotions, location-based offers, location-based information, social media content, promotions or offers in connection with an online or mobile news feed, position-based services, location-based advertising, mobile location-based advertising and promotions, coupons and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, location-based services, GPS and GIS technologies, and the like, in the location-based promotions, location-based offers, location-based information, social media content, promotions or offers in connection with an online or mobile news feed, location-based advertising, mobile location-based advertising and promotions or offers and marketing impressions and online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services, which are accessible across one or multiple websites or third party applications with two or three dimensional images on geospatial platform using cloud-type configuration and using cloud services in combination with geo-mapping, web mapping, 2D and 3D mapping, GPS, location mapping, social mapping, digital mapping, 3D holographic mapping and/or mobile mapping technologies with social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, User/consumer, E-commerce, Retail, Media & Entertainment, Business, Government, Sports, or Education related and/or Services Online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L&SC-SN) information. Said another way, specific relevant data can be provided to a user based upon the 'feature' selected, not just based upon a traditional search query. Thus, GDMS 100 links and/or ties a 'feature,' and/or specific geographic location to an indexed database of data. The specific relevant data provided to a user can comprise only portions and/or sections of documents, maps, and/or images related to that specific 'feature' selected. This can greatly increase efficiency of GM and/or GIS by taking a user directly to a relevant section of a document, which can be hundreds and/or thousands of pages in length.

As should be apparent from the above discussion, the GDMS is a powerful tool that can be used to access enormous quantities of data stored at remote locations. When using the GDMS, control access to data stored at remote locations, for example, an access control module 222 as depicted in FIG. 4 can be implemented. An administrator of the data stored at the remote location to have server-side control over varying levels of access to data. Thus, in some implementations, access control can be exercised on the server-side; however, in other implementations this level of access control can be exercised on the client side. Further, access control can also be exercised at/by a given database. It can also be desirable to have different levels of authorization to control data access for employees having different roles within an organization. These levels of authorization can be created and adjusted by an administrator to permit varying levels of access to the data.

The GDMS can specifically establish different levels of access to the data can be controlled for each individual and/or can be controlled in groups, (e.g., hierarchically) by the administrator and can be created and maintained using operations implemented within the access control module 222.

The varying levels of accessibility to data can be controlled using a number of different methods including, but not limited to, authentication codes and passwords, secure user management tools, firewalls, user authentication, user pathway mapping, and/or encryption. The levels of access control to the data can also be controlled by the creation of an individual profile for each user identifying the user's role in the organization and specifying their level of access to the data. Then, when a user logs onto a system, their level of access to data can be known by the system and the user can then only be able to view and/or access data that was commensurate with their level of authorization.

The layers of data can also be saved so that other authorized users or members can access the saved layers to view and make additional changes to, (or user comment impressions on) the layers and then save those additional changes. This allows a given user to open the selected state, make changes, alterations, and user comment impressions, and save this new altered state for review and potential further modification by others. Certain GDMS view state data and/or functionality can and/or cannot be accessible to and/or be editable by a user based upon access permissions that have been granted to and/or withheld from the user.

In one implementation, access to the different map tiles and/or layers of data can be based upon the scale and/or resolution of the map and/or layer, i.e., access is 'scale-driven.' The contextual and/or 'smart' layers of data can be turned on and/or off by an administrator based upon the authorization to access each layer of data. A user's ability to change and/or alter the layers of data can also be dependent upon their level of authorization.

With reference now to FIG. 5, an exemplary GDMS 300 is implemented in a server system 302 with a DMD 306 as described above. The server system 302 can further include additional data servers, for example, a map tile server 310 indexed by coordinates, reference number, and/or feature; one and/or more layer servers 312 that provide feature and layer information also indexed by reference to geospatial coordinates, tile reference number, and/or feature; and a document server 314 that can provide online or mobile coupons and promotions or offers for Products, Goods, Gambling, Auctions, Shopping, Sports, Autos & Vehicle, Pets & Animals, Online Communication, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L&SC-SN) information, and/or other documents and information associated with a geospatial location, (again indexed by coordinate, reference number, and/or feature) in a format not amenable to geo-visualization. As shown in FIG. 5, the data servers 310, 312, 314 can be connected to the DMD 306 and/or to one another to maximize operating efficiency of the datastore 306. In some implementations, the data servers 310, 312, 314 and the datastore 306 can be located within the same server system 302, while in other implementations, the data servers 310, 312, 314 and the datastore 306 can be distributed across a network. The server system 302 can further comprise a workflow module 316 and an access control module 318 through one and/or a number of different types of software programs, (i.e., programming logic and/or computer executable instructions) utilizing a variety of different types of measures to control access to the DMD 306. The workflow module 316 and the access control module 318 can be positioned between the client computer 304 and the DMD 306, as shown in FIG. 6, to provide a layer of access control between the client device 304 and the DMD 306 and/or the data servers 310, 312, and 314. In other implementations, the access control module 318 and workflow module 316 can be partially and/or substantially implemented in other locations, for example, on the client device 304, and/or within the communications network 308.

Alternately, in an implementation of the GDMS 300 in an open and/or public platform, rather than a system internal to and/or controlled by a particular organization, access to data can be controlled based merely upon geospatial attributes, for example, the geospatial location, (coordinates) of a tile request, scale of a tile request, resolution of a tile request, payment for access, the combination of layers requested, and/or freshness and/or staleness of data requested. Another example of a geospatial attribute can be the ability to download a geospatial data set as opposed to merely having the ability to view a geo-visualization of such data, e.g., as a layer and/or set of features, e.g., Product, Goods, Gambling, Auctions, Shopping, Sports, Autos & Vehicle, Pets & Animals, Online Communications, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L&SC-SN) information. A further example of a geospatial attribute can be the ability to save and/or bookmarks geo-visualization states defines by various combinations of underlying mar tiles and overlying layers and features for easily returning to such states as opposed to having to recreate the same filter query to return to a prior state. In such a public platform, contributors of GM and/or GIS data accessible for geo-visualization can place limits and/or restrictions on the availability of and/or accessibility of the GM and/or GIS data. A public implementation of the workflow module 316 can be used as an interface for data sources to either upload data to the DMD 306 and/or otherwise register data with the DMD 306 so that the DMD 306 can locate and access the data from a remote server and/or data store managed by the data source.

Another exemplary function of the access control module 318 can be embodied in the temporal determination module 328 that allows and/or denies access to map tiles and/or layers based upon the age of the information comprising the particular data set, e.g. User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (CBGSE-PGGS-GM-C/L&SN) information. In an example, data that is significantly older can develop additional value again for use in temporal studies to identify shopping ad impressions. In such a case, the data can again only be accessible upon payment of a fee for the service. The temporal determination module 328 manages the temporal worth of GM and/or GIS data, for example, by examining time stamps associated with particular GM and/or GIS data and comparing the timestamps to any tags that can be encoded with the data indicating that the GM and/or GIS data set is subject to a fee for service within particular ranges of age.

FIG. 6 depicts an exemplary set of access control operations 400 that can be performed according to one implementation of an access control module within a GDMS. Initially the access control module receives a tile request in a receiving operation 402 associated with one and/or more User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L&SC-SN) information. It should be understood that any request from a client device for GM and/or GIS data can necessarily be associated with one and/or more map tiles. In order to present a geo-visualization interface all of the data can have a reference to particular geospatial coordinates, which can optionally be broken down in units of map tiles.

If the access control module recognizes that there is a restriction associated with one and/or more of the tiles in the bounding box, the access control module can next determine what kind of geospatial attribute is implicated in the bounding box restriction in checking operation 410. The access control module can then invoke one and/or more of the sub-modules described above for further processing assistance. The appropriate sub-module(s) can first determine whether an actual restriction must be imposed on the data request pursuant to the geospatial attribute in determination operation 412. This operation determines whether the requested a value of the geospatial data set and/or feature actually conflicts with the restriction set by the data contributor. For example, the tile request at a resolution value restricted by the data contributor without additional authorization and/or payment and the tile would be considered actually restricted. Alternatively, if the tile request is at a resolution value within the allowable bounds set by the contributor, then the attribute of the request would not be considered restricted and the tiles and/or associated data would be approved for presentation in sending operation 408.

Figure 7:
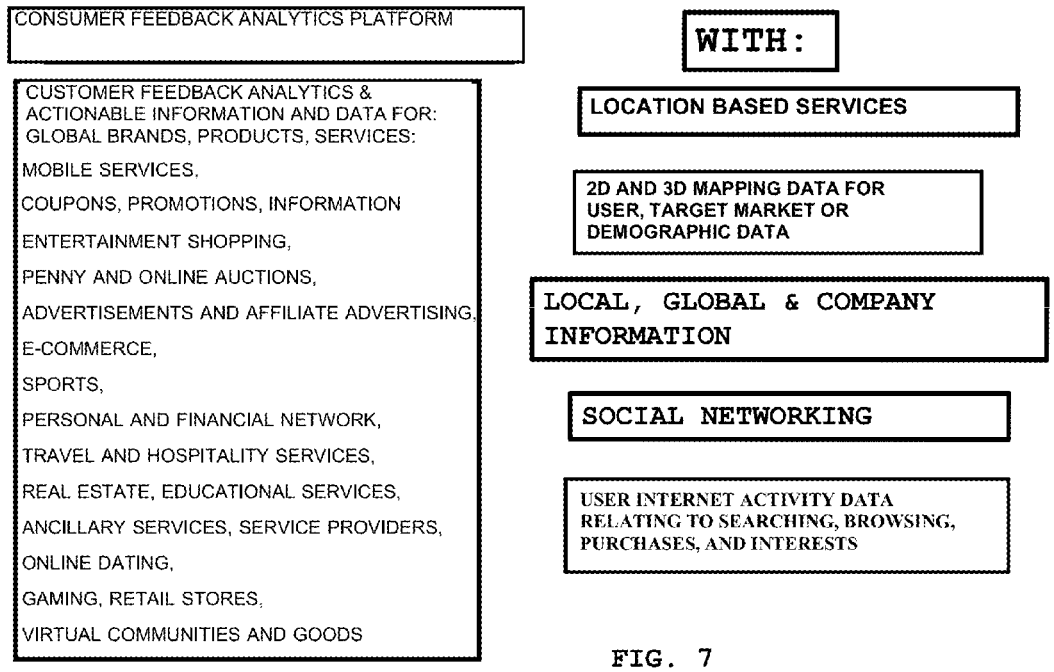
FIG. 7 provides tables showing the use of delivering advertising search impressions to advertisers brands and other third parties for online

As presented in FIG. 7, the present invention provides in one aspect a delivery system for providing, using, and delivering consumer feedback social analytics platform to provide actionable data in evaluating and improving consumer perception of products, services, or promotions thereof, in order to generate feedback that companies and others can use to provide global brand online information and targeted marketing of location-based promotions, location-based offers, location-based information, social media content, promotions or offers in connection with an online or mobile news feed, position-based services, location-based advertising, mobile location-based advertising and promotions or offers and marketing impressions for a geospatial website for a multidimensional representation of information and/or scalable versions of web and mobile device content marketing impressions for an infrastructure and global platform that provides users or members and businesses of all types and sizes with access to broad markets for the delivery of delivering advertising search impressions to advertisers brands and other third parties for online marketing of location-based promotions, location-based offers, location-based information, social media content, promotions or offers in connection with an online or mobile news feed, location-based advertising, mobile location-based advertising and promotions or offers and marketing impressions, coupons and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, social networking, social networking interactions between members and generate marketing and mapping relationships between members of a social network or website and social networking websites or third party websites or applications, location impression-based services, GPS and GIS technologies, and the like, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based information, social media content, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services from advertisers, brands, and/or merchants from around the world.

Embodiments provide analytic measurement of online consumer feedback for products or services via online activity, communications, location information data, and social media content for users such as global enterprises, advertising agencies, sales and marketing departments, media companies, government agencies, and virtually any entity requiring real-time or near real-time access to such information. This online consumer feedback for products or services via online activity, communications, location information data, and social media content is quantified and provided in a relevant and user-friendly manner to these entities using an interface such as a graphical user interface (GUI). These embodiments provide both historical and current measurements to enable analysis of past and present information. Online consumer feedback for products or services via online activity, communications, location information data, and social media content is collected, sorted, and provided to relevant groups or entities. Certain embodiments describe a consumer feedback social media analytics platform for collecting and converting raw online consumer feedback for products or services via online activity, communications, location information data, and social media content into actionable information data to companies, organizations, and governmental agencies that can be used to increase the top-line growth and margins of its recipients. Additionally, this analyzation of social media information can be analyzed to determine trends in one or more of the above discussed categories.

Monitoring and analyzing this new information source may be used on its own or in conjunction with traditional research and measurements such as, for example, quantitative and qualitative market research, paid media tracking, and traditional web site analytics. This process is automated so that qualitative measurements can be analyzed, quantified, and presented with minimal human intervention. At least certain embodiments contemplate a collecting process referred to herein as "scraping" where social media sources are discovered or located and exploited for relevant information. The content is then analyzed and quantified in a manner relevant to the industry or other category. The analyzed and quantified online consumer feedback for products or services via online activity, communications, location information data, and social media content is then provided to the user of the social media analytics (SMA) platform in an efficient, timely and user-friendly manner using the interface. In one embodiment, the interface is user-specific.

Examples of the quantitative online consumer feedback for products or services via online activity, communications, location information data, and social media content data that can be provided by embodiments include: brand and product/service consumer or brand sentiment for users and their competition; the share of voice of the brand (e.g., volume of discussion about the brand, product or service) over the social media versus the competition; topics and keywords used by online discussion participants for the brand and the competition; information on the opinion leaders for the category (e.g., online social content authors with the most influential voices); top websites resulting from the brand search; automated alerts for changes in consumer or brand sentiment; keywords, terms or phrases in posts to the online social media websites; and much more. This information is analyzed, quantified, and provided to users in real-time or near-real-time for the purpose of, for example, marketing, public relations, advertising, sales, customer service, brand management, product development, investor relations, and so on. The result of this process is to provide highly relevant and timely actionable information data to companies, organizations, and governmental agencies to users of the SMA platform.

This information may be advantageous for several reasons including brand and product/service perception or consumer or brand sentiment analysis, trend recognition and opportunity identification, early warnings about customer service or quality issues, opinion leader identification and engagement, competitor monitoring, and optimized online advertising to name a few. This information allows users to quantify opinion on social media sites to gain insights into current consumer or brand sentiment about the users' products or services, brands, and technologies and those of their competitors. This information also enables users of the SMA platform to recognize trends in consumer buzz about new technologies, product or service types, and attributes. In addition, users may receive early-warning signs to identify dissatisfied customers. Users also may identify and target opinion leaders for a given product/service or category using this information. Embodiments of the SMA platform can also supplies users with a list of highly relevant websites where high-affinity users are exchanging opinions and making purchasing decisions. This information can also be made widely available inside users' organizations using an interface to push analytics to potentially everyone inside the organization instead of just the top-level marketing staff enabling entire organizations to establish an overall better sense of the voice of their customers and to make informed decisions at the customer level because embodiments focus on the social behavior of potential customers using online user online activity and social media sources and provide far better insight into commercially relevant interests.

Figure 8:
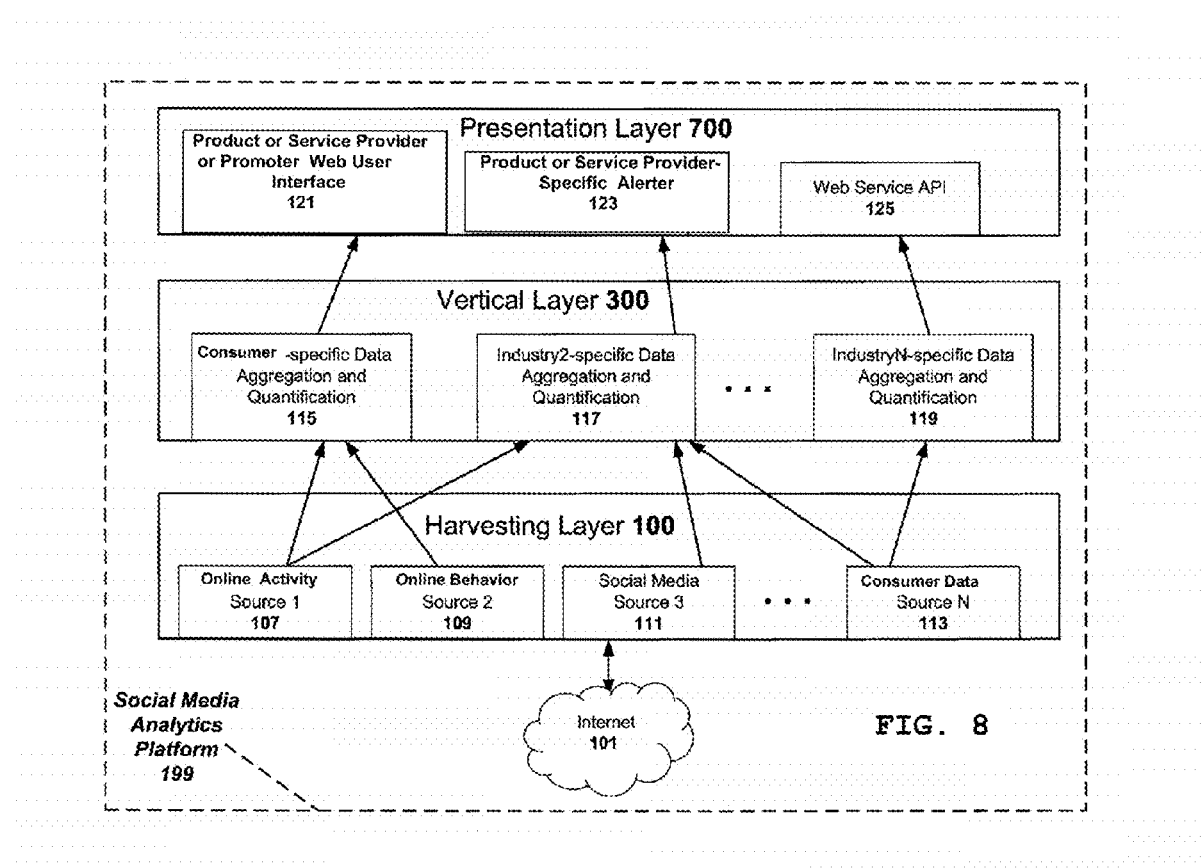
FIG. 8 illustrates a block diagram\m of a consumer feedback social media analytics platform according to an exemplary embodiment of the invention.

FIG. 8 illustrates a block diagram of a consumer feedback social media analytics platform according to an exemplary embodiment of the invention. In the illustrated embodiment, the SMA platform 199 is separated into three layers or phases—the collecting layer 100, vertical layer 300 and presentation layer 700. The collecting layer 100 includes locating or discovering online activity, behavior, and social media sources (e.g., websites) from the Internet related to a particular industry or other category, and collecting the relevant content from those sources. The collecting layer may process the relevant content from these Internet sources at any frequency such as daily, hourly, weekly, and minute-by-minute. The vertical layer includes analyzing and electronically quantifying on a networked computer system using a processor the collected social media content, and the presentation layer includes a user interface to display the quantified online consumer feedback for products or services via online activity, communications, location information data, and social media content as an alerter to alert users of the Consumer Feedback Social Media Analysis (CF-SMA) platform 199 in a real-time or near real-time manner when changes occur in consumer or brand sentiment. The basic structure includes data collection and storage of online consumer feedback for products or services via online activity, communications, location information data, and social media content for specific industries or other categories. The data collection and storage of online consumer feedback for products or services via online activity, communications, location information data, and social media content may be performed for any type of category or product line.

The collecting layer 100 of FIG. 8 includes online user online activity and social media sources discovered or located on the Internet 101 including online activity source 1_107, online behavior source 2_109, social media source 3_111, and so on through consumer data source N_113. Vertical layer 300 of a Consumer Feedback Social Media Analysis (CF-SMA) platform 199 is where the online consumer feedback for products or services via online activity, communications, location information data, and social media content relevant to each industry is analyzed, quantified, and stored in a database. In the illustrated embodiment, Product/Service-specific data analyzation and quantification 115 receives content from online activity source 1_107 and online behavior source 2_109 of collecting layer 109, Industry-specific data analyzation and quantification 117 receives content from online activity source 1_107, social media source 3_1 11, and consumer data source N_113, and Category-specific data analyzation and quantification 119 receives content from consumer data source N_113. For every identified source, relevant consumer feedback for products or services via online activity, communications, location information data, and social media content and is retrieved and processed. The vertical layer 300 stores the analyzed and quantified online consumer feedback for products or services via online activity, communications, location information data, and social media content in a database and supplies the content to the presentation layer 700 for display. Presentation layer 700 of FIG. 8 includes product/service-specific web user interface 121 for display of the analyzed and quantified online consumer feedback for products or services via online activity, communications, location information data, and social media content received from vertical layer 300. Presentation layer 700 also includes a web service application programming interface (API) to provide fully automated data integration into third-party analytics or data presentation systems, and a product/service-specific alerter 123 to provide alerts relating to changes in online social media consumer or brand sentiment. The product/service-specific alerter 123 may be tailored for each user of the CF-SMA platform 199.

Figure 9:
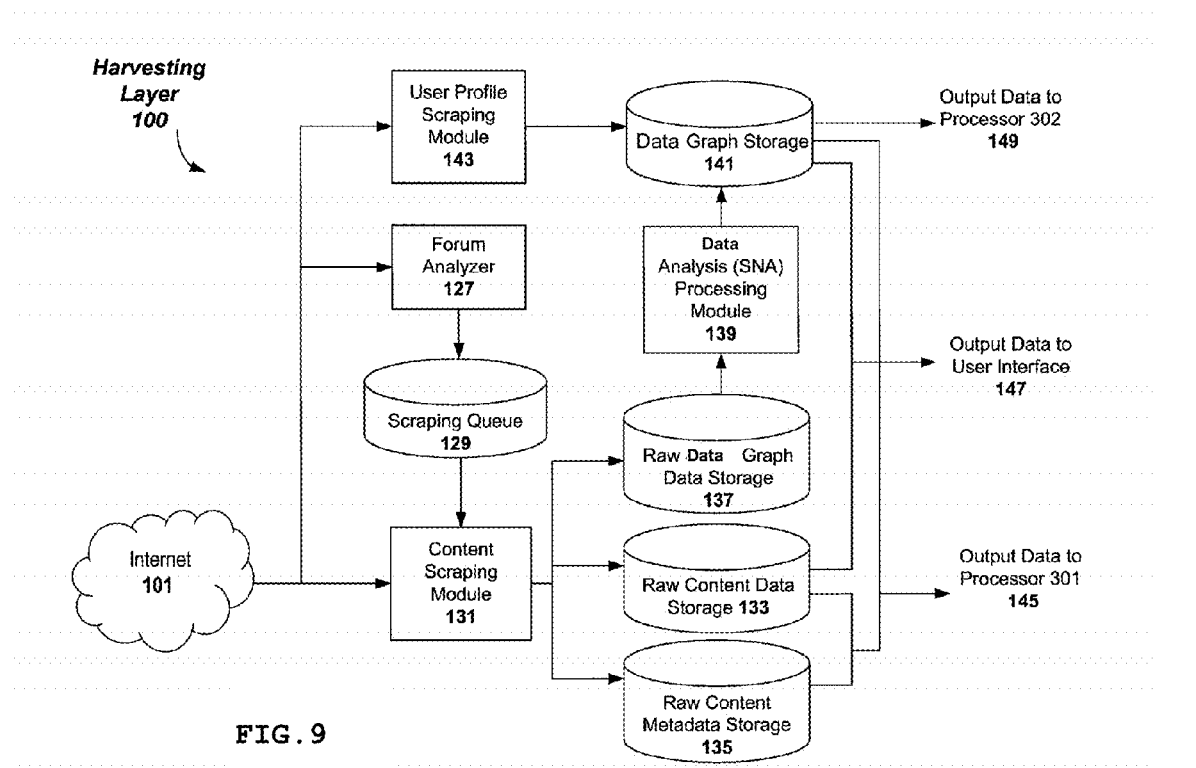
FIG. 9 illustrates a block diagram of the collecting layer according to an exemplary embodiment of the invention.
Figure 10:
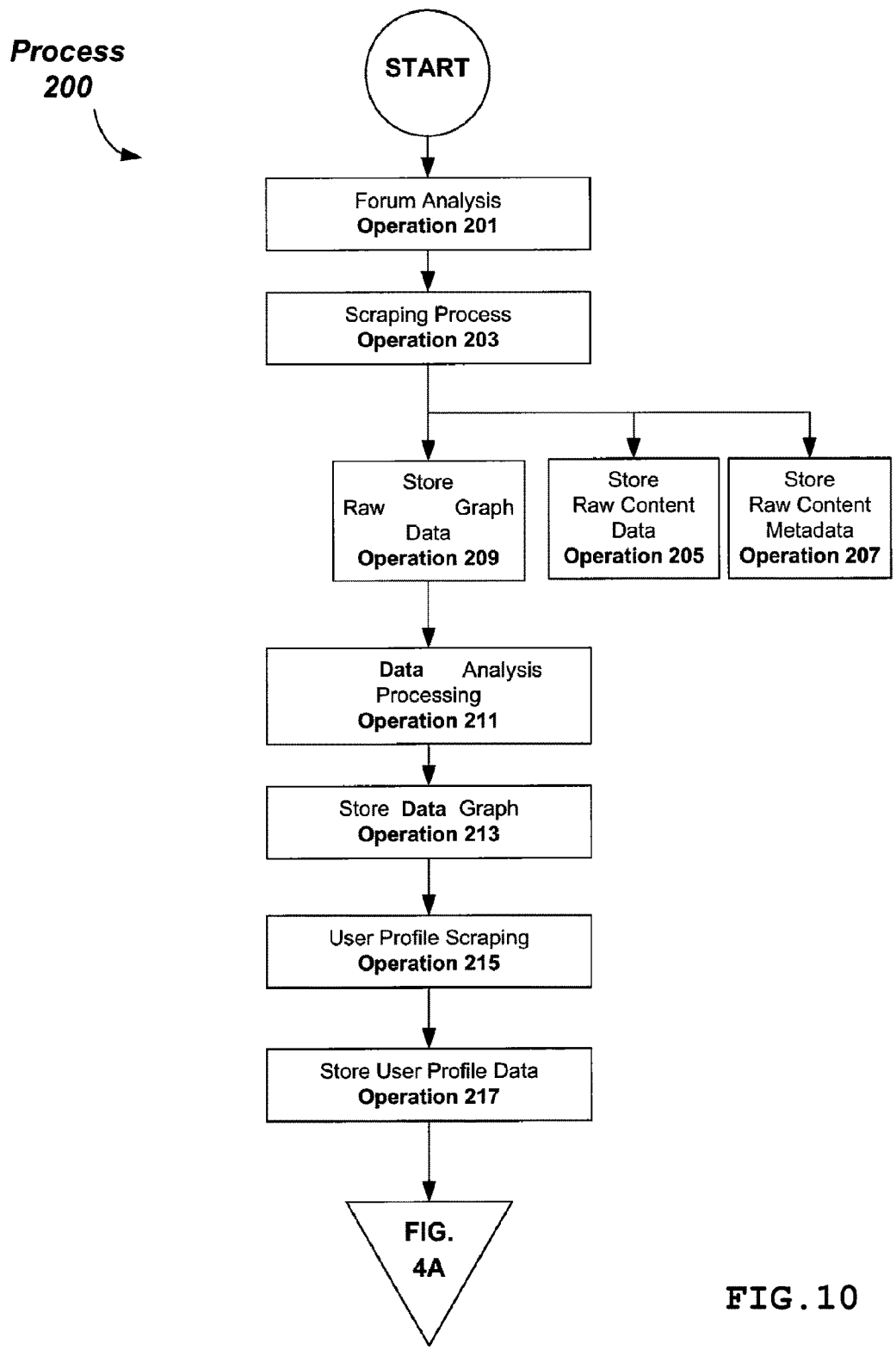
FIG. 10 illustrates collecting layer processing according to an exemplary embodiment of the invention.

FIG. 9 illustrates a block diagram of the collecting layer according to an exemplary embodiment of the invention. As discussed above, the collecting layer 100 locates online consumer feedback for products or services via online activity, communications, location information data, and social media content sources on the Internet and collects relevant content from them. The block diagram components of the collecting layer 100 will be discussed in conjunction with process 200 of FIG. 10, which illustrates collecting layer processing according to an exemplary embodiment of the invention. Process 200 begins with performing forum analysis using forum analyzer 127 (operation 201). The function of the forum analyzer 127 is to scour the Internet 101 searching for online consumer feedback for products or services via online activity, communications, location information data, and social media content (threads) relevant to a particular industry, product/service or other category. In at least certain embodiments, the forum analyzer 127 accomplishes this using automated tools for identifying industry-specific social media data sources from which to collect information and provide to the users of the CF-SMA platform. This includes a forum analysis to locate or discover which forums and/or sub-forums are relevant to a specific user's industry or other category from which the online consumer feedback for products or services via online activity, communications, location information data, and social media content should be collected. To accomplish this, search results from publicly available online search engines are processed to determine relevant websites based on the relevance score of each site for the keywords of interest. Each website found through this process is then accessed by the system to determine structural properties such as the technical nature of the source (e.g. RSS feeds, certain discussion forum software packages) and to identify the entry page locations later used in the content scraping module 131. The online consumer feedback for products or services via online activity, communications, location information data, and social media content sources that are identified in this operation are then staged in the scraping queue 129 to feed the content scraping module 131 for the scraping process (operation 203).

At operation 203 the scraping process is performed including scouring the identified online user online activity and social media sources for online communications and activity relevant to a particular sector or other category and breaking down the content into pieces to be stored for later processing. The scraping process starts at an overview page typically provided by each social media source and identifies hyperlinks to potentially relevant subpages and content pages based on the structural properties of these hyperlinks. The process then iteratively drills down multiple levels of subpages in the same manner until a specific relevant discussion thread is found. Each discussion thread is then analyzed in order to isolate its atomic content components for further processing. For example, a particular relevant social media source (e.g., website) may have a web page with a thread containing 20 different posts relating to the Audi A6 automobile. In such a case, the web page would be retrieved and broken apart into 20 pieces, with each piece stored individually along with the user-profile information of the authors who posted the content.

The results of the scraping process include: the raw online communications and activity of each social media post referred to as the raw post content data; the metadata of the raw post content; and information relating to the author of each post, as well as relationships between authors, referred to as the raw consumer feedback graph data. The raw post content retrieved from the online user online activity and social media sources is stored in raw content storage 133 (operation 205). This includes the actual text of the relevant social media post. The raw content metadata is also stored in raw content metadata storage 135 (operation 207). The raw content metadata includes information such as the URL of the social media website, and the length, context, and time of the post. Additionally, the raw consumer feedback graph data is stored in raw consumer feedback graph data storage 137 (operation 209). This data may include the social media post's author profile data such as the author's username, demographic information, number of posts to the social media website, those responding to the author's posts, and the author's contacts.

In the illustrated embodiment, the data analysis (DN) processing is then performed on the raw consumer feedback graph data stored in raw consumer feedback graph data storage 137 (operation 211). Here, information on each author of a social media post and on those responding to the author's post is retrieved from the raw data graph storage 137 and used to generate a social graph which includes an analyzation of social network information that can be useful in several contexts. For example, the social graph data may be analyzed to determine information about the author's social network including which authors are communicating about what topics, who is responding to which posts, what the related content is, and so on. The SNA processing is used to develop this information on networks of related authors and posts and to determine which authors are the most influential within these networks based on the social graph. The SNA processing first calculates a so-called centrality value for each author that expresses the author's degree of influence in a given social network. Authors that are connected to a large number of other authors and also connected to distinct sub-groups of authors are assumed to have higher influence than less well-connected authors. In order to calculate the centrality value, a version of Brands' Betweenness Centrality algorithm is applied to the raw social graph for each website. The resulting raw centrality value is then modified with the activity level of the author, i.e. the number of posts written by this person, and an importance score for the website where that author is active. Within graph theory and network analysis, there are various measures of the centrality of a vertex within a graph that determine the relative importance of a vertex within the graph. Betweenness is a centrality measure of a vertex within a graph. Vertices that occur on many shortest paths between other vertices have higher betweenness than those that do not. For instance, an influential author on a large website such as MySpace® will receive a higher influence score than the author of a little known blog. In at least one embodiment, the influence score for each author is calculated by the following formula:

Influence score=$bc*(c_a+a/p_a)*(c_p+p)$, where bc is the raw betweenness centrality value for the author;
a is the number of active authors on the website where the author is active;

p is the number of posts that the author has contributed;
$c_a$, $p_a$, and $c_p$ are correction parameters that are fine-tuned for the purposes of a specific vertical (i.e., a specific category of interest, according to methods know in the art or described herein).

The SNA processing also provides information including: the websites on which each of the social media authors have contributed; registrations in social networks; the status of influence of the authors; the author's sentiment towards a given brand, product or service; known demographic and geographic information about the authors; and trends in all of the above.

The social graph is then stored in data graph storage 141 (operation 213). An additional input into the data graph storage 141 is from user-profile scraping data accumulated from the Internet 101 using user-profile scraping module 143. At operation 215, the user profile scraping module 143 scours the Internet 101 to find any other information about the authors of the online consumer feedback for products or services via online activity, communications, location information data, and social media content. Whatever information associated with the author that can be collected from the Internet 101 is collected and stored along with the social graph in data graph storage 141 (operation 217). This completes the collecting layer process 200 according to an exemplary embodiment.

Figure 11:
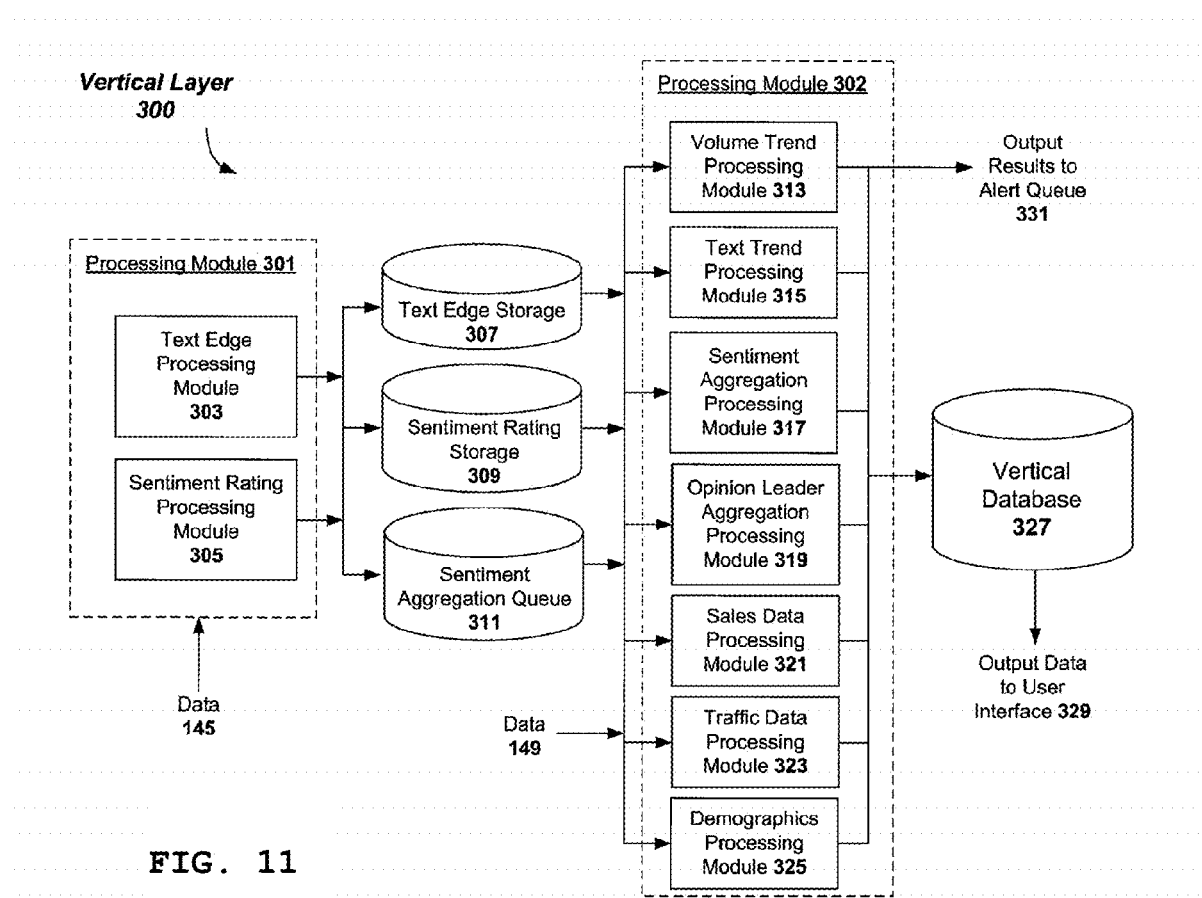
FIG. 11 illustrates a block diagram of the vertical layer according to an exemplary embodiment of the invention.

FIG. 11 illustrates a block diagram of the vertical layer according to an exemplary embodiment of the invention. As discussed previously, the data collected using the scraping process 100 is fed into the vertical layer 300. The vertical layer 300 is a grouping based on sector, industry, or other category. A vertical layer may be generated for every conceivable category such as industry, topic of interest, type of website, geographic region, and so on. There is essentially no limit to the types of categories that can be collected, analyzed and quantified to provide relevant, timely and actionable information data to companies, organizations, and governmental agencies to users of the CF-SMA platform. The block diagram components of the vertical layer 300 will be discussed in conjunction with process 400A of FIG. 12 and process 400B of FIG. 13.

Figure 12:
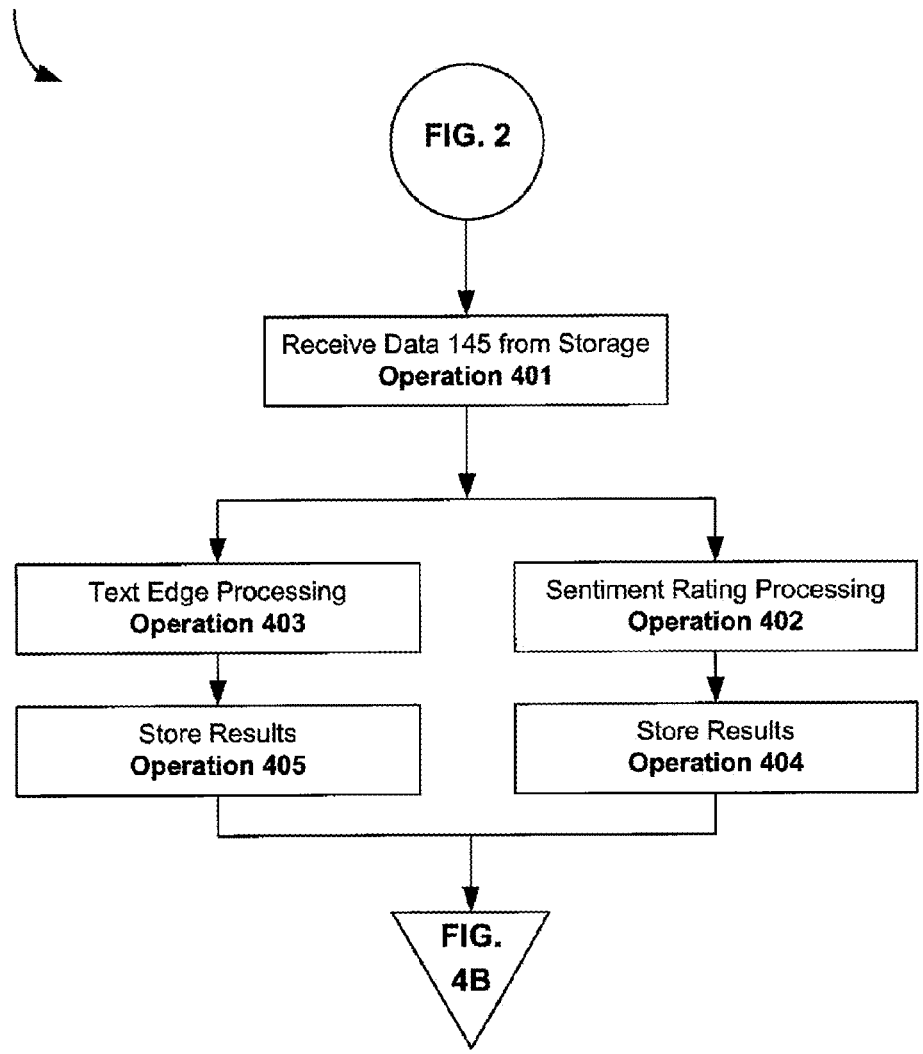
FIG. 12 illustrates vertical layer processing according to an exemplary embodiment of the invention.
Figure 13:
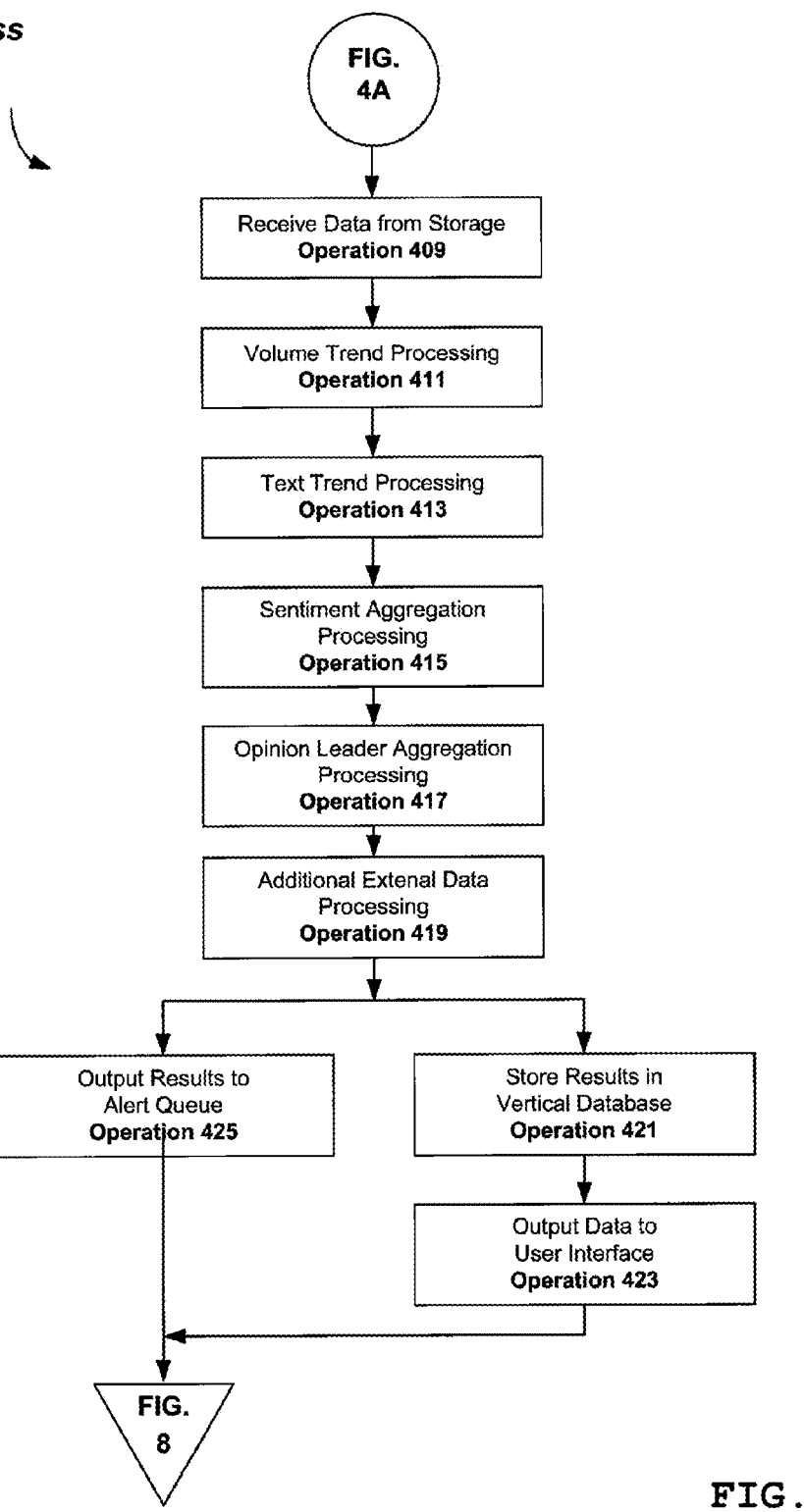
FIG. 13 illustrates additional vertical layer processing according to an exemplary embodiment of the invention.
Figure 14:
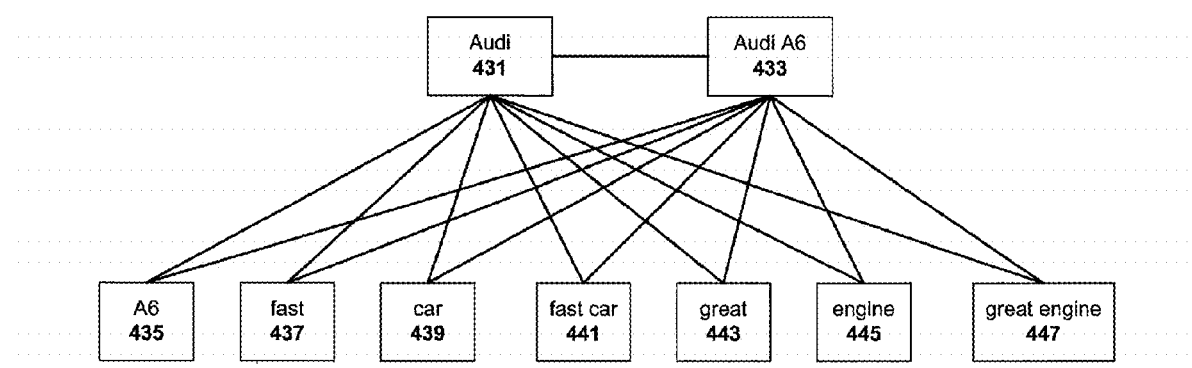
FIG. 14 illustrates text edge parsing for an individual sentence according to an exemplary embodiment of the invention.

FIG. 12 illustrates vertical layer processing according to an exemplary embodiment of the invention and FIG. 13 illustrates additional vertical layer processing according to an exemplary embodiment of the invention. Process 400A begins with receiving data 145 at processing module 301 from storage (operation 401). The data 145 received from storage is the output data 145 from FIG. 9 including the raw content data from raw content data storage 133, the raw content metadata from raw content metadata storage 135, and the social graph data from data graph storage 141. Process 400A continues with performing text edge processing on the raw content data from raw content data storage 133 and the raw content metadata from raw content metadata storage 135 (operation 403). Text edge processing is performed using text edge processing module 303 of processing module 301. Text edge processing, in one embodiment, utilizes graph theory to analyze the terms and concepts contained within the online consumer feedback for products or services via online activity, communications, location information data, and social media content to determine the frequency of occurrence of these terms and concepts in conjunction with the relevant brand, product or service and the relatedness of the concepts and/or terms in the post to that brand, product or service. Relationships between these terms are analyzed to determine graph edges which indicate the strength of these relationships. In a first step, a relevant sentence is parsed and split up into individual words and tuples of adjacent words. Stop words with little informational value such as "of," "it," "is" and so on are excluded in this step. Next, the relationship between the main term of interest (e.g. a brand, service or product name) and each found word or tuple is stored. FIG. 14 illustrates text edge parsing for an individual sentence according to an exemplary embodiment of the invention. In the illustrated embodiment, the sentence, "[t]he Audi A6 is a very fast car with a great engine," is parsed to determine relationships between the main terms of interest (Audi 431 and Audi A6 433) and each found word or tuple in the sentence (A6 435, fast 437, car 439, fast car 441, great 443, engine 445, and great engine 447).

Figure 15:
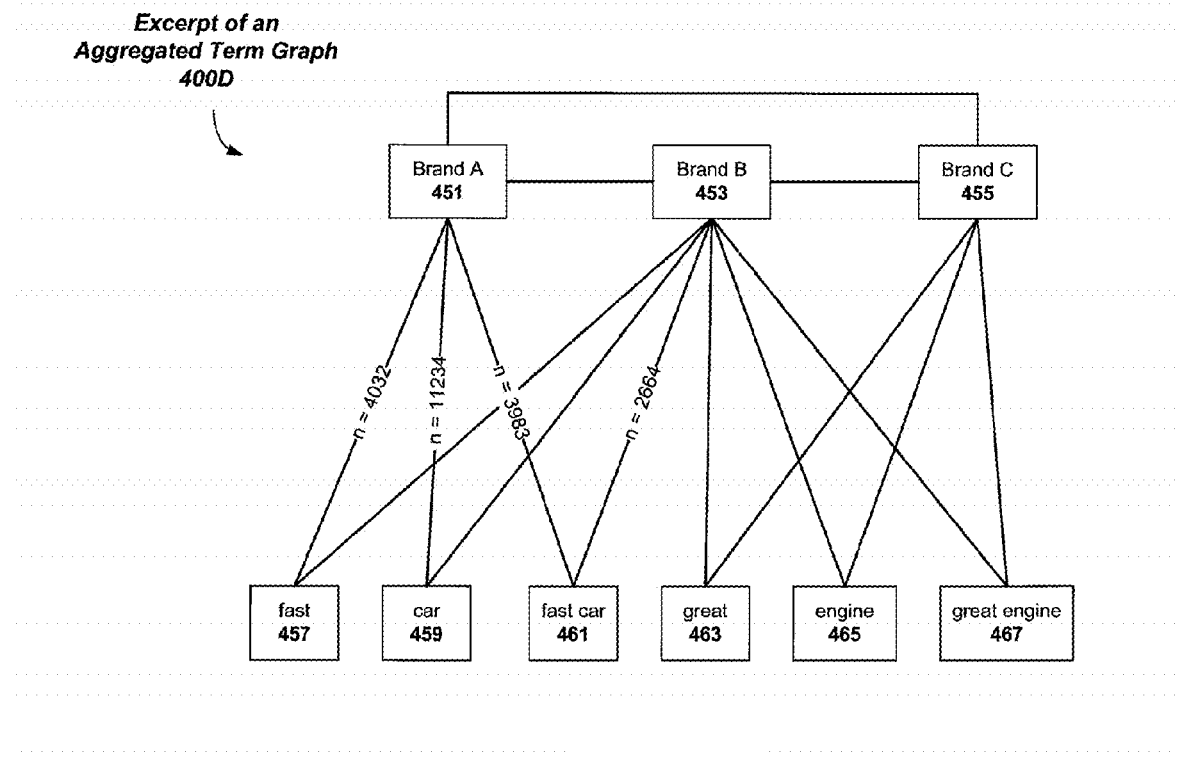
FIG. 15 illustrates an excerpt from an analyzed term graph according to an exemplary embodiment of the invention.

In FIG. 14, the lines between the main terms of interest and each found word or tuple indicate that such a relationship exists. Each relationship is then counted as one instance of an "edge" between these connected objects. In the following analyzation step, the number of edges between objects is added up. The resulting frequency of edge occurrences is an indication of how closely two terms are connected. For instance, if the tuple "fast car" is used significantly more frequently in connection with car brand A than with car brand B (corrected by the total number of posts about each brand), we can assume that social media users perceive car brand A as a stronger producer of fast cars. FIG. 15 illustrates an excerpt from an analyzed term graph according to an exemplary embodiment of the invention. The number of edges between brands (brand A 451, brand B 453, and brand C 455) and each found word or tuple (fast 457, car 459, fast car 461, great 463, engine 465, and great engine 467) are added up to determine the frequency of edge occurrences. For example, in the illustrated embodiment, brand A 451 has a total of n=3,983 edge occurrences with respect to the tuple "fast car 461." In contrast, brand B 453 only has n=2664 edge occurrences with respect to the tuple "fast car 461." Thus, from the fact that the tuple fast car 461 is used significantly more frequently in connection with brand A 452 than with brand B 453 (corrected by the total number of posts for each brand), we can assume that social media users perceive brand A 451 as a stronger producer of fast cars than brand B 453. The data resulting from text edge processing module 303 of processing module 301 is then stored in text edge storage 307 (operation 405).

Consumer or brand sentiment rating data processing is then performed using consumer or brand sentiment rating processing module 305 on the raw content data stored in raw content data storage 133, the raw content metadata stored in raw content metadata storage 135, and the social graph information stored in data graph storage 141 (operation 402). Consumer or brand sentiment rating processing includes analyzing the actual text of online consumer feedback for products or services via online activity, communications, location information data, and social media content to find keywords, terms or phrases to determine if a particular post refers to the particular brand, product or service of interest. This helps to determine the consumer or brand sentiment about the brand, product or service. The input to consumer or brand sentiment rating processing module 305 includes the actual text of the social media post, lists of keywords, and so on. Industry-specific keywords are identified and a value or consumer or brand sentiment rating is assigned to each of these keywords. In at least certain embodiments, this processing includes natural language and sentence structure analysis to determine which parts of the text of a social media post apply to the particular brand, product or service.

Once the keywords are identified, they are processed using a number of factors including how many times the keyword appears in the social media post, the closeness and linguistic context of the keyword in relation to the brand, product or service, and whether the keyword reflects a positive, negative, or neutral consumer or brand sentiment about the brand, product or service. This processing may also require balancing opposing keywords (e.g., both positive and negative keywords in the same post) to determine an overall consumer or brand sentiment rating of how positive, negative, or neutral the social media post is in relation to a brand, product or service.

Keywords are assigned with a positive and negative probability value each that express the probability that the keyword means something positive or negative in the context of the specific vertical. Since the same word can have different meanings per industry or topic, these probabilities can be specifically set per vertical. Also, some embodiments include a training or feedback loop where keywords may be re-rated over time based on experience. During the processing, terms of interest (brands, products, service names) and their synonyms are identified in the text of the social media post. In a next step, the environment (the closest n words) of this occurrence is searched for relevant consumer or brand sentiment keywords that might refer to the term of interest. Linguistic elements such as negations, comparatives, or enumerations are taken into account when determining the relevance of a consumer or brand sentiment keyword for the term of interest. Each occurrence of the term of interest is assigned with a consumer or brand sentiment score depending on the keywords in the environment, the linguistic modifiers present, the proximity of the keyword to the term of interest, and potentially reduced confidence due to ambiguities. Finally these atomic scores are added up for the whole post and corrected by the relevance of the post for the term of interest, i.e. the percentage of the post that actually refers to the term of interest.

This information is then combined with the social graph data from data graph storage 141 to determine a weighting factor of the social media post. That is, the consumer or brand sentiment rating processing of operation 402 takes into consideration the level of influence the author of the social media post has in determining the consumer or brand sentiment rating. A weighting factor is determined based on the influence of the author of the social media post. The resulting data from consumer or brand sentiment rating processing module 305 is then stored in the consumer or brand sentiment rating storage 309 (operation 404). Additionally, the consumer or brand sentiment rating data stored in consumer or brand sentiment rating storage 309 is analyzed over time in the consumer or brand sentiment analyzation queue 311 for consumer or brand sentiment trend processing to be discussed infra. This completes process 400A according to an exemplary embodiment and control flows to process 400B of FIG. 13. In short, the consumer or brand sentiment rating is generated using a combination of natural language processing, statistical processing, positive/negative keyword modifiers and author and site influence.

Process 400B begins at operation 409 where data from storage is received at processing module 302 from storage. The data received from storage includes the social graph data 149 output from data graph storage 141 of FIG. 9, the data from text edge storage 307, the data from consumer or brand sentiment rating storage 309, and the data from consumer or brand sentiment analyzation queue 311. At operation 41 1, volume trend processing is performed on the data from storage using volume trend processing module 313 of FIG. 11. The overall volume of opinions about users' brands, products or services is calculated and trends over time can be determined based on volume trend processing. Additionally, volume trends about competing brands and products or services can be provided in this operation. Basic volume is calculated using the number of occurrences of a brand, product or service name and its synonyms per unit of time (e.g., day, month, or year). The content authored in each unit of time is searched for the terms of interest, and the number of occurrences is added up per unit of time and per term. When plotted in a time series, these volume data points describe the volume trend for the brand, product or service. At operation 413, text trend processing is performed on the data. The text trend processing analyzes the text edge information stored in text edge storage 307 in conjunction with time information to determine text trends over time. This processing is used to determine how consumer or brand sentiment changes over time. At operation 415, consumer or brand sentiment analyzation processing is performed on the consumer or brand sentiment rating and analyzation data from storage using consumer or brand sentiment analyzation processing module 317 of FIG. 11. The consumer or brand sentiment analyzation processing module 317 determines the analyzation of consumer or brand sentiment over time for various sources (or groups of sources) such as relevant websites, blogs, My Space® pages, and et cetera. This information may then be used to compare online user online activity and social media sources to determine which sources are more favorable for advertising a user's brands, products, or services. For example, this processing may determine a particular user's products or services are better advertised on My Space® instead of topic-specific blogs. Additionally, information can be gathered regarding which websites are initially more relevant for product releases, for example, and which websites are more relevant over time. This allows users of the CF-SMA platform to follow these trends and to roll-out or switch advertising campaigns based on this information. Process 400B continues with opinion leader analyzation processing using opinion leader analyzation processing module 319 of FIG. 11 on the data from storage (operation 417). The opinion leader analyzation processing module 319 determines the analyzation of opinion leader data over time to determine trends in opinion leader data. This information may be valuable to users by enabling them to identify and target social media authors with the most influence to enter into online communications and activity with these lead authors and influence their opinion to influence the opinions of many others.

At least certain embodiments include additional external data processing (operation 419). For example, sales data may be included in the trend processing using sales data processing module 321, traffic data may be included in the trend processing using traffic data processing module 323, and demographics data may be included in the trend processing using demographics processing 324. Sales data processing module 321 allows users to correlate the sales data with consumer or brand sentiment data over time. This can lead to predictions in sales volume data and pricing. Traffic data processing module 323 allows users to correlate the traffic data with consumer or brand sentiment data over time. Likewise, demographics processing 325 allows users to correlate demographics data with consumer or brand sentiment data over time. Other external data from users' database sources may also be included in the processing and correlated with consumer or brand sentiment data over time.

Figure 21:
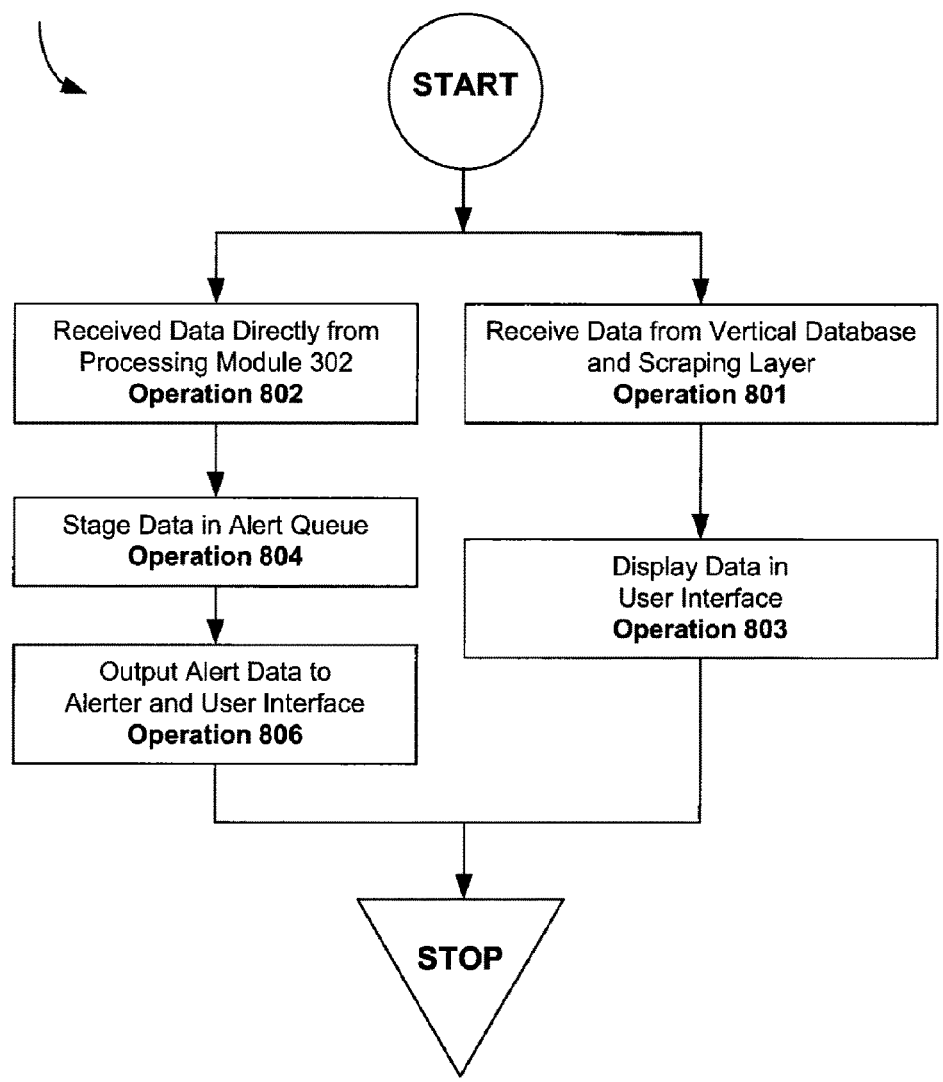
FIG. 21 illustrates presenting the analyzed and quantified online consumer feedback for products or services via online activity, communications, location information data, and social media content to users of the consumer feedback social media analytics platform according to an exemplary embodiment of the invention.

Process 400B continues with storing the results of the above processing in a database referred to herein as the vertical database (operation 421), and sending this data as output data to the user interface 705 of the presentation layer 700 for display (operation 423). Additionally, the results of the above processing are also output to the alert queue 425 for user alerts when consumer or brand sentiment trends change above or below a certain threshold, for example (operation 425). This allows for constant, real-time monitoring of emerging trends and consumer or brand sentiment. This completes the vertical layer processing according to an exemplary embodiment. Control flows to FIG. 21 where the output of the vertical layer 300 processing is fed into the presentation layer 700 for display to users of the CF-SMA platform.

Figure 16:
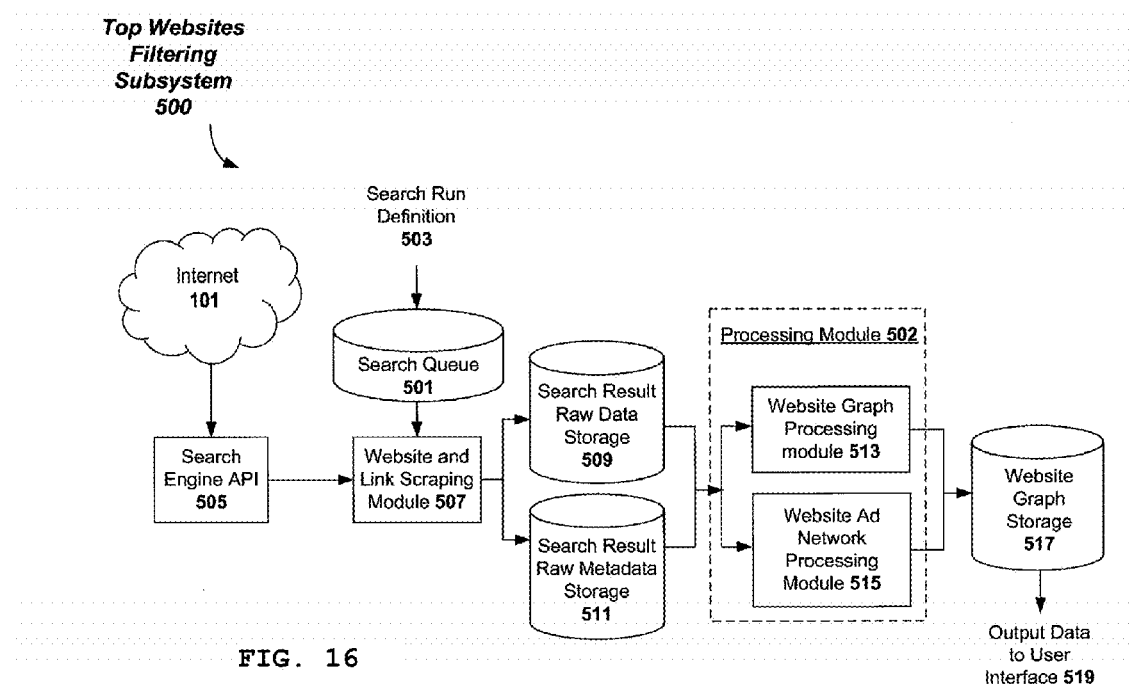
FIG. 16 illustrates a block diagram of the top websites filtering subsystem according to an exemplary embodiment of the invention.
Figure 17:
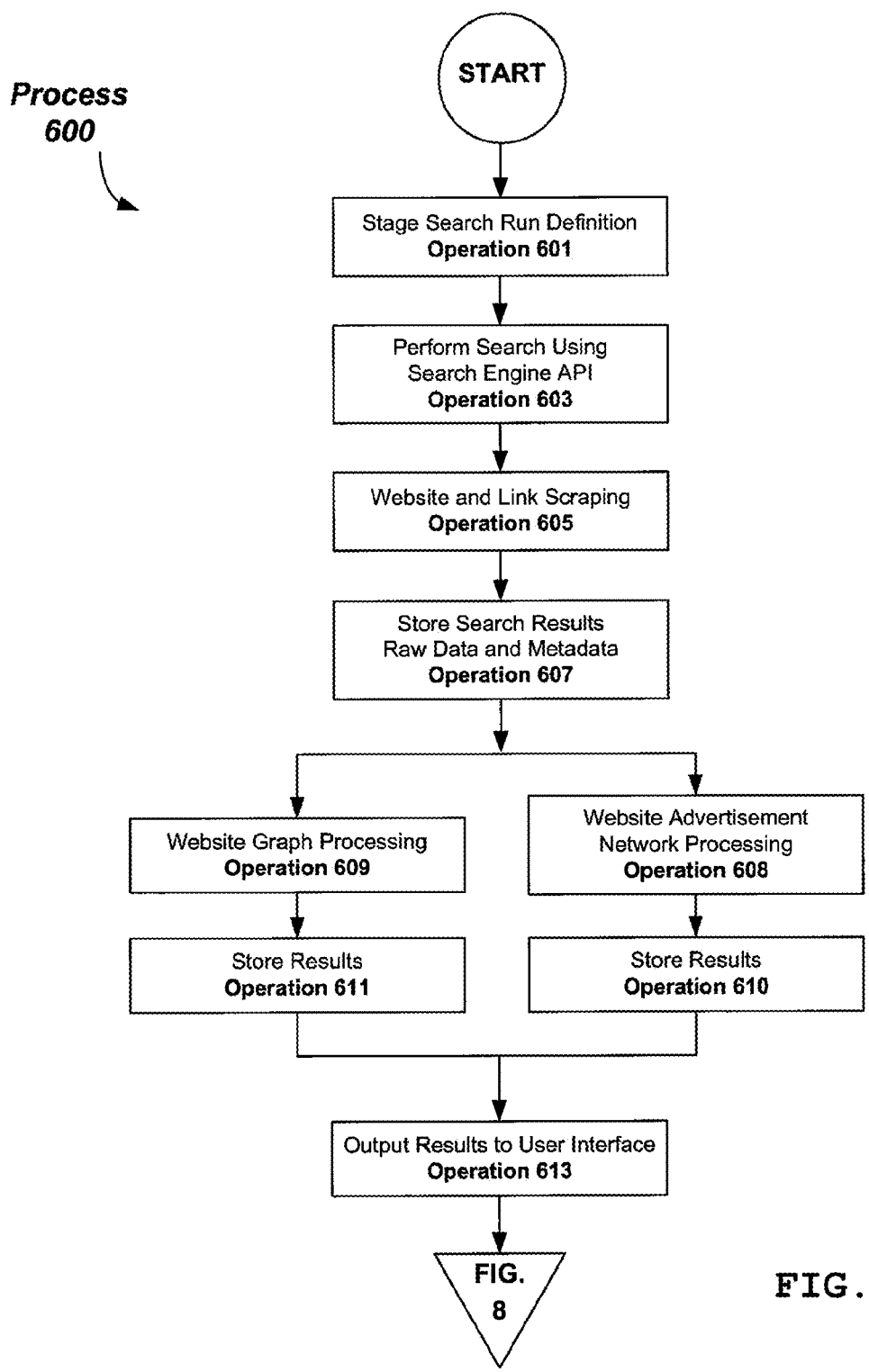
FIG. 17 illustrates performing top websites filtering according to an exemplary embodiment of the invention.

FIG. 16 illustrates a block diagram of the top websites filtering subsystem according to an exemplary embodiment of the invention. The top websites filtering subsystem 500 is considered a part of the vertical layer 300 and determines websites that are the most relevant to a particular user. Subsystem 500 performs one or more searches using a search engine API (such as Google, Yahoo or Technorati), pulls out search results from the search engine, and assembles the search results data to model search behaviors of search engine users so that a list of the most relevant websites for a users' brands, products or services can be compiled and provided to users of the CF-SMA platform. This can provide users with a list of websites having a high affinity for the users' industry or products/services so that targeted advertising campaigns can be launched, for example. Interestingly, this may not always be the websites with the highest traffic volume. This information is also fed into the user interface 705 of the presentation layer 700. The block diagram components of the top websites filtering subsystem 500 will be discussed in conjunction with process 600 of FIG. 17, which illustrates performing top websites filtering according to an exemplary embodiment of the invention.

Process 600 begins with staging one or more search run definitions 503 for processing in search queue 501 (operation 601). Search run definitions contain one or more brand or product names in combination with any number of other relevant keywords that a consumer might be searching for. One or more searches of the Internet 101 corresponding to the one or more search run definitions 503 staged in search queue 501 are then performed using one or more search engine APIs 505 (operation 603). The results of these searches are fed into website and link scraping module 507. Website and link scraping is then performed (operation 605) using the website and link scraping module 507. During this operation, the top websites filtering subsystem 500 actually goes into the websites found in the one or more searches and follows the website links within one or more of these websites. The websites found in the searches and the links within these websites is assembled for the purpose of attempting to model search engine users' behavior by determining which websites search engine users will likely visit when they run each of the one or more searches. In at least one embodiment, this information can provide users of the CF-SMA platform with a list of websites with a high affinity for the users' industry or products/services. This information may be useful in a variety of circumstances including allowing users to launch targeted advertising campaigns. For example, the top websites filtering subsystem 500 may run a search in Google for digital cameras and determine that a typical search engine user will only look at the first 3 web pages listed in the search results. The top websites filtering subsystem 500 will then follow the links in these 3 web pages to find more web pages and then follow the links in those web pages, and so on. The top websites filtering subsystem 500 will assemble this information and use it to build up a website and link network graph discussed below. The raw search result data resulting from website and link scraping module 507 is then stored in search result raw data storage 509 and the metadata is stored in search result raw metadata storage 511 (operation 607) to be provided to processing module 502.

Figure 18:
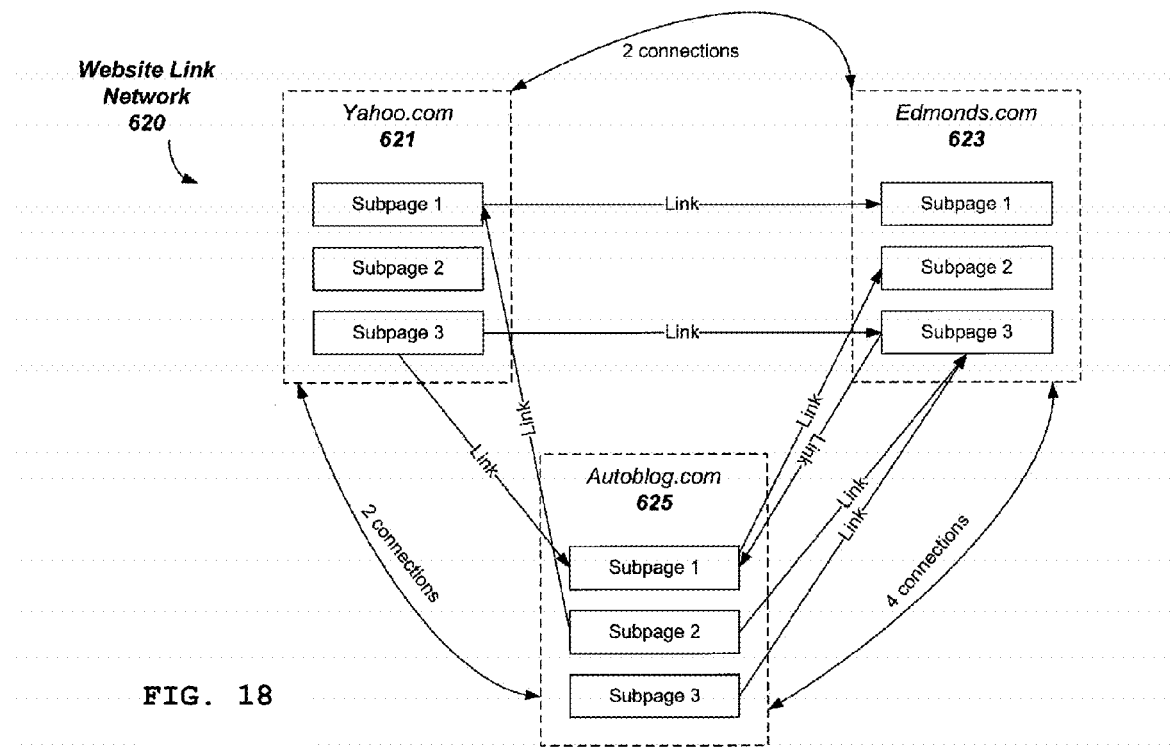
FIG. 18 illustrates an exemplary website link network according to one embodiment of the invention.
Figure 19:
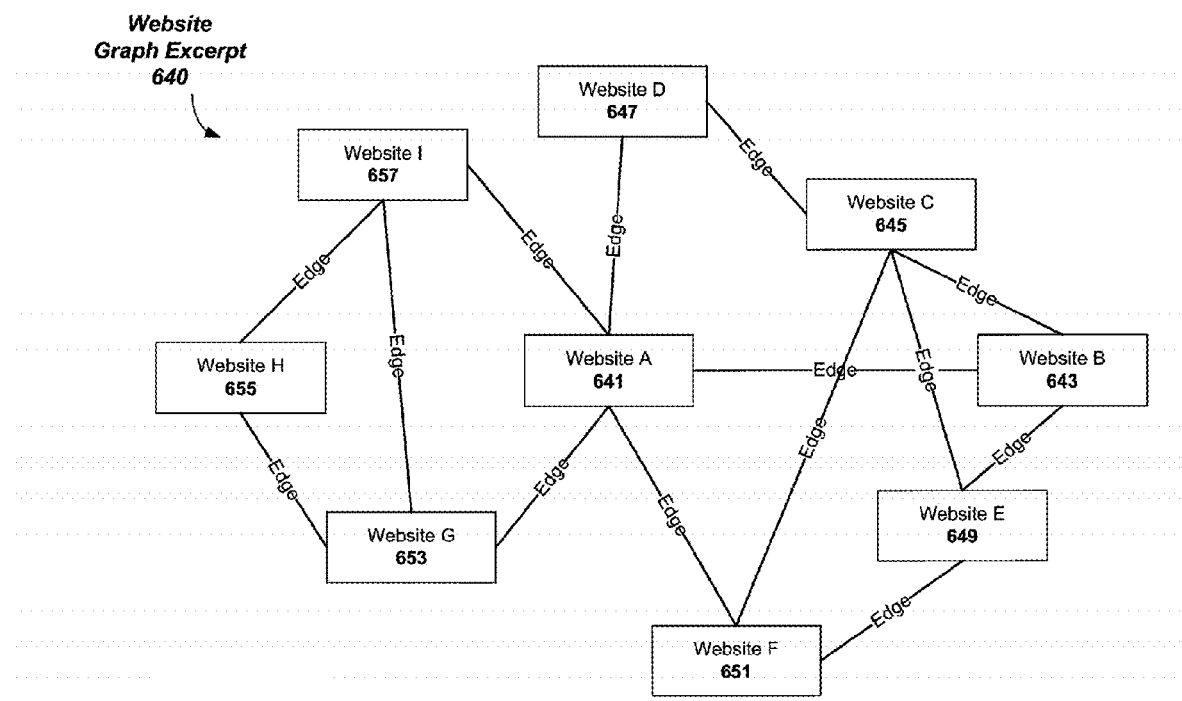
FIG. 19 illustrates an excerpt from a website graph according to an exemplary embodiment of the invention.

Process 600 continues with performing website graph processing (operation 609). In at least one embodiment, the website graph processing includes using graph theory to analyze the website network to determine the frequency of occurrence of each website in the website network in connection with the relevant brand, product or service and to determine the relatedness of each website in the website network to that brand, product or service. Relationships between these websites and the relevant brand, product or service are analyzed to determine graph edges which indicate the strength of these relationships. First, links between websites that contain content relevant to the brand, product or service are counted. The number of links between two websites provides an indication of how strongly the two websites are interconnected. FIG. 18 illustrates an exemplary website link network according to one embodiment of the invention. In the illustrated embodiment, website link network 620 includes three websites with links connecting to one another. In the example, there are two (2) connections between the websites Yahoo.com 621 and Edmunds.com 623 including a link from subpage 1 of Yahoo.com 621 to subpage 1 of Edmunds.com 623 and a link from subpage 3 of Yahoo.com 621 to subpage 3 of Edmunds.com 623. Likewise, there are four (4) connections between the websites Edmunds.com 623 and Autoblog.com 625 and two (2) connections between the websites Autoblog.com 625 and Yahoo.com 621 in the exemplary website link network 620. Once the number of links between each pair of websites is counted, a version of Brandes' Betweenness Centrality algorithm is applied to the resulting graph. This algorithm calculates centrality values that indicate how strongly connected a given website is to other relevant websites, either directly or indirectly. This is depicted in FIG. 19 which illustrates an excerpt from a website graph according to an exemplary embodiment of the invention. In the illustrated embodiment, website graph excerpt 640 includes lines representing "edges" where each "edge" is a connection between each pair of websites in the graph. Website A 641 is connected to website B 643, website D 647, website F 651, website G 653 and website 1647 within one (1) edge. Website A 641 is further connected to website C 645, website E 649 and website H 655 within two (2) edges. Therefore, website A 641 is connected to each other website within one or two edges, so it will receive a high centrality value in comparison to the other websites. Internet users that find any of the other websites in the graph when looking for information are very likely to end up on website A 641; therefore, it is assumed that website A 641 is highly relevant to this graph. In this manner websites that are the most relevant to a particular user of the CF-SMA platform are located. The resulting website network graph generated by the website graph processing module 513 is then stored in website graph storage 517 (operation 611) and the data 519 from the website graph storage 517 is output to the user interface 705 of the presentation layer 700 of FIG. 20 (operation 613). Process 600 continues at operation 608 where website advertisement network processing is performed using website ad network processing module 151. The website advertisement network processing, in at least certain embodiments, uses typical link patterns to identify advertisement networks that put advertisements on the analyzed websites. Since each advertisement network uses a particular type of software to provide advertisement banners, sponsored text links or other forms of online advertising, the resulting link patterns identify each advertisement network. Each website might carry advertisements from one or multiple networks, or no advertising at all. The website advertisement network processing is performed to provide users of the CF-SMA platform with information as to which advertisement networks are the most relevant for advertising their brands, products, or services. The resulting website advertisement network information generated by the website ad network processing module 515 is also stored in website graph storage 517 (operation 610) and output to the user interface 705 of the presentation layer 700 in FIG. 20 (operation 613). This completes the top websites filtering process 600 according to an exemplary embodiment. In short, the top websites filtering subsystem 500 is used to locate websites users of the CF-SMA platform are most likely to reach when searching online for information about a particular brand, product or service.

Figure 20:
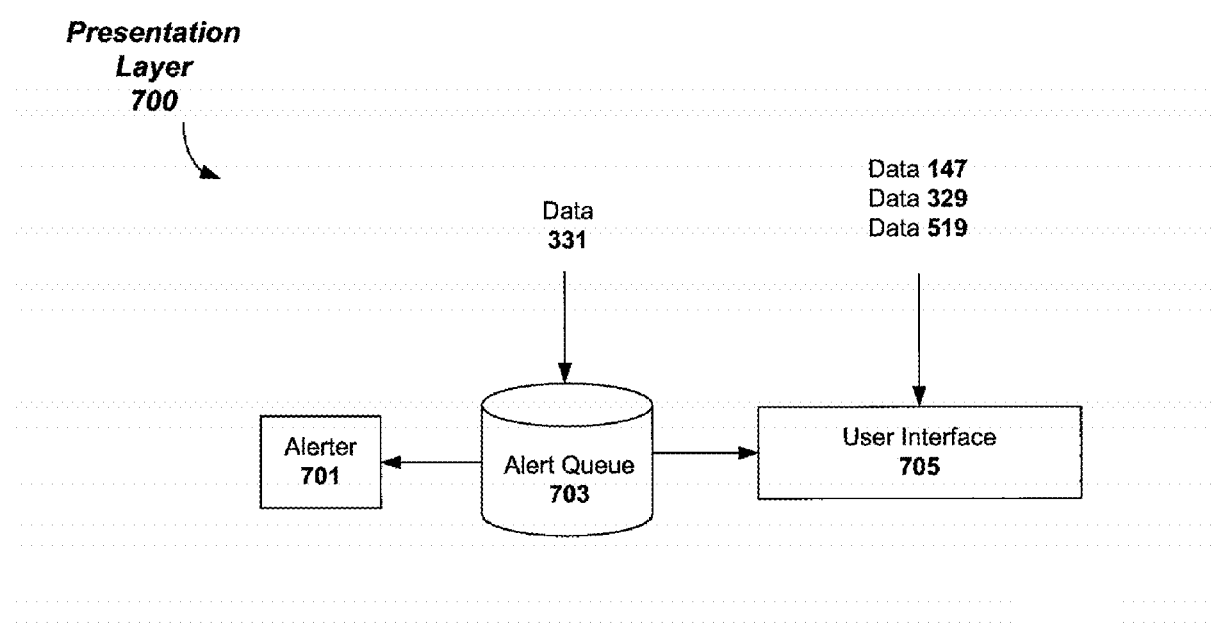
FIG. 20 illustrates a block diagram of the presentation layer according to an exemplary embodiment of the invention.

FIG. 20 illustrates a block diagram of the presentation layer according to an exemplary embodiment of the invention. The results of the vertical layer 300 processing and the top websites filtering subsystem 500 processing are fed into the presentation layer 700. In the illustrated embodiment, data 147 of FIG. 9, data 329 of FIG. 11, and data 519 of FIG. 16 are each fed into user interface 705. That is, the raw consumer feedback for products or services via online activity, communications, location information data, and social media content and stored in raw content data storage 133, the social graph stored in data graph storage 141, the data stored in vertical data base 327, and the website graph and website ad network data stored in website graph storage 517 are fed into the user interface 705. Likewise, the data 331 including the results of the processing performed within processing module 302 of FIG. 9 is fed into the alert queue 703. The user interface 705 may be a GUI, some embodiments of which are discussed infra. The block diagram components of the presentation layer 700 will be discussed in conjunction with process 800 of FIG. 21, which illustrates presenting the analyzed and quantified online consumer feedback for products or services via online activity, communications, location information data, and social media content to users of the CF-SMA platform according to an exemplary embodiment of the invention.

Process 800 begins by receiving the data stored in the vertical database 327 of the vertical layer 300 in FIG. 9, receiving the data stored in the data graph storage 141, and receiving the data stored in the raw content data storage 133 of the collecting layer 100 in FIG. 9 (operation 801). This data is received and displayed in the user interface 705 (operation 803). Process 800 also includes receiving data directly from the results of the processing performed in processing module 302 of FIG. 11 (operation 802). This data is received and staged in the alert queue 703 (operation 804) to be output to the alerter 701 and the user interface 705. Among other things, the alerter 701 is used for alerting users of the CF-SMA platform of real-time or near real-time changes in user or consumer or brand sentiment regarding their brands, products, or services. This completes process 800 according to an exemplary embodiment.

Some of the advantages of the consumer feedback social media analytics platform are that embodiments provide: brand/product/service-level analytics including websites frequently talking about the relevant brand, product or service; social media authors frequently talking about the brand/product/service; overall volume of opinions about the brand, product or service; overall consumer or brand sentiment towards the brand, product or service; volume and consumer or brand sentiment of opinions about competing brands, products or services; competing brands, products or services most frequently mentioned in connection with the users' own brand, product or service; terms used most frequently in connection with a brand, product or service; and trends and early-warning alerts for all of the above. Embodiments also provide site-level analytics including site traffic (unique visitors and pages viewed), topic distribution of site, overall consumer or brand sentiment towards a given brand, product, service or technology, number of active or contributing users, relevance of the active users, relationships to other relevant sites, and trends in all of the above. Finally, embodiments provide user-level analytics (users referred to here are participants in social media sites) including: sites on which users contributed content; known identities of users, users' registrations in social networks; influence of users; users' known ownership and/or use of a given product, service or technology; users' or consumers' sentiment toward a given brand, product, service or technology; users' known demographic and geographical attributes; and trends in all of the above.

In at least certain embodiments, a GUI is utilized to present the quantified and analyzed online consumer feedback for products or services via online activity, communications, location information data, and social media content in a manner relevant to the user. The GUI may be fully customizable giving users the ability to select which charts and graphs should appear on the login page of the interface. The GUI provides an intuitive display to visualize brand, product or service consumer or brand sentiment over time. This display is a quantitative measure of consumer opinion or sentiment for a brand, product, services, or its competitors and is derived from an automated analyzation of consumer or brand sentiment ratings on each individual post to online social media about a brand, product, services and/or those of their competitors. The GUI includes various knobs or switches to manipulate the above information in a variety of ways. Among many other things, inside the GUI users can filter information by product/service or competitor, groups of websites, data ranges, or drill down to the lowest level of granularity of the information to see the actual text of online social media posts as it appears on the originating source website. The GUI provides a visualization that allows users to give context to each social media post and gain familiarity with the posting website. The GUI is designed to be used by non-expert users without help from consultants. The GUI not only provides standard spreadsheet-style visualization such as bar and pie charts, but also highly innovative approaches including: radar screen; heat maps; geographical visualization; 3D clustering, tag clouds, and timelines. Content may be collected from as far back as sources make available. For example, discussion boards can have posts from many years ago. The start date on the GUI is configurable and is designed for ease-of-use allowing for a visualization of the underlying data calculations and analyzations instead of simply raw data.

Figure 22:
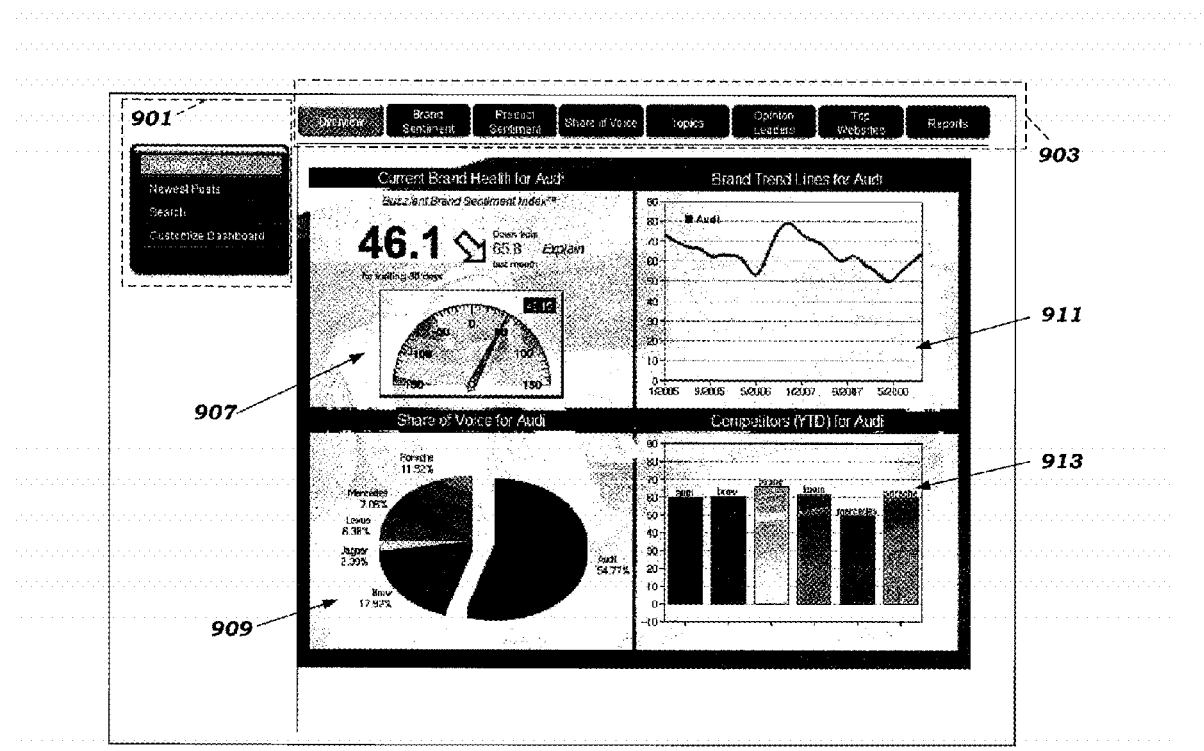
FIG. 22 illustrates a dashboard display in a graphical user interface according to an exemplary embodiment of the invention.

FIG. 22 illustrates a dashboard display in a graphical user interface according to an exemplary embodiment of the invention. The GUI display includes top-level menus and submenus. Top-level menus take users to main measurement categories. Submenus take users to more detailed information about the main measurement category. In the illustrated embodiment, the "overview" category is selected from top-level menu 903 and the "dashboard" category is selected in the submenu 901. The dashboard display provides a quick view into key measures of social media participation in users' particular brands, products, or services. It displays four (4) small reporting charts on one screen as a way for users to quickly see key measurements about their brand, product or service.

The dashboard may be customized according to the users' needs. The dashboard display in FIG. 22 includes: a brand sentiment index gauge 907 in the upper left corner; a brand trend line graph 911 in the upper right corner; a share of voice chart 909 in the lower left corner; and a brand sentiment chart 913 in the lower right corner. The brand sentiment index gauge 907 tells how positively or negatively social media participants are talking about users' brands, products, or services. The brand sentiment index gauge 907 reflects this online activity for the current month. They value of zero (0) means neutral sentiment. Positive values of 20 or above are typically very good. The brand trend line graph 911 shows how social media participant attitudes and opinions for a user's brand, product or service have changed over time. This enables users to see how sentiment has responded to various events such as advertising campaigns, programs and product launches. The share of voice chart 909 indicates the percentage of social media posts referring to the users' brands in comparison with their competitors. This allows users to gain important insight into the relative activity the users' brands are generating in online social media. The brand sentiment chart 913 displays users' annualized brand or consumer sentiment index in comparison with the indices of users' competitors for the current year. Clicking on a chart in the dashboard display takes users to the full-screen version (except for the sentiment index gauge 907). In one embodiment, each user can customize the dashboard by selecting the charts the user wishes to see by default.

Figure 23:
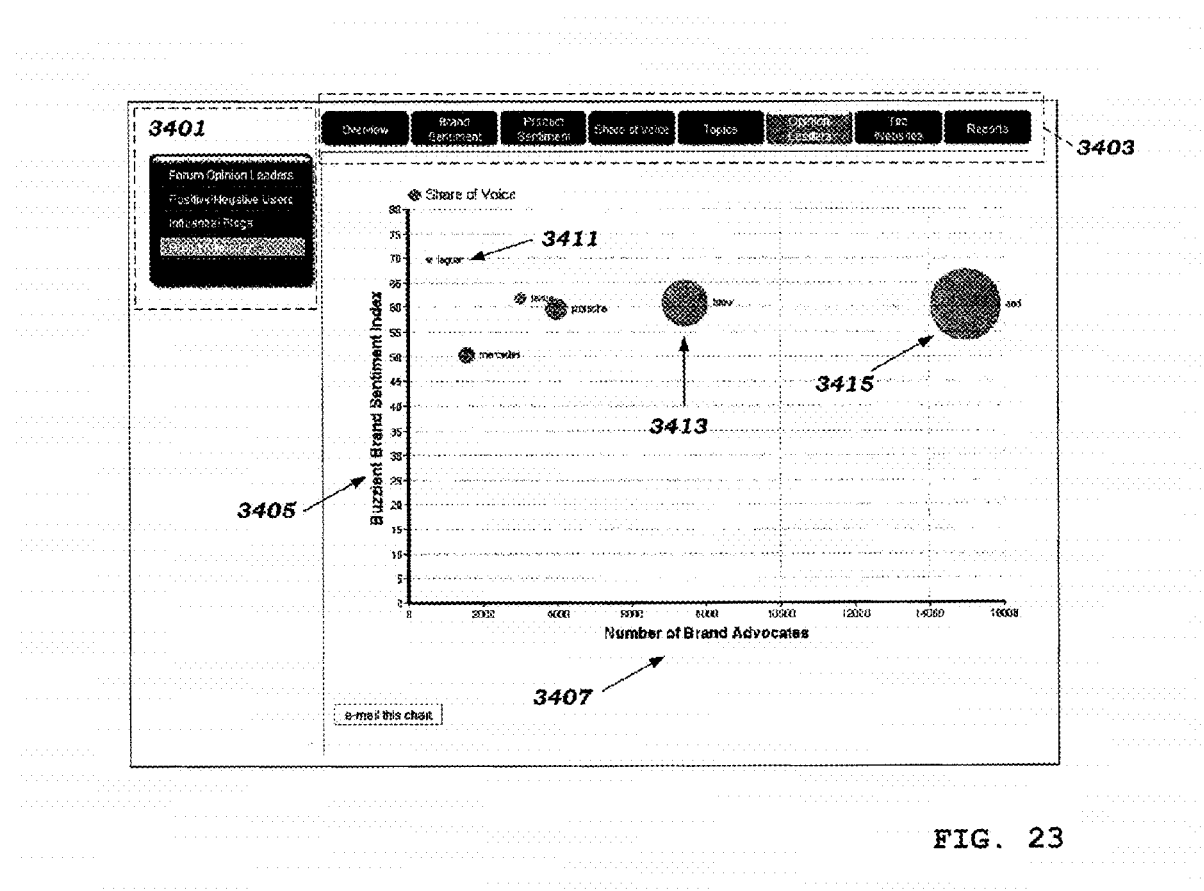
FIG. 23 illustrates an overall brand advocacy display in a graphical user interface according to an exemplary embodiment of the invention.

FIG. 23 illustrates an overall brand advocacy display in a graphical user interface according to an exemplary embodiment of the invention. In the illustrated embodiment, the "opinion leaders" category is selected in the top-level menu 3403 and the "brand advocacy" category is selected in the submenu 3401. The x-axis 3405 reflects the brand sentiment index value and the y-axis 3407 reflects the number of brand advocates. Also the share of voice is represented by the size of the plots in the chart (e.g., 3411, 3413, and 3415). This is a chart showing how the brand and competitors compare based on consumer or brand sentiment, number brand advocates and share of voice. Thus, brand advocacy is essentially a representation of the activity and focus of the brand's "fans." This chart shows users whether their brand sentiment is higher or lower than the competition, whether there are larger or smaller numbers of brand advocates than the competition, and whether the brand has a larger or smaller share of voice. For example, a brand could have a good consumer or brand sentiment index, but lower number a brand advocates and share of voice indicating that their fans are positive, but not extremely active.

In addition, users may select the "top websites" category in the top-level menu. This will display a list of the websites users are most likely to reach when searching online for information about a user's brand, product or service. This feature allows users to sort top websites by importance, site name or sites without advertising. As with the opinion leader list, the centrality metric for top websites reflects importance. In this case, the centrality represents the likelihood of users reaching the site when searching for information about the users' brands, products or services. Users can then click on the URL to launch the site for reference and examination. This list can be used to confirm the best sites for messaging, advertisement and engagement, which can illuminate sites toward the top of the list (important) that have not been utilized and those toward the bottom of the list (unimportant) where valuable dollars are being expended. The list shows: the advertising vehicle on the site (if any); the number of unique users; if there is any social media on the site; and the centrality metric (importance) of the site. Users may also select the "reports" category in the top-level menu. This list shows alerts that have been triggered based on user-configuration. For example, alerts can be sent for: extremely positive or negative posts; consumer or brand sentiment index changes; high volume of issues mentioned in posts; posts for particular authors users wish to track; posts for specific sites; and posts containing specific keywords. In one embodiment, users can receive these alerts via e-mail or SMS notifications.

Embodiments provide methods, apparatuses, and computer-readable medium for collecting, analyzing, and providing analytic measurements data of qualitative or quantitative online consumer feedback for products or services via online activity, communications, location information data, and social media content including the consumer or brand sentiment expressed data among online internet activity and social media participants about a particular subject matter. The type of subject matter that can be collected, analyzed and provided as analytic measurements data is virtually limitless as any subject matter contained in social media postings is envisioned to be within the scope of this description. Likewise, the applications of the SMA platform is virtually limitless does any use of analyzed and quantified social media online communications and activity is envisioned to be within the scope of this description. Some of the applications of the SMA platform include: providing enhanced target advertising campaigns; providing enhanced customer service at a call-center; providing enhanced market research; providing a method of improved product development; providing an enhanced method for generating opinion polls; and providing enhanced methods for National Defense intelligence to name a few.

Figure 24:
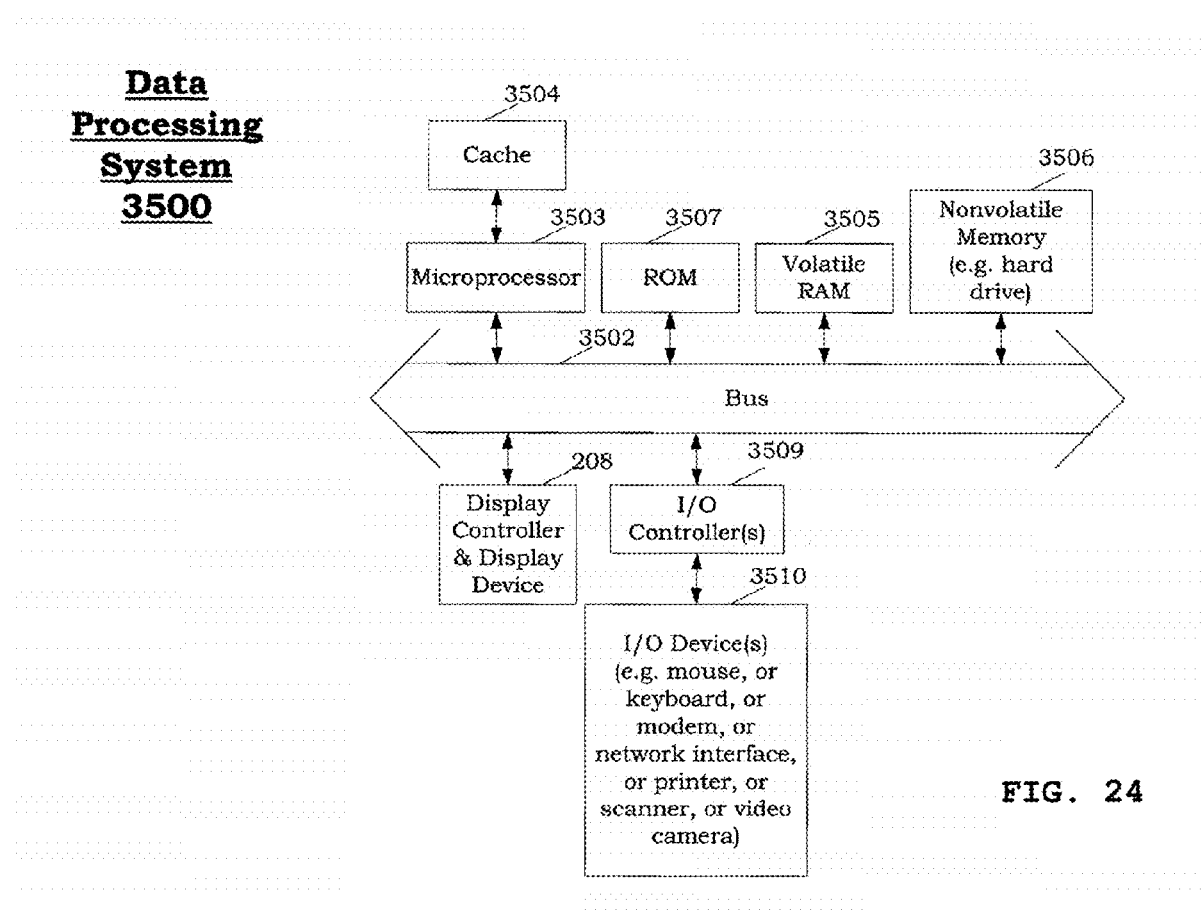
FIG. 24 illustrates an exemplary data processing system upon which the methods and apparatuses of the invention may be implemented.

FIG. 24 illustrates an exemplary data processing system upon which the methods and apparatuses of the invention may be implemented. Note that while FIG. 24 illustrates various components of a data processing system, it is not intended to represent any particular architecture or manner of interconnecting the components as such details are not germane to the present invention. It will also be appreciated that network computers and other data processing systems which have fewer components or perhaps more components may also be used. The data processing system of FIG. 24 may, for example, be a workstation, or a personal computer (PC) running a Windows operating system, or an Apple Macintosh computer.

As shown in FIG. 24, the data processing system 3501 includes a system bus 3502 which is coupled to a microprocessor 3503, a ROM 3507, a volatile RAM 3505, and a non-volatile memory 3506. The microprocessor 3503, which may be a processor designed to execute any instruction set, is coupled to cache memory 3504 as shown in the example of FIG. 24. The system bus 3502 interconnects these various components together and also interconnects components 3503, 3507, 3505, and 3506 to a display controller and display device 3508, and to peripheral devices such as input/output (I/O) devices 3510, such as keyboards, modems, network interfaces, printers, scanners, video cameras and other devices which are well known in the art. Typically, the I/O devices 3510 are coupled to the system bus 3502 through input/output controllers 3509. The volatile RAM 3505 is typically implemented as dynamic RAM (DRAM) which requires power continually in order to refresh or maintain the data in the memory. The non-volatile memory 3506 is typically a magnetic hard drive or a magnetic optical drive or an optical drive or a DVD RAM or other type of memory systems which maintain data even after power is removed from the system. Typically, the non-volatile memory 3506 will also be a random access memory although this is not required. While FIG. 24 shows that the non-volatile memory 3506 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface (not shown). The system bus 3502 may include one or more buses connected to each other through various bridges, controllers and/or adapters (not shown) as is well known in the art. In one embodiment the I/O controller 3509 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software, hardware, firmware, or in combination thereof. That is, the techniques may be carried out in a computer system or other data processing system in response to its processor, such as a microprocessor, executing sequences of instructions contained in a memory, such as ROM 3507, volatile RAM 3505, non-volatile memory 3506, cache 3504, or a remote storage device (not shown). In various embodiments, hardwired circuitry may be used in combination with software instructions to implement the present invention. Thus, the techniques are not limited to any specific combination of hardware circuitry and software or to any particular source for the instructions executed by the data processing system 3500. In addition, throughout this description, various functions and operations are described as being performed by or caused by software code to simplify description. However, those skilled in the art will recognize that what is meant by such expressions is that the functions result from execution of code by a processor, such as the microprocessor 3503.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a computer-readable medium. A computer-readable medium can be used to store software and data which when executed by a data processing system, such as data processing system 3500, causes the system to perform various methods of the present invention. This executable software and data may be stored in various places including for example ROM 3507, volatile RAM 3505, non-volatile memory 3506, and/or cache 3504 as shown in FIG. 24. Portions of this software and/or data may be stored in any one of these storage devices. A computer-readable medium may include any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a computer-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a computer-readable transmission medium such as, but not limited to, any type of electrical, optical, acoustical or other form of propagated signals (e.g., carrier waves, infrared signals, digital signals, etc.).

Additionally, it will be understood that the various embodiments described herein may be implemented with data processing systems which have more or fewer components than system 3500. For example, such data processing systems may be a cellular telephone or a personal digital assistant (PDA) or an entertainment system or a media player or a consumer electronic device, and et cetera, each of which can be used to implement one or more of the embodiments of the invention. The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Throughout the foregoing specification, references to "one embodiment," "an embodiment," "an example embodiment," and et cetera, indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow as well as the legal equivalents thereof.

Figure 25:
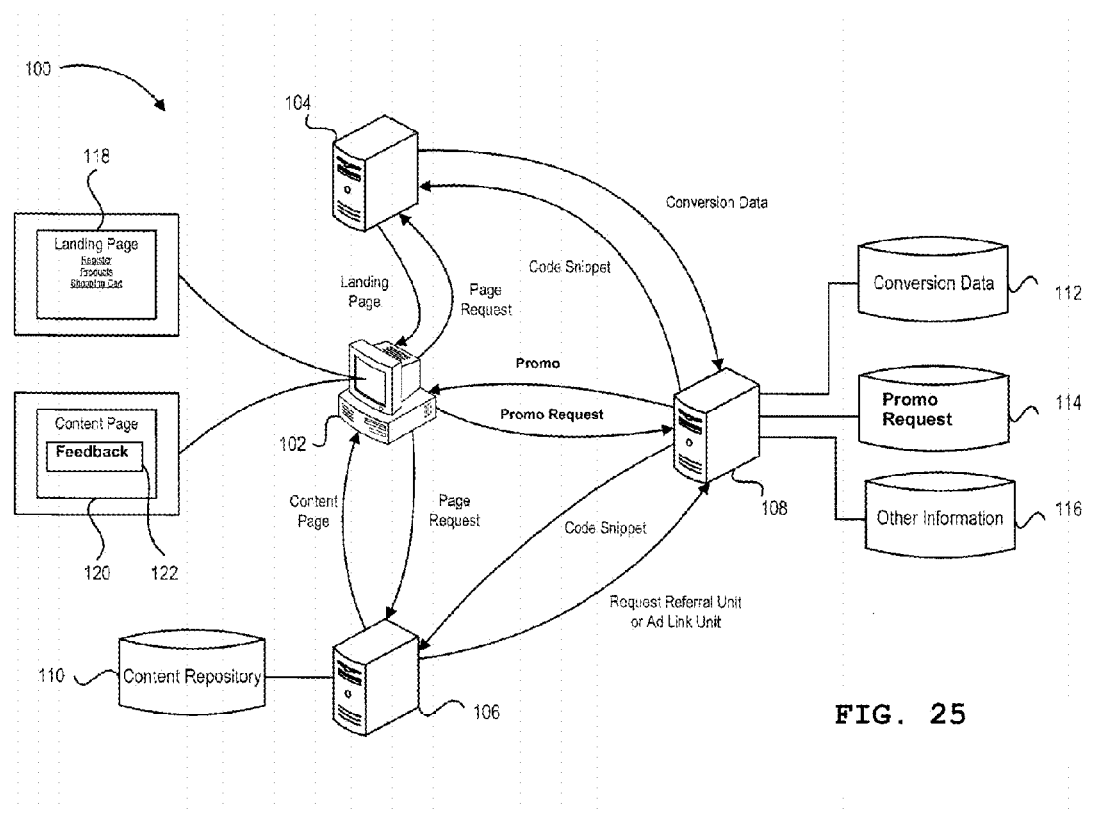
FIG. 25 is a block diagram of an example online system of the present invention.

FIG. 25 is a block diagram of an example online advertising system 100. In some implementations, one or more advertisers 104 can directly, or indirectly, enter, maintain, and track advertisement, ("ad") information in an ad management system 108. The ads can be stored in a repository 114 coupled to the system 108, (e.g., a MySQL® database). The ads may be in the form of graphical ads, such as banner ads or graphic color ads, sponsored video ads, digital promotions or offers, online classified ads, yellow page ads, white page ads, text message ads, interactive advertising, text only ads, image ads, audio ads, social video sharing impressions, video ad impressions, audio-video & photography impressions, near field communication (NFC), NFC impressions, NFC boarding pass impressions, mobile boarding pass impressions, payment and tracking passenger impressions, aggregator impressions, viral impressions, any language or translated into any language impressions, sports ad impressions, brand impressions, global brand impressions, product impressions, goods impressions, gambling impressions, auction impressions, real estate impressions, shopping impressions, sports impressions, travel & hospitality impressions, social gaming impressions, autos & vehicles impressions, pets & animals impressions, online communication impressions, education impressions, services impressions, social tracking impressions, social shopping impressions, sharing on a social networking system digital content impressions, mobile social video sharing impressions, video ad impressions, audio-video & photography impressions, near field communication (NFC), NFC impressions, NFC boarding pass impressions, mobile boarding pass impressions, payment and tracking passenger impressions, aggregator impressions, viral impressions, any language or translated into any language impressions, mobile ads, mobile ad network, mobile advertising for mobile publishers and advertisers and mobile commerce, mobile location-based advertising and promotions, ads combining one of more of any of such components, etc. The ads may also include embedded information, such as embedded media, links, meta-information, and/or machine executable instructions. One or more publishers 106 may submit requests for ads or company/brand/social/global link promotional data set to the system 108. The system 108 responds by sending ads, company/brand/social/global link promotional data set, or information that can allow for the retrieval of ads or company/brand/social/global link promotional data set to the requesting publisher 106 for placement/serving one or more of the publisher's web properties, (e.g., websites and other network-distributed content marketing impressions). The advertising search impressions for location-based promotions, location-based offers, location-based information, social media content, promotions or offers in connection with an online or mobile news feed, position-based services, location-based advertising, mobile location-based advertising and promotions or offers and marketing impressions, online coupons and/or location-based deals and offers and location-based services in real-time via a mobile device or tablet device or mobile internet devices or holographic devices or holographic phone or wireless data transfer device, (such as a mobile phone networks or wi-fi networks) or computer, online coupons, position-based services, ad links, location-based promotions, location-based offers, location-based information, social media content, promotions or offers in connection with an online or mobile news feed, discount ad impressions, merchant ad impressions, email coupon impressions, location-based advertising, mobile location-based advertising and promotions or offers and marketing impressions, in real time, or company/brand/social/global link promotional data set can be placed with or embedded in the publisher's content, (e.g., videos, articles, search results), which can be stored in a repository 110 at the publisher 106, and/or placed with content received from other sources, (e.g., other publishers, advertisers).

In some implementations, publisher's properties available in this system may also include both Internet-distributed and broadcast distributed content such as, but not limited to, television spots, radio spots, print advertising, billboard advertising, (electronic or printed), on-vehicle advertising, and the like.

Other entities, such as users or members 102 and advertisers 104, can provide usage information to the system 108, such as, for example, whether or not a conversion or click-throughs related to an ad has occurred. In some implementations, conversion data can be stored in a repository 112, where it can be used by the system 108 to improve ad-targeting performance. The usage information provided to the system 108 can include measured or observed user behavior related to ads that have been served. In some implementations, the system 108 performs financial transactions, such as crediting the publishers 106 and charging the advertisers 104 based on the usage information.

A computer network, such as a local area network, (LAN), wide area network, (WAN), the Internet, wireless network or a combination thereof, can connect the location-based services, advertisers 104, the system 108, the publishers 106, and the users or members 102.

One example of a publisher 106 is a general content server that receives requests for content, (e.g., articles, electronic mail messages, discussion threads, music, video, graphics, networked games, search results, web page listings, information feeds, dynamic web page content, etc.), and retrieves the requested content in response to the request. The content server may submit a request, (either directly or indirectly) for advertising search impressions for location-based promotions, location-based offers, location-based information, social media content, promotions or offers in connection with an online or mobile news feed or advertisements or company/brand/social/global link promotional data set to an ad server in the system 108. The location-based services or ad request may include a number of ads desired. The company/brand/social/global link promotional data set request may include a number of company/brand/social/global link promotional data set desired and the number of company/brand/social/global links per company/brand/social/global link promotional data set. The advertising search impressions for location-based promotions or offers or advertisements or company/brand/social/global link promotional data set request may also include content request information. This information can include the content itself, (e.g., page or other content document), a category or keyword corresponding to the content or the content request, (e.g., arts, business, computers, arts-movies, arts-music, etc.), part or all of the content request, content age, content type, (e.g., text, graphics, video, audio, mixed media, etc.), geo-location or geo-tagging information, demographic information related to the content, keyword, web property, etc., and the like.

In some implementations, the content server, (or a browser rendering content provided by the content server) can combine the requested content with one or more of the advertising search impressions for location-based promotions, location-based offers, location-based information, social media content, promotions or offers in connection with an online or mobile news feed or advertisements, or company/brand/social/global link promotional data set provided by the system 108. The combination can happen prior to delivery of the content to the user or contemporaneously where the advertising server can serve the ads or company/brand/social/global link promotional data set directly to an end user. The combined content and location based promotions or offers or advertisements or company/brand/social/global link promotional data set can be delivered to the user 102 that requested the content for presentation in a viewer, (e.g., a browser or other content display system). The content server can transmit information about the location-based promotions, location-based offers, location-based information, social media content, promotions or offers in connection with an online or mobile news feed or advertisements, or company/brand/social/global link promotional data set back to the ad server, including information describing how, when, and/or where the location-based promotions, location-based offers, location-based information, social media content, promotions or offers in connection with an online or mobile news feed or advertisements or company/brand/social/global link promotional data set are to be rendered, (e.g., in HTML or JavaScript™). The content page 120 can be rendered in the user's viewer with one or more ads 122. When the user 102 ad click impressions on a displayed ad 122 of an advertiser, the user 102 can be redirected to a landing page 118 of the advertiser's web site.

Figure 26:
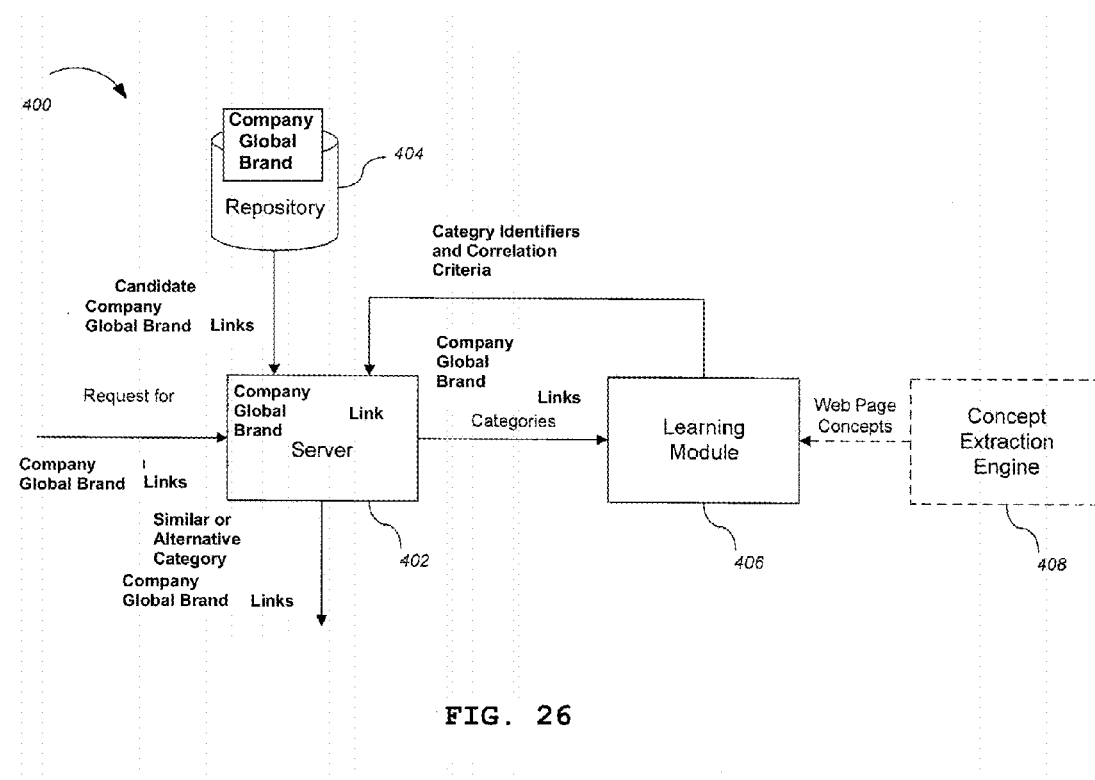
FIG. 26 is a block diagram of an example implementation of an advertising management system of the invention that provides related company/brand/social/global link promotional data set with correlated broad and alternative categories.

FIG. 26 is a block diagram of an example implementation 400 of an advertising management system 108 of FIG. 20 that provides related company/brand/social/global link promotional data set with correlated broad and alternative categories. The advertising management system 108 includes a company/brand/social/global link server 402, a company/brand/social/global link repository 404, and a learning module 406. In some implementations, the system 108 also includes a concept extraction engine 408. In some implementations, the ad server in system 108 also serves related company/brand/social/global links.

The company/brand/social/global link server 402 receives requests for related company/brand/social/global link promotional data set. In some implementations, the company/brand/social/global link server 402 receives related company/brand/social/global link promotional data set requests from one or more content marketing impressions servers. A company/brand/social/global link promotional data set request can accompany an ad request, where both the location-based advertisements and location-based services, position-based services, ad links, location-based promotions, location-based offers, location-based information, social media content, promotions or offers in connection with an online or mobile news feed, discount ad impressions, merchant ad impressions, email coupon impressions, online coupons, position-based services, ad links, location-based promotions, location-based offers, location-based information, social media content, promotions or offers in connection with an online or mobile news feed, discount ad impressions, merchant ad impressions, email coupon impressions, location-based advertising, mobile location-based advertising and promotions or offers and marketing impressions, in real time, geo-targeted or geo-tagged advertisements and/or location-based promotions, location-based offers, location-based information, social media content, promotions or offers in connection with an online or mobile news feed and capturing, processing, analyzing and filtering impressions based upon people, places and things, content, audience, geographical area, delivery modes, data sets and ad markers and distribution of mobile or wi-fi networks) or computer, online coupons, position-based services, ad links, location-based promotions, location-based offers, location-based information, social media content, promotions or offers in connection with an online or mobile news feed, discount ad impressions, merchant ad impressions, email coupon impressions, location-based advertising, mobile location-based advertising and promotions or offers and marketing impressions, in real-time and company/brand/social/global link promotional data set are to be displayed with the same content marketing impressions. In some implementations, a content marketing impressions server sends a combined request for both ads and company/brand/social/global link promotional data set. The related company/brand/social/global link promotional data set request may include a number, (e.g., one, two, or three) of related company/brand/social/global link promotional data set desired and the number, (e.g., four or five) of related company/brand/social/global link promotional data set categories for each related company/brand/social/global link promotional data set. The related company/brand/social/global link promotional data set request may also include content marketing impressions request information. For example, the information can include the content marketing impressions itself or one or more categories or keyword corresponding to the content marketing impressions or the content marketing impressions request.

The company/brand/social/global link server 402 receives candidate related company/brand/social/global links from a company/brand/social/global link repository 404. In some implementations, the candidate related company/brand/social/global links are determined based on keyword corresponding to the requested content marketing impressions with which the related company/brand/social/global link promotional data set is to be displayed. Other matching techniques can be used.

The company/brand/social/global link server 402 identifies categories for the candidate related company/brand/social/global links and forwards the categories to a learning module 406. In some implementations, the categories are the same as the candidate related company/brand/social/global links. In some implementations, the candidate related company/brand/social/global links are a subset of the categories that can be selected for company/brand/social/global link promotional data set displayed with requested content marketing impressions.

In some implementations, the related company/brand/social/global link promotional data set request can include an identifier, (e.g., the Uniform Resource Locator, (URL)) of the webpage with the requested content marketing impressions with which the related company/brand/social/global link promotional data set is to be displayed. Using the identifier, the web page can be crawled to determine one or more concepts evoked by the content marketing impressions of the web page. An optional concept extraction engine 408 can extract concepts from the web page content marketing impressions. The web page concepts can be forwarded to the learning module 406. Some examples of concept extraction engines are described in U.S. Pat. No. 7,231,393 and U.S. 2004/0068697, each of which, is incorporated by reference herein in its entirety.

The learning module 406 receives related company/brand/social/global link categories from the company/brand/social/global link server 402. The learning module 406 generates or retrieves one or more category identifiers associated with each related company/brand/social/global link category. As described above, each related company/brand/social/global link category can be classified under one or more categories. In some implementations, the category identifiers are predetermined. For example, the category identifiers for the related company/brand/social/global link categories can be determined before a related company/brand/social/global link promotional data set request is served. In some implementations, the category identifiers are pre-computed for the keyword for ads in the company/brand/social/global link repository 404.

In some implementations, the learning module 406 also receives web page concepts from the concept extraction engine 408. Web page concepts can also be classified under one or more categories. Category identifiers for the web page concepts can be determined when a related company/brand/social/global link promotional data set request is received.

The learning module 406 computes one or more correlation criteria for each related company/brand/social/global link category. A correlation measure provides a measure of how "close" or "distant" in correlation two category identifiers are, where the pair of category identifiers corresponds to two related company/brand/social/global link categories. If category identifiers are determined for the web page concepts, correlation criteria can also be computed between a category identifier associated with a related company/brand/social/global link category and a category identifier associated with one of the web page concepts.

In some implementations, the correlation measure can be computed using statistics accumulated over a large set of documents, (e.g., web pages). For example, the number of instances of a document evoking two category concepts can be determined. The number of instances can be used as a heuristic to measure the correlation between the two categories. That is, the larger the number of instances, the more likely the two categories are similar. Techniques for associating documents and co-occurring category concepts are described in U.S. Patent Publication No. 2006/0242013 A1, filed Oct. 26, 2006, for "Suggesting Targeting Information for Ads, Such as Websites and/or Categories of Websites for Example," which published patent application is incorporated by reference herein in its entirety. The correlation measure is further discussed below.

The company/brand/social/global link server 402 receives from the learning module 406 one or more correlation criteria for each related company/brand/social/global link category. In some implementations, the company/brand/social/global link server 402 also receives the category identifiers from the learning module 406. The company/brand/social/global link server 402 generates the same, similar, broad or alternative, company/brand/social/global link categories based on the correlation criteria of the candidate company/brand/social/ global link categories. The same, similar, broad or alternative, company/brand/social/global link categories are organized into one or more related company/brand/social/global link promotional data set which can be provided by the system 108 to the content marketing impressions server to be combined with the requested content marketing impressions.

In some implementations, the company/brand/social/global link server 402 provides the functionality of the learning module 406, including generation or retrieval of the category identifiers and the correlation criteria. In these implementations, the learning module 406 is not part of system 108.

Figure 27:
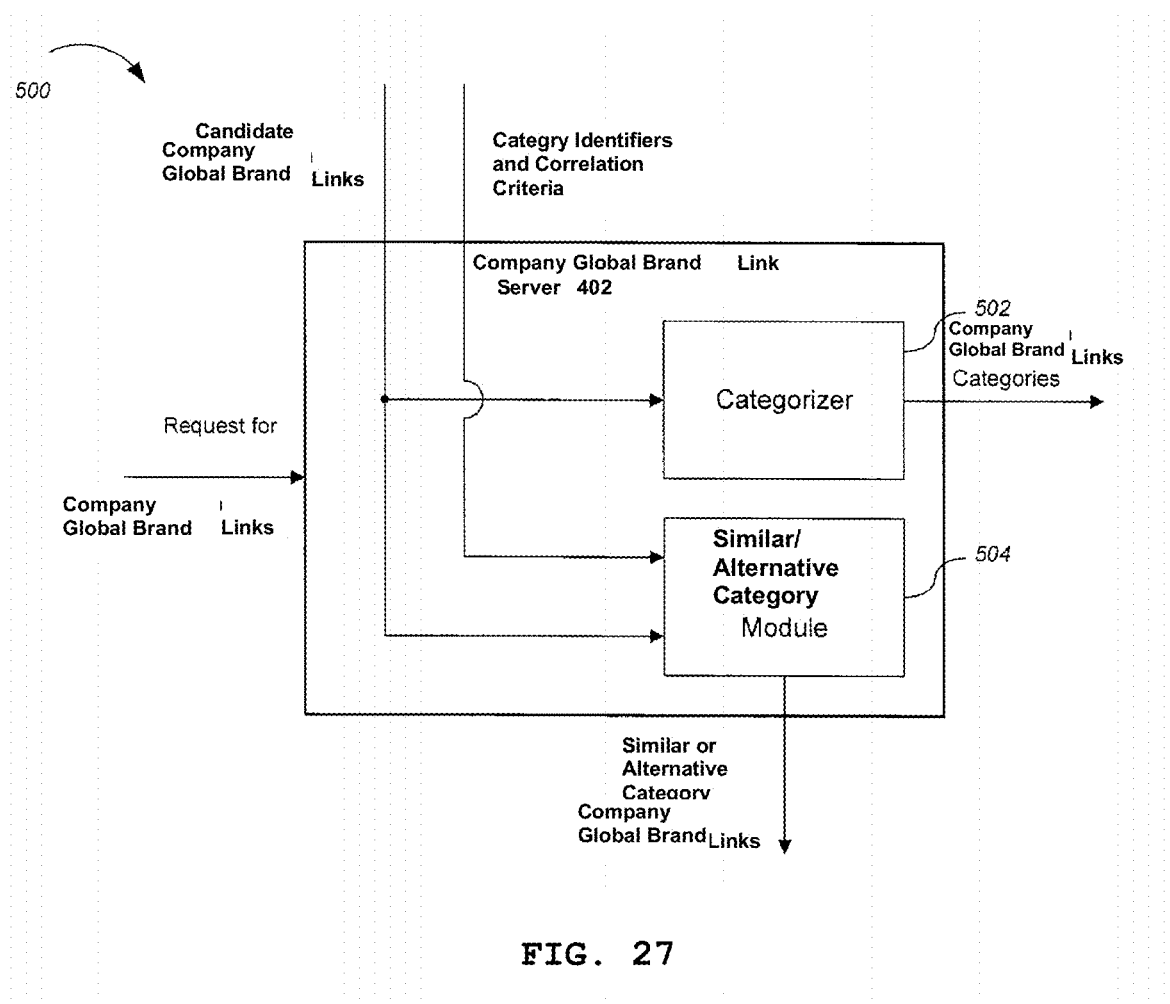
FIG. 27 is a block diagram of an example implementation of the company/brand/social/global link server of the present invention.

FIG. 27 is a block diagram of an example implementation 500 of the company/brand/social/global link server 402 of FIG. 3. The company/brand/social/global link server 402 includes a categorizer 502 and a cluster/anti-cluster module 504.

The company/brand/social/global link server 402 receives requests for related company/brand/social/global link promotional data set. The related company/brand/social/global link promotional data set request may include a number of related company/brand/social/global link promotional data set desired and the number of related company/brand/social/global link categories per related company/brand/social/global link promotional data set. The number of related company/brand/social/global link promotional data set desired can be used to determine whether related company/brand/social/global link categories should be same, similar, broad or alternative, clusters or groupings.

The company/brand/social/global link server 402 receives candidate related company/brand/social/global links In some implementations, the candidate related company/brand/social/global links are ordered by relevance to the requested content marketing impressions. The company/brand/social/global link server 402 can receive the ordered list of candidate company/brand/social/global links. Alternatively, the company/brand/social/global link server 402 can receive an unordered list, and the company/brand/social/global link server 402 can order the candidate company/brand/social/global links by relevance to the requested content marketing impressions using a relevance measure.

The categorizer 502 of the company/brand/social/global link server 402 identifies categories for the candidate related company/brand/social/global links. In some implementations, the categories are the same as the related company/brand/social/global links, and the categorizer 502 is not included in the company/brand/social/global link server 402.

The company/brand/social/global link server 402 receives one or more correlation criteria for each category. In some implementations, the company/brand/social/global link server 402 also receives the one or more category identifiers associated with each category. In some implementations, category identifiers are also received for the web page concepts and are used to cluster or anti-cluster company/brand/social/global link categories.

The candidate company/brand/social/global links and the correlation criteria are provided as inputs to the cluster/anti-cluster module 504. If the request is for a single related company/brand/social/global link promotional data set, the classification of the categories by characteristics, (also called categories) is used to improve the diversity of categories coverage, (alternative category clustering) of the related company/brand/social/global link categories displayed in the single related company/brand/social/global link promotional data set. If the request is for multiple related company/brand/social/global link promotional data set, the classification of the related company/brand/social/global link categories by categories is used to cluster related company/brand/social/global link categories in one related company/brand/social/global link promotional data set in the same category or similar categories while those in other related company/brand/social/global link promotional data set are from different categories.

Figure 28:
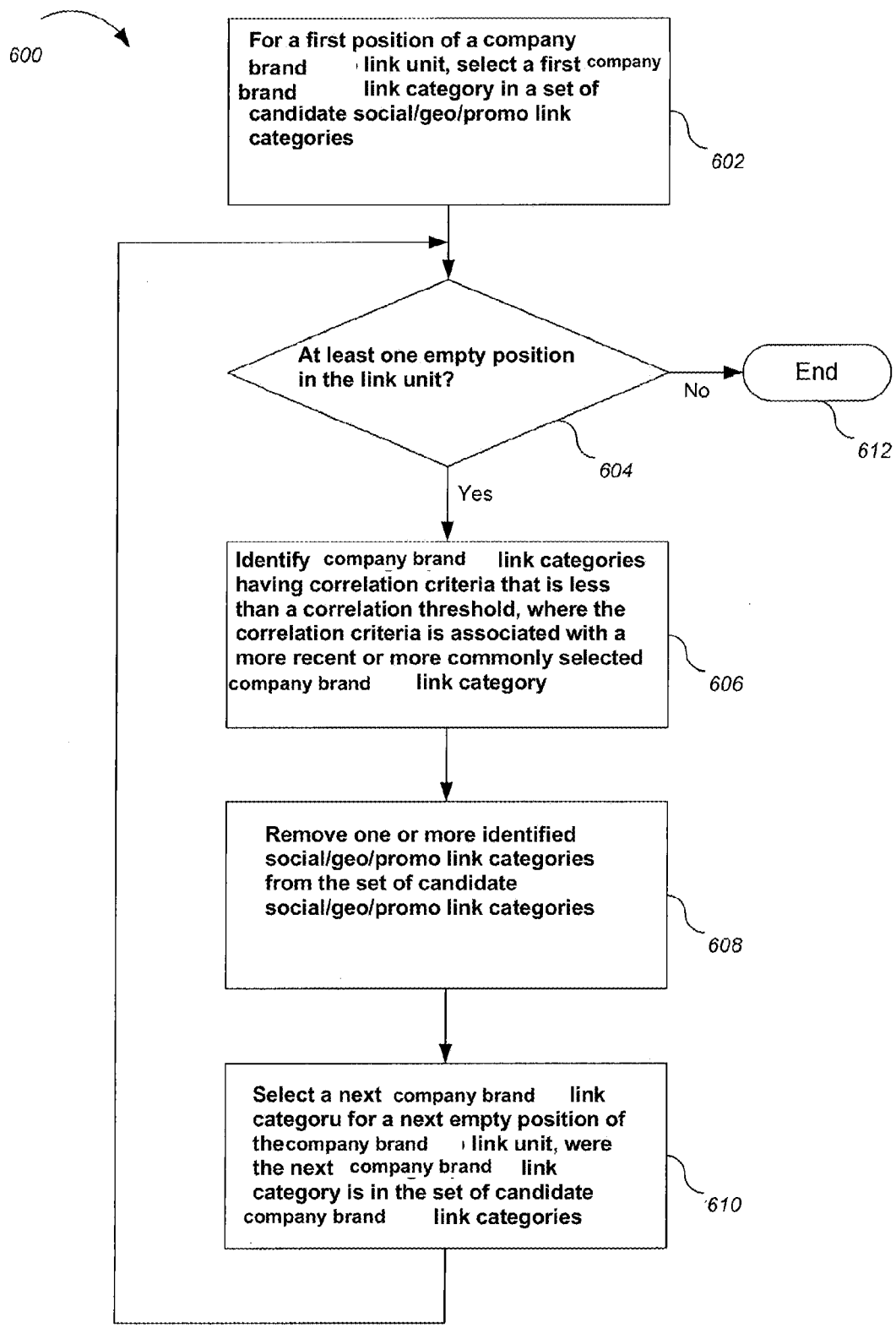
FIG. 28 is a flow diagram of an example process for providing a related company/brand/social/global link promotional data set with correlated broad categories.

FIG. 28 is a flow diagram of an example process 600 for providing a related company/brand/social/global link promotional data set with anti-clustered categories. The process 600 begins by selecting a first company/brand/social/global link category for a first position of the company/brand/social/global link promotional data set, where the first company/brand/social/global link category is in a set of candidate company/brand/social/global link categories, (602). In some implementations, the set of candidate company/brand/social/global link categories is ordered according to the relevance of the company/brand/social/global link categories to the requested content marketing impressions of the web page with which the related company/brand/social/global link promotional data set is to be displayed. For an ordered set of candidate company/brand/social/global link categories, the top relevance scoring company/brand/social/global link category is selected for the first position of the company/brand/social/global link promotional data set. In some implementations, selected company/brand/social/global link categories are removed from the set of candidate company/brand/social/global link categories.

As an example, the set of candidate company/brand/social/global link categories can be ordered by relevance to the requested content marketing impressions of a web page. For a set with the following order: A, B, C, D, . . . , L, category A can be chosen as the most relevant company/brand/social/global link category for the first position of the company/brand/social/global link promotional data set.

The process 600 determines whether there is at least one empty, (e.g., unfilled) position remaining in the related company/brand/social/global link promotional data set, (604). In some implementations, the link unit request can include the number of company/brand/social/global link categories desired for the related company/brand/social/global link promotional data set. If there are a predetermined number, (e.g., zero) of empty positions remaining in the related company/brand/social/global link promotional data set, the process 600 ends, and (612). Generally, a related company/brand/social/global link promotional data set is displayed with multiple company/brand/social/global link categories.

If there is at least one empty position remaining in the related company/brand/social/global link promotional data set, company/brand/social/global link categories having a correlation measure that is less than a correlation threshold are identified, where the identified company/brand/social/global link categories have one or more correlation criteria associated with the most recently selected company/brand/social/global link category, (606). The identified company/brand/social/global link categories are in the set of candidate company/brand/social/global link categories. In some implementations, the correlation threshold can be predetermined.

In some implementations the correlation measure can indicate the "distance" between the category identifiers of two company/brand/social/global link categories. That is, the smaller the correlation measures, the smaller the "distance" between the category identifiers, and the more similar the category identifiers are. For this type of correlation measure, the larger the correlation measure, and the less similar the category identifiers are. Identifying categories that have correlation criteria that are less than a correlation threshold means identifying the categories with a category identifier that is close, (within the correlation threshold) to a category identifier of the most recently selected category.

Alternatively, in some implementations, the correlation measure can indicate the "closeness" of the category identifiers of two company/brand/social/global link categories. That is, the larger the correlation measure, the more similar the category identifiers are. For this type of correlation measure, the process 600 would identify the categories having a correlation measure that is greater than a correlation threshold.

Company/brand/social/global link categories, which are identified, are removed from the set of candidate company/brand/social/global link categories, (608). That is, company/brand/social/global link categories that are too similar to the most recently selected company/brand/social/global link category are eliminated from further consideration based on the correlation criteria.

A next company/brand/social/global link category is selected for the next empty, (e.g., unfilled) position of the company/brand/social/global link promotional data set, where the next company/brand/social/global link category is selected from the set of candidate company/brand/social/global link categories, (610). For an ordered set of candidate company/brand/social/global link categories, the next most relevant company/brand/social/global link category remaining in the set is selected for the next position of the company/brand/social/global link promotional data set.

In some implementations, when the set of candidate company/brand/social/global link categories is ordered according to relevance, the correlation criteria for a particular company/brand/social/global link category are not compared to the correlation threshold unless the preceding company/brand/social/global link categories in the ordered set have already been selected or eliminated. That is, after the first most relevant company/brand/social/global link category is selected, the second company/brand/social/global link category in the ordered set is selected if the second company/brand/social/global link category is not too similar to the first company/brand/social/global link category. If the second company/brand/social/global link category is too similar, the next company/brand/social/global link category in the ordered set is checked for correlation. The process continues until the company/brand/social/global link positions of the company/brand/social/global link promotional data set are filled.

If there is at least one empty position remaining in the related company/brand/social/global link promotional data set, (604), the process repeats steps 606 through 610. The elimination and selection process repeats until a number, (e.g., all) of the company/brand/social/global link positions for the related company/brand/social/global link promotional data set have been filled. If the number, (e.g., all) of the positions of the related company/brand/social/global link promotional data set has been filled, the process 600 ends, (612).

In some implementations, correlation criteria of company/brand/social/global link categories can be used to reorder the set of candidate company/brand/social/global link categories. That is, instead of or in addition to using the correlation criteria to eliminate company/brand/social/global link categories, correlation criteria can be used to boost or lower the order position of a company/brand/social/global link category in the ordered set of candidate company/brand/social/global link categories. For example, the boosting or lowering can be based on the correlation measure of a company/brand/social/global link category relative to the correlation criteria of other company/brand/social/global link categories. In this implementation, the ordering of the set of candidate company/brand/social/global link categories can account for both relevance to requested content marketing impressions and correlation to previously selected company/brand/social/global link categories.

Figure 29:
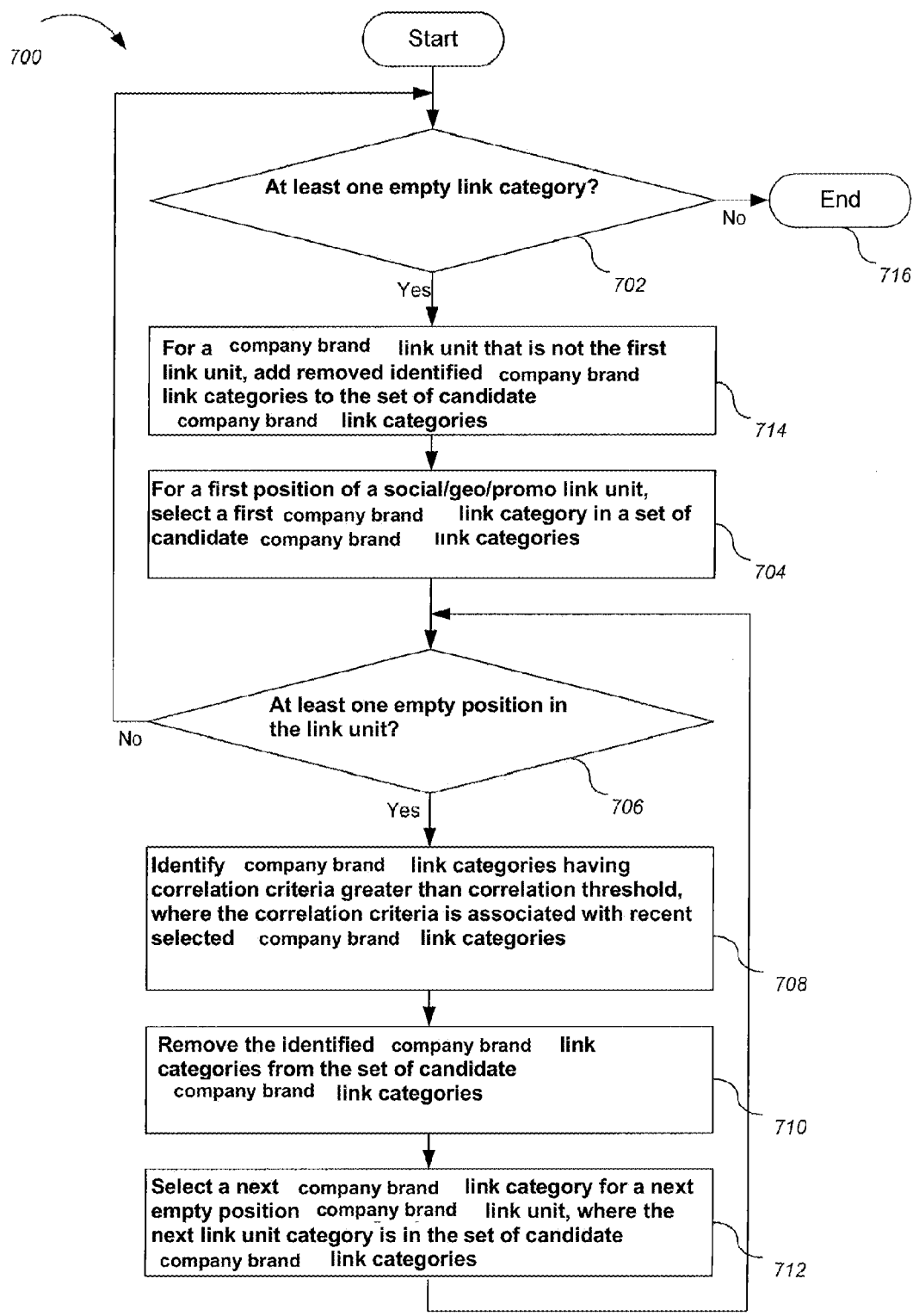
FIG. 29 is a flow diagram of an example process for providing multiple related company/brand/social/global link promotional data sets with clustered categories.

FIG. 29 is a flow diagram of an example process 700 for providing multiple related company/brand/social/global link promotional data set with clustered categories. The process 700 begins by determining whether there is at least one empty, (e.g., unfilled) related company/brand/social/global link promotional data set, (702). In some implementations, the related company/brand/social/global link promotional data set request can include the number of related company/brand/social/global link promotional data set desired. If there are a predetermined number, (e.g., zero) of empty related company/brand/social/global link promotional data set remaining, the process 700 ends, (716).

At the start of the process 700, the requested company/brand/social/global link promotional data set have not been filled, so the process 700 continues to the next step to fill the first requested company/brand/social/global link promotional data set. A first company/brand/social/global link category is selected for a first position of the company/brand/social/global link promotional data set, where the first company/brand/social/global link category is in a set of candidate company/brand/social/global link categories, (704). In some implementations, the set of candidate company/brand/social/global link categories is ordered according to the relevance of the company/brand/social/global link categories to the requested content marketing impressions of the web page with which the related company/brand/social/global link promotional data set are to be displayed. For an ordered set of candidate company/brand/social/global link categories, the top relevance scoring company/brand/social/global link category is selected for the first position of the first company/brand/social/global link promotional data set.

The process 700 determines whether there is at least one empty, (e.g., unfilled) position remaining in the related company/brand/social/global link promotional data set, (706). In some implementations, the related company/brand/social/global link promotional data set request can include the number of company/brand/social/global link categories desired for each related company/brand/social/global link promotional data set.

If there is at least one empty position remaining in the related company/brand/social/global link promotional data set, company/brand/social/global link categories having a correlation measure that is greater than a correlation threshold are identified, where at least one identified company/brand/social/global link category has one or more correlation criteria associated with the most recently selected company/brand/social/global link category, (708). The identified company/brand/social/global link categories are in the set of candidate company/brand/social/global link categories. In some implementations, the correlation threshold can be predetermined. Because the company/brand/social/global link categories within a company/brand/social/global link promotional data set are being clustered, the company/brand/social/global link categories with correlation criteria, which are greater than the correlation threshold, are identified. That is, for a correlation measure that indicates "distance," the company/brand/social/global link categories with a correlation measure greater than the correlation threshold are the categories that are too diverse to be clustered with the most recently selected company/brand/social/global link category.

Alternatively, in some implementations, the correlation measure can indicate the "closeness" of the category identifiers of two company/brand/social/global link categories. For this type of correlation measure, the process 700 would identify the categories having a correlation measure that is less than a correlation threshold.

In some implementations, a given company/brand/social/global link category in the set of candidate company/brand/social/global link categories can have a separate correlation measure for at least one pair-wise combination of a category identifier of the given company/brand/social/global link category and a category identifier of the most recently selected company/brand/social/global link category. A composite correlation measure can be determined for the given company/brand/social/global link category, for example, by taking a maximum, a minimum, or a combination, (e.g., a weighted combination) of the separate correlation criteria for the given company/brand/social/global link category. In these implementations, the company/brand/social/global link categories, which are too diverse, can be identified by comparing the composite correlation criteria to the correlation threshold.

Company/brand/social/global link categories, which are identified, are removed from the set of candidate company/brand/social/global link categories, (710). That is, company/brand/social/global link categories that are too diverse relative to the most recently selected company/brand/social/global link category are eliminated from further consideration based on the correlation criteria.

A next company/brand/social/global link category is selected for the next empty, (e.g., unfilled) position of the company/brand/social/global link promotional data set, where the next company/brand/social/global link category is selected from the set of candidate company/brand/social/global link categories, (712). For an ordered set of candidate company/brand/social/global link categories, the next most relevant company/brand/social/global link category remaining in the set is selected for the next position of the company/brand/social/global link promotional data set.

In some implementations, when the set of candidate company/brand/social/global link categories is ordered according to, the correlation criteria for a particular company/brand/social/global link category are not compared to the correlation threshold unless the preceding company/brand/social/global link categories in the ordered set have already been selected or eliminated.

If there is at least one empty position remaining in the related company/brand/social/global link promotional data set, (706), the process repeats steps 708 through 712. The elimination and selection process repeats until a number, (e.g., all) of the company/brand/social/global link positions for the related company/brand/social/global link promotional data set have been filled.

If a number, (e.g., all) of the positions of the related company/brand/social/global link promotional data set have been filled, the process 700 returns to step 702. Again, the process 700 determines whether there is at least one empty, (e.g., unfilled) related company/brand/social/global link promotional data set remaining, (702). Consider the case, in the second example, where two related company/brand/social/global link promotional data set are requested. Because only the first related company/brand/social/global link promotional data set has been filled, the process 700 repeats for the second requested company/brand/social/global link promotional data set.

Before continuing to step 704, the process 700 adds a number, (e.g., all) of the removed identified company/brand/social/global link categories to the set of candidate company/brand/social/global link categories, (714). This step is not performed for the first company/brand/social/global link promotional data set, because before the first company/brand/social/global link position is filled in the first company/brand/social/global link promotional data set, company/brand/social/global link categories have not been removed from the set of candidate company/brand/social/global link categories. For later company/brand/social/global link promotional data set, previously removed company/brand/social/global link categories are added back to the set of candidate company/brand/social/global link categories because, although these categories were too dissimilar to be included in the cluster for the first company/brand/social/global link promotional data set, the company/brand/social/global link categories for the other company/brand/social/global link promotional data set are chosen to be diverse relative to the company/brand/social/global link categories selected for the first company/brand/social/global link promotional data set.

The process 700 repeats steps 704 through 714 until there are a predetermined number, (e.g., zero) of remaining empty company/brand/social/global link promotional data set to be filled. If there are a predetermined number, (e.g., zero) of empty company/brand/social/global link promotional data set remaining, the process 700 ends, (716).

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor one of multiple processors or cores, of any kind of computer. Generally, a processor can receive instructions and data from a read-only memory or a random access memory or both. The essential elements of a computer are a processor for executing instructions and one or more memories for storing instructions and data. Generally, a computer can also include, or be operatively coupled to communicate with one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs, (application-specific integrated circuits).

To provide for interaction with a user, the features can be implemented on a computer having a display device such as a CRT, (cathode ray tube) or LCD, (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Potential Aspects or Elements of the Claimed Invention that can be Optionally Excluded or Negatively Claimed.

The present invention can also in particular claimed embodiments exclude or negatively claim one or more aspects selected from the following list, e.g., to more particularly recite or exclude embodiments or elements that might occur in cited or other published art. Accordingly, the present invention can optionally exclude, not include, or not provide, one of more, or any combination of any element, feature, component or step disclosed herein, e.g., but not limited to any one or a combination of: a method, an apparatus, signals, transitory or computer readable storage medium, computer system, wireless or wired network, or system to provide a delivery system for a consumer feedback social media analytics platform method, system or apparatus or non-transitory computer readable storage medium, comprising: (a) electronically collecting and analyzing on a networked computer system using a processor qualitative or quantitative online consumer feedback data for products or services via online activity, communications, location information data, and social media content relevant to consumer products or services, or promotions thereof, of interest in a category from one or more online user online activity and social media sources; the consumer feedback data comprising: (i) impressions data comprising tracking and analysis of website access of said user's, target markets' users, demographic groups or geographic data, which can include browser tracking and cookies; (ii) location information data relating to selected; (a) users, target markets, demographic groups or geographic data; (b) (1) products or services; or (2) product or service providers; and (c) points of interest near or associated with (1) said consumers, target markets, demographic groups or geographic data; (2) said products or services; or (3) said product or service providers; (iii) 2D and 3D mapping data related to selected: (a) user, target market or demographic group locations or associated locations; or (b) product or service or service provider locations or associated locations; (iv) user internet activity data relating to user searching, browsing, purchases, location, interactions, and interests; and (v) social networking data of interactions between said user and other users, target markets, and demographics groups and geographic data; and (vi) generated marketing and mapping data of relationships between members of a social network or website; (b) electronically quantifying on a networked computer system using a processor the collected online consumer feedback data for products or services via online activity, communications, location information data, and social media content; to electronically obtain, using a computer system processor, structured analytic measurements data of the online consumer feedback for products or services via online activity, communications, location information data, and social media content, including electronic analytic measurements data of consumer or brand sentiment expressed data among online internet activity and social media participants concerning the consumer products or services, or promotions thereof, of interest in the category; and (c) electronically providing, on a networked computer system using a processor, actionable information data to companies, organizations, and governmental agencies based on the analytic measurements data of the online activity, communications, location information data, and social media content; wherein the actionable information data is retrieved based on real-time measurements or data collection and/or management of: (i) the consumer or brand sentiment expressed data by the online internet activity and social media participants concerning the consumer products or services, or promotions thereof, of interest; electronically compared and analyzed on a computer system with: (ii) historical data representing quantitative measurements of the consumer or brand sentiment data concerning the consumer products or services, or promotions thereof, of interest in the past or concurrently with similar or competing products and services; wherein the qualitative or quantitative online consumer feedback data for products or services via online activity, communications, location information data, and social media content, includes one or more selected from the group consisting of messages posted to online social media websites, Internet messages; social media postings; promotions or offers; online dialog; blogging; interactions between customers and companies; call center logs; emails; online mail and fax communications; call center records; online purchasing information; online warranty claims; and other online traffic; wherein the one or more online user online activity and social media sources include one or more selected from the group consisting of blogs and sub-blogs; online discussion forums; social networks; wiki sites; online reviews on e-commerce sites; video websites; micro-blogging services; call centers; websites including websites of companies; and other sources of online activity, communications, location information data, and social media content; further comprising displaying the actionable information data to users in companies, organizations, global or local businesses, government agencies on a graphical user interface (GUI); comprising: electronically performing on a networked computer system consumer or brand sentiment rating processing of data on structured analytical measurements of the online consumer feedback data for products or services via online activity, communications, location information data, and social media content that refers to the consumer products or services, or promotions thereof, of interest; to electronically determine using, a networked computer system processor, at least one consumer or brand sentiment rating data set for the online activity, communications, location information data, and social media content; and electronically assigning on a computer system the consumer or brand sentiment rating for one or more of the online activity, communications, location information data, and social media content data sets; wherein said electronically determining the consumer or brand sentiment rating data sets includes: (i) electronically identifying, using a computer system processor, data sets comprising terms or phrases of interest associated with the consumer products or services, or promotions thereof, of interest in one or more of the online activity, communications, location information data, and social media content data sets; (ii) electronically searching on a computer system processor in a set of closest N words from the terms or phrases of interest for keywords expressing consumer or brand sentiment about the terms or phrases of interest; (iii) electronically assigning using a computer system processor, a probability value data set for one or more of the keywords, the probability value indicating the probability that the keyword suggests something positive or negative about the terms or phrases of interest; (iv) electronically assigning using a computer system processor one or more occurrences of the terms or phrases of interest with a consumer or brand sentiment score data value based on the keywords in the set of closest N words from the terms or phrases of interest; and (v) electronically summing using a computer system processor one or more consumer or brand sentiment score assigned to each of the terms or phrases of interest in each social media conversation to electronically obtain using computer system processor consumer or brand sentiment rating data sets concerning the consumer products or services, or promotions thereof, of interest; wherein the consumer or brand sentiment score is based on one or more of: how many times each occurrence of the terms or phrases of interest appears in the social media conversation; number of keywords expressing consumer or brand sentiment about the terms or phrases of interest in the set of closest words; whether each keyword reflects a positive, negative or neutral consumer or brand sentiment about the consumer products or services, or promotions thereof, of interest; and relevance of the keywords expressing consumer or brand sentiment about the terms or phrases of interest; wherein the relevance of the keywords is electronically determined by using a computer system one or more of: linguistic modifiers of the keywords expressing consumer or brand sentiment about the terms or phrases of interest including one or more of negations, comparatives, and enumerations; and proximity of the keywords to the terms or phrases of interest in the online social media conversation; further comprising electronically analyzing and using online social media author and website influence parameter data on a computer system in classifying the consumer or brand sentiment of consumer online activity, behavior, or social media conversations or content data; further comprising one or more of: calculating how the consumer or brand sentiment concerning the consumer products or services, or promotions thereof, of interest trends over time; calculating how the consumer or brand sentiment concerning the consumer products or services, or promotions thereof, of interest varies by online source or group of sources; and calculating how the consumer or brand sentiment concerning the consumer products or services, or promotions thereof, of interest concurrently trends over time and varies by online source or group of sources; further comprising determining an overall volume of the online consumer feedback for products or services via online activity, communications, location information data, and social media content referring to the consumer products or services, or promotions thereof, of interest by adding up a number of occurrences of the consumer products or services, or promotions thereof, of interest in online consumer feedback for products or services via online activity, communications, location information data, and social media content per unit of time; further comprising determining how the overall volume of online social conversations referring to the consumer products or services, or promotions thereof, of interest trends over time; further comprising determining a share of online voice acquired by the consumer products or services, or promotions thereof, of interest with respect to other online social media subject matter.

The invention can further provide wherein the other online social media subject matter includes subject matter associated with competitors in the category; further comprising electronically calculating on a computer system processor one or more of: how the share of online voice acquired by the consumer products or services, or promotions thereof, of interest trends over time; and how the share of online voice acquired by the consumer products or services, or promotions thereof, of interest trends over time with respect to the subject matter of the competitors in the category; further comprising electronically performing text edge processing on a computer system processor of the online consumer feedback data for products or services via online activity, communications, location information data, and social media content to electronically determine on a computer system processor frequency data of occurrence of one or more topics in conjunction with the consumer products or services, or promotions thereof, of interest and relatedness of the one or more topics to the consumer products or services, or promotions thereof, of interest; wherein the text edge processing comprises (i) electronically on a computer system processor providing data sets showing the splitting up of phrases, from online consumer feedback data for products or services via online activity, communications, location information data, and social media content; into data sets of individual words and tuples of adjacent words; (ii) electronically identifying data sets of words or tuples of interest associated with the consumer products or services, or promotions thereof, of interest; (iii) providing data sets identifying relationships between the words or tuples of interest and each other word and tuple in the sentence as an instance of an edge; and adding up each of the instances; further comprising electronically determining using a computer system processor data sets of the frequency of occurrence of the one or more topics in conjunction with the consumer products or services, or promotions thereof, of interest, the data sets comprising trends over time; further comprising (i) electronically determining on a computer system processor an overall advocacy of the consumer products or services, or promotions thereof, of interest in the online consumer feedback for products or services via online activity, communications, location information data, and social media content for the category based on data sets selected from the group consisting of: (a) data analysis of consumer or brand sentiment ratings of the consumer products or services, or promotions thereof, of interest; (b) number data of advocates of the consumer products or services, or promotions thereof, of interest; (c) data analysis of advocates of the consumer products or services, or promotions thereof, of interest; (d) data analysis of online social media authors having positive consumer or brand sentiment for the consumer products or services, or promotions thereof, of interest in the category; and (e) data analysis of share data sets of online interest or activity acquired by the consumer products or services, or promotions thereof, of interest with respect to the subject matter associated with one or more competitors in the category; further comprising electronically utilizing on a computer system processor the actionable information data in conjunction with online research and electronically presented analytics measurements electronically provided on a networked computer system selected from the group consisting of: quantitative and qualitative market research; paid media tracking; and website analytics; sales information; public relations information; advertising information; investor relations; brand management; and product development information; further comprising electronically identifying and contacting authors of online social media based on the actionable information; further comprising electronically identifying and contacting one or more representatives of online social media websites; wherein the actionable information data provided to companies, organizations, and governmental agencies includes real-time alerts providing information about customer service or quality issues relating to the company's products or services, or a competitor's competing product or service.

A number of implementations have been described. Nevertheless, it can be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A consumer feedback social media analytics platform method comprising:
   (a) electronically collecting and analyzing, on a networked computer system using a processor, quantitative or qualitative online consumer feedback data for products or services via online activity, communications, location information data, and social media content relevant to consumer products or services, or promotions thereof, of interest in a category from one or more online user online activity and social media sources;
   the consumer feedback data comprising:
      (i) impressions data comprising tracking and analysis of website access of said user's, target markets' users, demographic groups or geographic data;
      (ii) location information data relating to selected;
         (a) users, target markets, demographic groups or geographic data;
         (b) (1) products or services; or (2) product or service providers; and
         (c) points of interest near or associated with (1) said consumers, target markets, demographic groups or geographic data; (2) said products or services; or (3) said product or service providers;
      (iii) 2D and 3D mapping data related to selected:
         (a) user, target market or demographic group locations or associated locations; or
         (b) product or service or service provider locations or associated locations;
      (iv) user internet activity data relating to user searching, browsing, purchases, location, interactions, and interests; and
      (v) social networking data of interactions between said user and other users, target markets, and demographics groups and geographic data; and
      (vi) generated marketing and mapping data of relationships between members of a social network or website
   (b) electronically quantifying on a networked computer system using a processor the collected online consumer feedback data for products or services via online activity, communications, location information data, and social media content; to electronically obtain, using a computer system processor, structured analytic measurements data of the online consumer feedback for products or services via online activity, communications, location information data, and social media content, including electronic analytic measurements data of consumer or brand sentiment expressed data among online internet activity and social media participants concerning the consumer products or services, or promotions thereof, of interest in the category; and
   (c) electronically providing on a networked computer system using a processor actionable information data to companies, organizations, and governmental agencies based on the analytic measurements data of the online activity, communications, location information data, and social media content, in order to provide targeted, location based, 2D or 3D mapped, or impressions to generate online location information data or promotions to provide improved or desired customer perception or sentiment regarding a company's products, services or promotions thereof.

2. A method according to claim 1, wherein the actionable information data is retrieved based on real-time measurements of:
   (i) the consumer or brand sentiment expressed data by the online internet activity and social media participants concerning the consumer products or services, or promotions thereof, of interest; electronically compared and analyzed on a computer system with:
   (ii) historical data representing quantitative measurements of the consumer or brand sentiment data concerning the consumer products or services, or promotions thereof, of interest in the past or concurrently with similar or competing products and services.

3. A method according to claim 1, wherein the qualitative or quantitative online consumer feedback data for products or services via online activity, communications, location information data, and social media content, includes one or more selected from the group consisting of messages posted to online social media websites, Internet messages; social media postings; promotions or offers; online dialog; blogging; interactions between customers and companies; call center logs; emails; online mail and fax communications; call center records; online purchasing information; online warranty claims; and other online traffic;
   the invention can further provide wherein the one or more online user online activity and social media sources include one or more selected from the group consisting of blogs and sub-blogs; online discussion forums; social networks; wiki sites; online reviews on e-commerce sites; video websites; micro-blogging services; call centers; websites including websites of companies; and other sources of online activity, communications, location information data, and social media content.

4. A method according to claim 1, further comprising displaying the actionable information data to users in companies, organizations, global or local businesses, government agencies on a graphical user interface (GUI).

5. A method according to claim 1, further comprising: electronically performing on a networked computer system consumer or brand sentiment rating processing of data on structured analytical measurements of the online consumer feedback data for products or services via online activity, communications, location information data, and social media content that refers to the consumer products or services, or promotions thereof, of interest; to electronically determine using, a networked computer system processor, at least one consumer or brand sentiment rating data set for the online activity, communications, location information data, and social media content; and electronically assigning on a computer system the consumer or brand sentiment rating for one or more of the online activity, communications, location information data, and social media content data sets.

6. A method according to claim 1, wherein said electronically determining the consumer or brand sentiment rating data sets includes:
   (i) electronically identifying, using a computer system processor, data sets comprising terms or phrases of interest associated with the consumer products or services, or promotions thereof, of interest in one or more of the online activity, communications, location information data, and social media content data sets;
   (ii) electronically searching on a computer system processor in a set of closest N words from the terms or phrases of interest for keywords expressing consumer or brand sentiment about the terms or phrases of interest;
   (iii) electronically assigning using a computer system processor, a probability value data set for one or more of the keywords, the probability value indicating the probability that the keyword suggests something positive or negative about the terms or phrases of interest;
   (iv) electronically assigning using a computer system processor one or more occurrences of the terms or phrases of interest with a consumer or brand sentiment score data value based on the keywords in the set of closest N words from the terms or phrases of interest; and
   (v) electronically summing using a computer system processor one or more consumer or brand sentiment score assigned to each of the terms or phrases of interest in each social media conversation to electronically obtain using computer system processor consumer or brand sentiment rating data sets concerning the consumer products or services, or promotions thereof, of interest, in order to provide targeted, location based, 2D or 3D mapped, or impressions to generate online location information data or promotions to provide improved or desired customer perception or sentiment regarding a company's products, services or promotions thereof.

7. A method according to claim 1, wherein the consumer or brand sentiment score is based on one or more of: how many times each occurrence of the terms or phrases of interest appears in the social media conversation; number of keywords expressing consumer or brand sentiment about the terms or phrases of interest in the set of closest words; whether each keyword reflects a positive, negative or neutral consumer or brand sentiment about the consumer products or services, or promotions thereof, of interest; and relevance of the keywords expressing consumer or brand sentiment about the terms or phrases of interest.

8. A method according to claim 7, wherein the relevance of the keywords is electronically determined by using a computer system one or more of: linguistic modifiers of the keywords expressing consumer or brand sentiment about the terms or phrases of interest including one or more of negations, comparatives, and enumerations; and proximity of the keywords to the terms or phrases of interest in the online social media conversation.

9. A method according to claim 1, further comprising electronically analyzing and using online social media author and website influence parameter data on a computer system in classifying the consumer or brand sentiment of consumer online activity, behavior, or social media conversations or content data.

10. A method according to claim 1, further comprising one or more of: calculating how the consumer or brand sentiment concerning the consumer products or services, or promotions thereof, of interest trends over time; calculating how the consumer or brand sentiment concerning the consumer products or services, or promotions thereof, of interest varies by online source or group of sources; and calculating how the consumer or brand sentiment concerning the consumer products or services, or promotions thereof, of interest concurrently trends over time and varies by online source or group of sources.

11. A method according to claim 1, further comprising determining an overall volume of the online consumer feedback for products or services via online activity, communications, location information data, and social media content referring to the consumer products or services, or promotions thereof, of interest by adding up a number of occurrences of the consumer products or services, or promotions thereof, of interest in online consumer feedback for products or services via online activity, communications, location information data, and social media content per unit of time.

12. A method according to claim 1, further comprising determining how the overall volume of online social conversations referring to the consumer products or services, or promotions thereof, of interest trends over time;
   the invention can further provide further comprising determining a share of online voice acquired by the consumer products or services, or promotions thereof, of interest with respect to other online social media subject matter.

13. A method according to claim 1, wherein the other online social media subject matter includes subject matter associated with competitors in the category.

14. A method according to claim 1, further comprising electronically calculating on a computer system processor one or more of: how the share of online voice acquired by the consumer products or services, or promotions thereof, of interest trends over time; and how the share of online voice acquired by the consumer products or services, or promotions thereof, of interest trends over time with respect to the subject matter of the competitors in the category.

15. A method according to claim 1, further comprising electronically performing text edge processing on a computer system processor of the online consumer feedback data for products or services via online activity, communications, location information data, and social media content to electronically determine on a computer system processor frequency data of occurrence of one or more topics in conjunction with the consumer products or services, or promotions thereof, of interest and relatedness of the one or more topics to the consumer products or services, or promotions thereof, of interest.

16. A method according to claim 1, wherein the text edge processing comprises (i) electronically on a computer system processor providing data sets showing the splitting up of phrases, from online consumer feedback data for products or services via online activity, communications, location information data, and social media content; into data sets of individual words and tuples of adjacent words; (ii) electronically identifying data sets of words or tuples of interest associated with the consumer products or services, or promotions thereof, of interest; (iii) providing data sets identifying relationships between the words or tuples of interest and each other word and tuple in the sentence as an instance of an edge; and adding up each of the instances.

17. A method according to claim 1, further comprising electronically determining using a computer system processor data sets of the frequency of occurrence of the one or more topics in conjunction with the consumer products or services, or promotions thereof, of interest, the data sets comprising trends over time.

18. A method according to claim 1, further comprising (i) electronically determining on a computer system processor an overall advocacy of the consumer products or services, or promotions thereof, of interest in the online consumer feedback for products or services via online activity, communications, location information data, and social media content for the category based on data sets selected from the group consisting of: (a) data analysis of consumer or brand sentiment ratings of the consumer products or services, or promotions thereof, of interest; (b) number data of advocates of the consumer products or services, or promotions thereof, of interest; (c) data analysis of advocates of the consumer products or services, or promotions thereof, of interest; (d) data analysis of online social media authors having positive consumer or brand sentiment for the consumer products or services, or promotions thereof, of interest in the category; and (e) data analysis of share data sets of online interest or activity acquired by the consumer products or services, or promotions thereof, of interest with respect to the subject matter associated with one or more competitors in the category.

19. A method according to claim 1, further comprising electronically utilizing on a computer system processor the actionable information data in conjunction with online research and electronically presented analytics measurements electronically provided on a networked computer system selected from the group consisting of: quantitative and qualitative market research; paid media tracking; and website analytics; sales information; public relations information; advertising information; investor relations; brand management; and product development information.

20. A method according to claim 1, wherein the actionable information data provided to companies, organizations, and governmental agencies includes real-time alerts providing information about customer service or quality issues relating to the company's products or services, or a competitor's competing product or service.

\* \* \* \* \*